United States Patent
Bai et al.

(10) Patent No.: US 11,765,709 B2
(45) Date of Patent: Sep. 19, 2023

(54) COMMON BEAM TRAINING FOR A GROUP OF COMPONENT CARRIERS

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Kiran Venugopal, Raritan, NJ (US); Jung Ho Ryu, Fort Lee, NJ (US); Qian Zhang, Basking Ridge, NJ (US); Ling Ding, Chester, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/171,339

(22) Filed: Feb. 9, 2021

(65) Prior Publication Data

US 2021/0258942 A1    Aug. 19, 2021

Related U.S. Application Data

(60) Provisional application No. 62/975,890, filed on Feb. 13, 2020.

(51) Int. Cl.
*H04W 72/044* (2023.01)
*H04L 5/00* (2006.01)

(52) U.S. Cl.
CPC ......... *H04W 72/046* (2013.01); *H04L 5/0048* (2013.01)

(58) Field of Classification Search
CPC .... H04W 72/046; H04L 5/0048; H04L 5/001; H04L 5/0023; H04L 5/005; H04B 7/0695
See application file for complete search history.

(56) References Cited

U.S. PATENT DOCUMENTS

| | | | |
|---|---|---|---|
| 2013/0022005 A1* | 1/2013 | Yano | H04L 5/0053 370/329 |
| 2013/0142098 A1* | 6/2013 | Kwon | H04W 52/367 370/311 |
| 2018/0205435 A1* | 7/2018 | Nair | H04B 7/0615 |
| 2019/0103908 A1* | 4/2019 | Yu | H04B 7/0695 |
| 2019/0109625 A1* | 4/2019 | Subramanian | H04W 72/046 |
| 2019/0230529 A1* | 7/2019 | Sadiq | H04L 5/001 |
| 2020/0007208 A1* | 1/2020 | Zhou | H04W 16/28 |
| 2020/0205088 A1* | 6/2020 | Yang | H04W 52/32 |
| 2021/0058999 A1* | 2/2021 | Chen | H04W 72/042 |
| 2021/0067289 A1* | 3/2021 | Zhu | H04B 7/0617 |
| 2021/0367740 A1* | 11/2021 | Chen | H04L 1/1854 |

* cited by examiner

*Primary Examiner* — Ian N Moore
*Assistant Examiner* — Sun Jong Kim
(74) *Attorney, Agent, or Firm* — Holland & Hart LLP

(57) ABSTRACT

Methods, systems, and devices for wireless communications are described. The described techniques provide for training a beam for multiple component carriers (CCs) for concurrent communications in a wireless communications system associated with limited user equipment (UE) capabilities. The UE receives, via a first receive beam, a first reference signal on a group of CCs over a first symbol. The UE also receives, via a second receive beam, a second reference signal on the group of CCs over a second symbol. The UE selects a receive beam for a subsequent communication based on determining a value of a parameter for each of the first and the second receive beam.

29 Claims, 30 Drawing Sheets

COMMON BEAM TRAINING FOR A GROUP OF COMPONENT CARRIERS

CROSS REFERENCE

The present application for patent claims the benefit of U.S. Provisional Patent Application No. 62/975,890 by Bai et al., entitled "COMMON BEAM TRAINING FOR A GROUP OF COMPONENT CARRIERS," filed Feb. 13, 2020, assigned to the assignee hereof, and expressly incorporated by reference in its entirety herein.

TECHNICAL FIELD

The following relates generally to wireless communications and more specifically to common beam training for a group of component carriers.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as a user equipment (UE).

Some wireless communications systems may support beamforming techniques, which may increase spectral efficiency and provide a better signal-to-noise ratio (SNR) for communications between wireless devices. Some wireless communications systems may support carrier aggregation to increase spectral efficiency through the use of multiple component carriers. A UE may select a respective transmit beam and a respective receive beam for a component carrier to provide a desired target signal quality for the component carrier. Although beamforming and carrier aggregation may increase spectrum usage, the beamforming capabilities of the UE may complicate communications involving both beamforming and carrier aggregation due to the hardware demands for receiving and transmitting beamformed signals on a group of component carriers.

SUMMARY

The described techniques relate to methods, systems, devices, and apparatuses that support common beam training for a group of component carriers (CCs). Generally, the described techniques provide for training a beam for multiple CCs for concurrent communications (for example, over a symbol) in a wireless communications system associated with limited UE capabilities. For example, the wireless communications system associated with the limited UE capabilities may include a UE with an insufficient number of radio frequency (RF) chains to receive each CC of the multiple CCs on a respective unique UE receive beam. The receive beam or the transmit beam for the two or more CCs constituting the group may be referred to as a shared beam and may, in some examples, refer to a shared spatial filter or an analog beamformer. In some other different cases, a shared beam may be trained (for example, refined) for a subset of the CCs (for example, a subset of CCs of the CC group) sharing the beam, but not for all CCs sharing the beam. In some other different cases, the UE may not successfully receive a number of CCs because an analog beamformer optimized for the subset of the multiple CCs in the group may not work well for the remaining CCs in the group. The disclosed beam training here can improve (for example, optimize) a receive beam or a transmit beam for a CC group based on two or more CCs constituting the group (for example, a CC group) that shares an RF chain instead of other different cases that may adjust the beam based on only a single CC of the group (and disregarding the remaining CCs in the group). Training an analog beamformer for multiple CCs (for example, all CCs of the CC group) instead of training for single CC in the CC group may provide more reliable reception of the CCs sharing the beam.

For example, the UE may use a beam sweeping (or "beam sweep") procedure to train a receive beam, such as a shared receive beam. In some examples, a base station may concurrently transmit, via a downlink transmit beam, a reference signal on multiple CCs over a first duration and may concurrently transmit the reference signal on the multiple CCs over additional durations. The UE may measure the reference signal for the multiple CCs on a different receive beam in each of the durations. In some examples, the measuring may be based on the base station implicitly or explicitly indicating to the UE that a purpose of the beam sweep procedure is to train a shared beam. In some examples, the UE may implicitly determine the beam sweep purpose by detecting that a reference signal is scheduled on a same symbol of multiple CCs, instead of the reference signal being scheduled in different symbols for different CCs (for example, each CC) of the multiple CCs, which may prompt the UE to measure the reference signal for the multiple CCs. Additionally or alternatively, the UE may receive an explicit signal from the base station indicating a beam sweep purpose. For example, a reference signal configuration signal may identify the multiple CCs instead of a single CC, which may indicate that the UE is to train the shared beam. Accordingly, the UE may perform the beam training including measuring the reference signal for the multiple CCs, and based on the reference signal measurements, may determine which shared receive beam or which shared transmit beam to use for subsequent communications over the group of CCs. Such operations may improve (for example, result in fewer missed CCs when communicating with) the shared receive beam or the shared transmit beam (or both) for concurrent communications on multiple CCs.

Additionally, the base station may aid the UE in determining an optimized UE shared beam, such as a refined (for example, trained) UE shared transmit beam through a procedure such as a beam training procedure or a refinement procedure. For example, as part of the beam training procedure, the base station may schedule the UE to concurrently transmit (for example, over a first symbol), via an uplink transmit beam, a reference signal on multiple CCs over a first duration, and concurrently transmit (for example, over at least a second symbol of the multiple CCs), via a second (for example, different) uplink transmit beam, the reference signal on the multiple CCs over an additional duration, or transmit different instances of the reference signal over multiple additional durations. The base station may measure the reference signal for the multiple CCs on the first transmit beam and the second transmit beam in the corresponding durations (for example, in each of the first duration and the additional duration). Based on the reference signal measured in each of the multiple CCs using the respective beams, the base station may determine which beam is most suitable for communicating using the multiple CCs (for example, communicating using the multiple CCs of the group). For example, the base station may determine or select a suitable beam based on the beam training procedure (for example, a refinement procedure), which may also be referred to as a refined beam, and may indicate the refined beam to the UE. The UE may use the indicated refined beam for future communications on at least some, if not all, of the multiple CCs (for example, simultaneously or concurrently), among other benefits.

One innovative aspect of the subject matter described in this disclosure can be implemented in a method for wireless communication at a UE. The method includes receiving, via a first receive beam, a first reference signal on a set of component carriers during a first symbol, receiving, via a second receive beam, a second reference signal on the set of component carriers during a second symbol, determining a value of a parameter for each of the first receive beam and the second receive beam based on receiving the first reference signal and the second reference signal, selecting a receive beam from the first receive beam or the second receive beam for subsequent communication on at least one of the set of component carriers based on the determined values of the parameter, and communicating on the at least one of the set of component carriers using the selected receive beam.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, via a first receive beam, a first reference signal on a set of component carriers during a first symbol, receive, via a second receive beam, a second reference signal on the set of component carriers during a second symbol, determine a value of a parameter for each of the first receive beam and the second receive beam based on receiving the first reference signal and the second reference signal, select a receive beam from the first receive beam or the second receive beam for subsequent communication on at least one of the set of component carriers based on the determined values of the parameter, and communicate on the at least one of the set of component carriers using the selected receive beam.

Another innovative aspect of the subject matter described in this disclosure can be implemented in an apparatus for wireless communications at a UE. The apparatus may include means for receiving, via a first receive beam, a first reference signal on a set of component carriers during a first symbol, receiving, via a second receive beam, a second reference signal on the set of component carriers during a second symbol, determining a value of a parameter for each of the first receive beam and the second receive beam based on receiving the first reference signal and the second reference signal, selecting a receive beam from the first receive beam or the second receive beam for subsequent communication on at least one of the set of component carriers based on the determined values of the parameter, and communicating on the at least one of the set of component carriers using the selected receive beam.

Another innovative aspect of the subject matter described in this disclosure can be implemented in a non-transitory computer-readable medium storing code for wireless communications at a UE. The code may include instructions executable by a processor to receive, via a first receive beam, a first reference signal on a set of component carriers during a first symbol, receive, via a second receive beam, a second reference signal on the set of component carriers during a second symbol, determine a value of a parameter for each of the first receive beam and the second receive beam based on receiving the first reference signal and the second reference signal, select a receive beam from the first receive beam or the second receive beam for subsequent communication on at least one of the set of component carriers based on the determined values of the parameter, and communicate on the at least one of the set of component carriers using the selected receive beam.

One innovative aspect of the subject matter described in this disclosure can be implemented in a method for wireless communication at a base station. The method includes transmitting, via a transmit beam, a first reference signal on a set of component carriers during a first symbol, transmitting, via the transmit beam, a second reference signal on the set of component carriers during a second symbol, the first reference signal and the second reference signal for training a receive beam of a set of receive beams at a UE for subsequent communication on at least one of the set of component carriers, and communicating on the at least one of the set of component carriers with the UE.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to transmit, via a transmit beam, a first reference signal on a set of component carriers during a first symbol, transmit, via the transmit beam, a second reference signal on the set of component carriers during a second symbol, the first reference signal and the second reference signal for training a receive beam of a set of receive beams at a UE for subsequent communication on at least one of the set of component carriers, and communicate on the at least one of the set of component carriers with the UE.

Another innovative aspect of the subject matter described in this disclosure can be implemented in an apparatus for wireless communications at a base station. The apparatus may include means for transmitting, via a transmit beam, a first reference signal on a set of component carriers during a first symbol, transmitting, via the transmit beam, a second reference signal on the set of component carriers during a second symbol, the first reference signal and the second reference signal for training a receive beam of a set of receive beams at a UE for subsequent communication on at least one of the set of component carriers, and communicating on the at least one of the set of component carriers with the UE.

Another innovative aspect of the subject matter described in this disclosure can be implemented in a non-transitory computer-readable medium storing code for wireless communications at a base station. The code may include instructions executable by a processor to transmit, via a transmit beam, a first reference signal on a set of component carriers during a first symbol, transmit, via the transmit beam, a second reference signal on the set of component carriers during a second symbol, the first reference signal and the second reference signal for training a receive beam of a set of receive beams at a UE for subsequent communication on at least one of the set of component carriers, and communicate on the at least one of the set of component carriers with the UE.

One innovative aspect of the subject matter described in this disclosure can be implemented in a method for wireless communication at a UE. The method includes transmitting, via a first transmit beam, a first reference signal on a set of component carriers during a first symbol, transmitting, via a second transmit beam, a second reference signal on the set of component carriers during a second symbol, receiving an indication of a transmit beam of a plurality of transmit beams for subsequent communication on at least one of the set of component carriers based on transmitting the first reference signal via the first transmit beam and the second reference signal via the second transmit beam, and communicating on the at least one of the set of component carriers using the indicated transmit beam.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to transmit, via a first transmit beam, a first reference signal on a set of component carriers during a first symbol, transmit, via a second transmit beam, a second reference signal on the set of component carriers during a second symbol, receive an indication of a transmit beam of a plurality of transmit beams for subsequent communication on at least one of the set of component carriers based on transmitting the first reference signal via the first transmit beam and the second reference signal via the second transmit beam, and communicate on the at least one of the set of component carriers using the indicated transmit beam.

Another innovative aspect of the subject matter described in this disclosure can be implemented in an apparatus for wireless communications at a UE. The apparatus may include means for transmitting, via a first transmit beam, a first reference signal on a set of component carriers during a first symbol, transmitting, via a second transmit beam, a second reference signal on the set of component carriers during a second symbol, receiving an indication of a transmit beam of a plurality of transmit beams for subsequent communication on at least one of the set of component carriers based on transmitting the first reference signal via the first transmit beam and the second reference signal via the second transmit beam, and communicating on the at least one of the set of component carriers using the indicated transmit beam.

Another innovative aspect of the subject matter described in this disclosure can be implemented in a non-transitory computer-readable medium storing code for wireless communications at a UE. The code may include instructions executable by a processor to transmit, via a first transmit beam, a first reference signal on a set of component carriers during a first symbol, transmit, via a second transmit beam, a second reference signal on the set of component carriers during a second symbol, receive an indication of a transmit beam of a plurality of transmit beams for subsequent communication on at least one of the set of component carriers based on transmitting the first reference signal via the first transmit beam and the second reference signal via the second transmit beam, and communicate on the at least one of the set of component carriers using the indicated transmit beam.

One innovative aspect of the subject matter described in this disclosure can be implemented in a method for wireless communication at a base station. The method includes receiving, via a receive beam, a first reference signal on a set of component carriers during a first symbol from a first transmit beam of a UE, receiving, via the receive beam, a second reference signal on the set of component carriers during a second symbol from a second transmit beam of the UE, determining a value of a parameter for each of the first transmit beam and the second transmit beam based on receiving the first reference signal and the second reference signal, selecting a transmit beam from the first transmit beam or the second transmit beam for subsequent communication on at least one of the set of component carriers based at least in part the determined values of the parameter, transmitting an indication of the transmit beam based on selecting the transmit beam, and communicating on the at least one of the set of component carriers with the UE.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to receive, via a receive beam, a first reference signal on a set of component carriers during a first symbol from a first transmit beam of a UE, receive, via the receive beam, a second reference signal on the set of component carriers during a second symbol from a second transmit beam of the UE, determine a value of a parameter for each of the first transmit beam and the second transmit beam based on receiving the first reference signal and the second reference signal, select a transmit beam from the first transmit beam or the second transmit beam for subsequent communication on at least one of the set of component carriers based at least in part the determined values of the parameter, transmit an indication of the transmit beam based on selecting the transmit beam, and communicate on the at least one of the set of component carriers with the UE.

Another innovative aspect of the subject matter described in this disclosure can be implemented in an apparatus for wireless communications at a base station. The apparatus may include means for receiving, via a receive beam, a first reference signal on a set of component carriers during a first symbol from a first transmit beam of a UE, receiving, via the receive beam, a second reference signal on the set of component carriers during a second symbol from a second transmit beam of the UE, determining a value of a parameter for each of the first transmit beam and the second transmit beam based on receiving the first reference signal and the second reference signal, selecting a transmit beam from the first transmit beam or the second transmit beam for subsequent communication on at least one of the set of component carriers based at least in part the determined values of the parameter, transmitting an indication of the transmit beam based on selecting the transmit beam, and communicating on the at least one of the set of component carriers with the UE.

Another innovative aspect of the subject matter described in this disclosure can be implemented in a non-transitory computer-readable medium storing code for wireless communications at a base station. The code may include instructions executable by a processor to receive, via a receive beam, a first reference signal on a set of component carriers during a first symbol from a first transmit beam of a UE, receive, via the receive beam, a second reference signal on the set of component carriers during a second symbol from a second transmit beam of the UE, determine a value of a parameter for each of the first transmit beam and the second transmit beam based on receiving the first reference signal and the second reference signal, select a transmit beam from the first transmit beam or the second transmit beam for subsequent communication on at least one of the set of component carriers based at least in part the determined values of the parameter, transmit an indication of the transmit beam based on selecting the transmit beam, and communicate on the at least one of the set of component carriers with the UE.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

Like reference numbers and designations in the various drawings indicate like elements.

DETAILED DESCRIPTION

Figure 1:
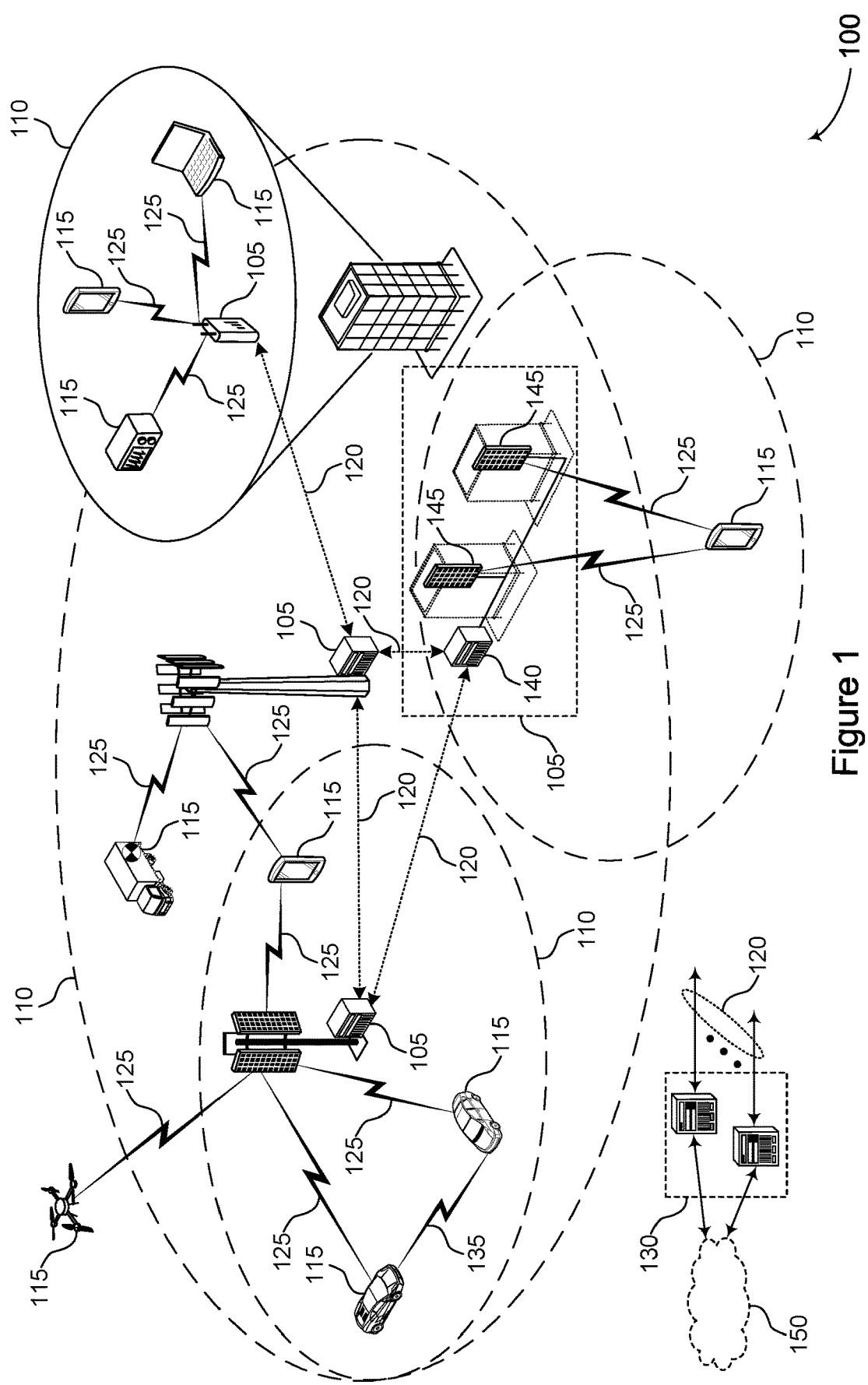
FIG. 1 shows an example of a wireless communications system that supports common beam training for a group of component carriers in accordance with aspects of the present disclosure.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO.

In some aspects, a wireless device such as a user equipment (UE) or a base station may use reference signals to determine a suitable receive beam or a suitable transmit beam to use for communications between the base station and the UE. For example, the UE may use information, such as a synchronization signal block (SSB), to select a relatively wide beam to capture the angle of incoming signal power from a base station. The UE may determine an adjusted beam for data transmission using a reference signal, for example, using a channel state information reference signal (CSI-RS) and may adjust the relatively wide beam accordingly. This beam adjustment may be performed by the UE and may include sweeping a set of relatively narrow beams, for example, relatively narrow beams within the previously-selected and relatively-wide beam, to measure the reference signal on each beam. In some examples, a beam sweep for beam adjustment using the reference signal, such as the CSI-RS, may be performed for each component carrier (CC) of a group of CCs. For example, a base station may transmit a CSI-RS, via a same base station transmit beam in consecutive durations, such as consecutive slots or symbols, and the UE may test different beams throughout the beam sweep. According to other different techniques, an adjusted beam (for example, the beam determined by the beam sweep) is CC-specific. However, different CCs may share the same selected beam (for example, wide beam), but the different CCs may have different adjusted narrow beams.

A transmission configuration indicator (TCI) state may be used, for example, in a millimeter wave (mmW) system, to refer to a downlink transmit beam. In some examples, the TCI state may be CC-specific. Each CC may correspond to one or more TCI states identifiers (IDs) of a set of individual TCI state IDs (for example, that may comprise a set of TCI state IDs). A base station or a transmission reception point (TRP) may use a medium access control-control element (MAC-CE), among other examples, to activate a TCI state at a UE using an indication of a TCI state ID. In some examples, each CC may respectively correspond to an activated TCI state. In some other examples, TCI state IDs for a channel, such as a physical downlink shared channel (PDSCH), may be activated by a MAC-CE for a set of CCs or bandwidth parts (BWPs). For example, the MAC-CE may activate a TCI state ID for at least a subset of the set of CCs or BWPs of the PDSCH in the same frequency band (for example, the 28 GHz band), such that neighboring CCs of the PDSCH in the same frequency band may all use the same TCI state ID for all of the BWPs in the indicated neighboring CCs. The same TCI state ID may be used by the neighboring CCs because the neighboring CCs may be correlated and would have similar physical characteristics such that the single downlink transmit beam corresponding to the TCI state ID would result in similar signal power for each of the neighboring CCs. The set of CCs in the same frequency band may be indicated to the UE prior to receiving the MAC-CE. For example, the applicable set of CCs may be indicated to the UE by radio resource control (RRC) signaling. In some examples, the UE may be configured by RRC signaling with one or more sets (for example, up to two sets of CCs). In such examples, the set of CCs applied by the UE may be determined by the indicated CC(s) in the MAC-CE.

Similar to a TCI state, a spatial relation may be used to refer to an uplink receive beam and may also be CC-specific. Each CC may correspond to individual spatial relation information. A base station or a TRP may use a MAC-CE to activate spatial relation information for a semi-persistent transmission or an aperiodic transmission of a sounding reference signal (SRS) by a UE. The MAC-CE may include an indication of the spatial relation information to be used by the receiving base station. In some examples, spatial relation information may be activated for an SRS resource by a MAC-CE for a set of CCs or BWPs. For example, the MAC-CE may activate spatial relation information for at least a subset of the set of CCs or BWPs of the SRS transmission in the same frequency band, such that neighboring CCs of the SRS transmission in the same frequency band may all use the same spatial relation information for all of the BWPs in the indicated neighboring CCs. In some examples, the spatial relation information may be applied to the SRS resource(s) with the same SRS resource ID for all of the BWPs in the indicated CCs. The set of CCs in the same frequency band may be indicated to the UE prior to receiving the MAC-CE. For example, the applicable set of CCs may be indicated to the UE by RRC signaling. In some examples, the UE may be configured by RRC signaling with up to two sets of CCs. In some such examples, the set applied by the UE may be determined by the indicated CC(s) in the MAC-CE.

In some existing wireless communications systems, the capabilities of the UE may determine how the UE receives a downlink transmission from a base station via a common TCI state beam on multiple CCs. For example, the UE may have a sufficient quantity of RF chains such that each CC of the multiple CCs used for the downlink transmission may have an assigned RF chain. Accordingly, the quantity of RF chains for receiving the transmission may be greater than or equal to the quantity of CCs transmitted by the base station. As a result, the UE may receive each CC on a refined beam (for example, a beam selected based on a beam training procedure) using the respective RF chain.

In some other examples, reception capabilities of the UE may be limited by the quantity of RF chains at the UE. For example, the UE may have an insufficient quantity of RF chains such that two or more CCs of the multiple CCs used for the downlink transmission may be configured to share an assigned RF chain (the quantity of RF chains for receiving the transmission may be less than the quantity of CCs transmitted by the base station). The two or more CCs may be received or transmitted using a same beam using a same spatial filter and a same analog beamformer. As a result, two or more CCs may be received on a single shared refined beam (for example, a beam selected based on a beam training procedure) using the shared assigned RF chain. With some existing techniques, however, a shared beam may be adjusted for an individual CC and not for each of the two or more CCs sharing the beam. Such adjustment may lead to the individual CC, which the beam is adjusted for, being received successfully, while the other CC(s) sharing the beam, which the beam is not adjusted for, are not received successfully.

Various aspects relate generally to the improvement of a UE shared receive beam or a UE shared transmit beam for two or more CCs in a group that share an RF chain, instead of adjusting a shared beam for a single one of the CCs of the group and disregarding the other CCs. Some implementations relate to receiving or transmitting a reference signal concurrently on a group of CCs via a receive beam or a transmit beam. In some implementations, a UE may receive a reference signal concurrently on a group of CCs via a first receive beam over a first duration. For example, a base station may transmit a reference signal, such as a CSI-RS, on multiple CCs concurrently over a first duration (such as a slot or a symbol) on a transmit beam. The base station also may transmit the reference signal (for example, may repeat the transmission of the CSI-RS) on the same CCs concurrently over one or more additional durations (such as one or more additional slots or one or more additional symbols) on the same transmit beam such that the UE may receive the reference signal concurrently on the group of CCs via a second receive beam over an additional duration. The UE may then measure, for each of the receive beams in the first and additional duration, a value based on receiving the reference signal concurrently on the group of CCs on the respective beam. The UE may then generate a refined beam based on the measured values associated with each of the receive beams in the first and additional duration. In some UE transmit beam training implementations, the base station may schedule the UE to transmit a reference signal, such as an SRS, on multiple CCs concurrently over a first duration (such as a slot or a symbol) on a first transmit beam and to transmit the reference signal (for example, repeat the transmission of the SRS) on the same CCs concurrently over one or more additional durations (such as one or more slots or one or more symbols) on the different UE transmit beams such that the base station may receive and measure the reference signal of the different UE transmit beams in multiple durations (for example, in each duration). In this way, the base station may determine a refined UE transmit beam for transmitting the multiple CCs concurrently in future communications. The base station may then indicate the refined UE transmit beam to the UE. For example, the base station may indicate an index of a reference signal (such as an SRS) resource (for example, a symbol quantity) used in a reference signal sweep to indicate the refined UE transmit beam. For example, the indication may indicate that the second swept beam is suitable for some quantity of CCs (for example, for all CCs). The UE may then use the indicated refined UE transmit beam for subsequent communications on at least some, if not all, of the multiple CCs simultaneously. By performing the described beam sweep procedure, the UE may determine or select, or may be indicated with a receive beam (for example, a refined beam) for receiving the multiple CCs concurrently in future communications.

Similarly, a UE may concurrently transmit to a base station a reference signal on a group of CCs via a transmit beam over a first duration. The UE may concurrently transmit to the base station the reference signal on the group of CCs via a second transmit beam over an additional duration. The base station may then measure a value based on receiving the reference signal concurrently on the group of CCs via a different UE transmit beam in each of the different durations. The base station may then indicate to the UE which transmit beam to use for subsequent communications involving the group of CCs.

In some examples, the base station may inform the UE of the beam sweep procedure, for example, by transmitting an indication that the beam sweep procedure may be used to improve a UE shared receive beam for two or more CCs. Additionally or alternatively, the UE may be configured to identify that a purpose of the beam sweep procedure is for improvement of a shared beam for multiple CCs based on one or more rules or one or more signals. In some examples, a rule may implicitly indicate that if the UE receives a reference signal, such as a CSI-RS scheduled on a same symbol of multiple CCs, then the purpose of the reference signal is for improving the shared beam for multiple CCs. In some other examples, the base station may transmit such signaling to identify that a beam sweep procedure is to be performed. The signaling may include the use of multiple CC IDs or a group ID of the multiple CCs as opposed to a specific CC ID in the reference signal configuration. In such examples, the UE may determine that a reference signal, such as a CSI-RS, may be for training a shared beam if the reference signal is scheduled with one of these different CC ID formats (such as, multiple CC IDs or the group ID of the multiple CCs).

Particular implementations of the subject matter described in this disclosure can be implemented to realize one or more of the following potential advantages. In some implementations, the described techniques can be used to improve communication reliability and efficacy over a group of CCs that share a transmit or receive beam. For example, a UE may improve signal quality for the group of CCs (for example, as a whole) that share an RF chain, in contrast to focusing on improving the signal quality of a single CC in the group of CCs while failing to account for, or possibly diminishing, the quality of one or more other CCs in the group. Some other advantages provided by performing the beam training procedure presently described may include, increased data rates, increased capacity, fewer missed CCs, greater spectral efficiency, and higher reliability at the UE or the base station or both.

Aspects of the disclosure are initially described in the context of wireless communications systems. Aspects of the disclosure are further described in the context of one or more additional wireless communications systems, a UE processing configuration, and multiple process flows that relate to aspects for common beam training for a group of CCs. Aspects of the disclosure are further illustrated by and described with reference to apparatus diagrams, system diagrams, and flowcharts that relate to common beam training for a group of component carriers.

FIG. 1 illustrates an example of a wireless communications system 100 that supports common beam training for a group of component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or another interface). The base stations 105 may communicate with one another over the backhaul links 120 (for example, via an X2, Xn, or other interface) either directly (for example, directly between the base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel quantity (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include the base stations 105 or the UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame quantity (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a quantity of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, the UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, the base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitter via different antennas or different combinations of antennas. Likewise, the multiple signals may be received by the receiver via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiver, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitter or a receiver (for example, a base station 105, a UE 115) to shape or steer an antenna beam (for example, a transmit beam, a receive beam) along a spatial path between the transmitter and the receiver. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitter or a receiver applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitter or receiver, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitter, such as a base station 105, or by a receiver, such as a UE 115) a beam direction for later transmission or reception by the base station 105.

Some signals, such as data signals associated with a particular receiver, may be transmitted by a base station 105 in a single beam direction (for example, a direction associated with the receiver, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiver).

A receiver (for example, a UE 115) may try multiple receive configurations (for example, directional listening) if receiving various signals from the base station 105, such as synchronization signals, reference signals, beam selection signals, or other control signals. For example, a receiver may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiver may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

As described, a wireless communications system 100 may support beamforming techniques and carrier aggregation, which may improve the spectral efficiency of the wireless communications system 100 by providing a better SNR for communicating wireless devices. A UE 115 may train a respective transmit and receive beam for specific a component carrier to provide an optimized signal quality for that component carrier. Although beamforming and carrier aggregation may improve spectrum usage, the UE 115 beamforming capabilities may cause communications involving beamforming and carrier aggregation to be challenging due to the hardware demands for concurrently receiving and transmitting beamformed signals on a group of component carriers. For example, a UE 115 may be configured with a quantity of RF chains, and the quantity of RF chains at the UE 115 may determine the limit of the quantity of concurrent communications the UE 115 may perform. Each concurrent communication may use a different RF chain, such that the UE 115 may communicate concurrently on the quantity of beams equal to the quantity of configured RF chains. In some cases, the UE 115 may share a beam for concurrent communication on a group of CCs, however, the shared beam may not be refined for the group of CCs due to other different beam training. In some cases, the other different beam training may be limited to training a beam on a CC-basis such that each beam is refined for a single component carrier, and different CCs may have different beams.

Various implementations relate generally to the training of a shared beam for concurrent communication on multiple CCs using a UE 115 with limited capabilities, for example, a UE 115 with insufficient RF chains to receive each CC of the group of CCs on a unique UE 115 receive beam. In some examples, a shared beam may refer to a shared spatial filter or analog beamformer. In some implementations, a UE 115 may use a beam sweeping procedure to train a shared receive beam. In some examples, a base station 105 may concurrently transmit, via a downlink transmit beam, a reference signal on the group of CCs over a first duration and retransmit the reference signal on the group of CCs over a number of additional durations. Thus, the UE 115 may measure the reference signal for the group of CCs on a different receive beam in each duration. In some examples, the base station 105 may indicate to the UE 115 that the purpose of a beam sweep procedure is to train a shared beam. Accordingly, the UE 115 may improve a shared receive or transmit beam for concurrent communications on the group of CCs.

Additionally, the base station 105 may assist the UE 115 in determining a refined UE 115 transmit beam. For example, the base station 105 may schedule the UE 115 to concurrently transmit, via an uplink transmit beam, a reference signal on the group of CCs over a first duration and retransmit the reference signal on the group of CCs over additional durations. The base station 105 may perform measurements on the reference signal for the group of CCs on the different transmit beams in each duration. The base station 105 may then determine a refined beam and indicate the refined beam to the UE 115. The UE 115 may use the indicated beam for future communications on the group of CCs.

Particular implementations of the subject matter described in this disclosure can be implemented to realize one or more of the following potential advantages. In some implementations, the described techniques can be used to improve communication reliability over a group of CCs that share a transmit or receive beam. In some examples, the UE 115 may improve signal quality for the group of CCs (as a whole) that share an RF chain, which improves upon previous methods that focused on the quality of an individual CC in the group of CCs, which, as described, may result in reducing the quality of a different CC in the group.

Figure 2:
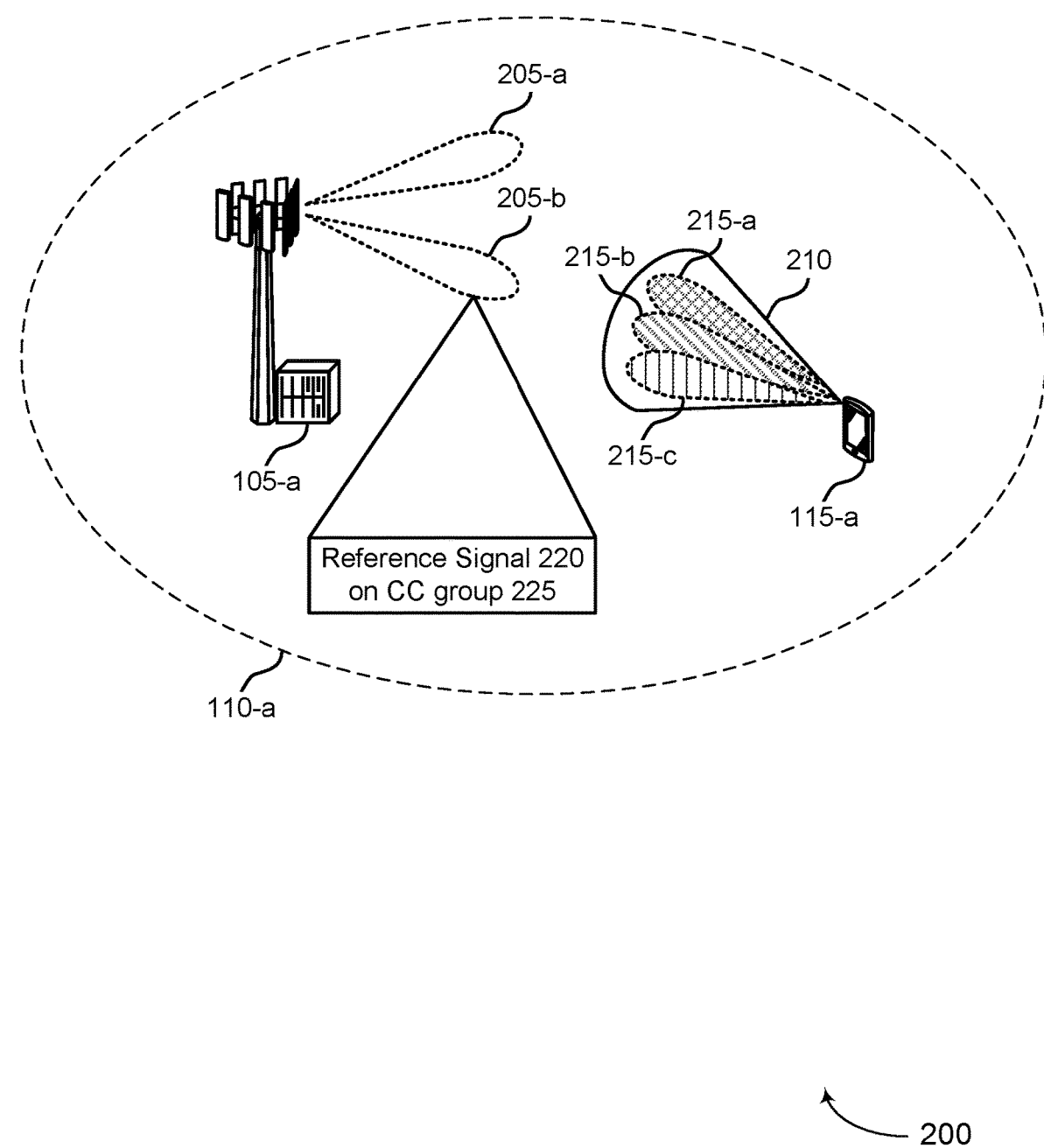
FIG. 2 shows an example of a wireless communications system that supports common beam training for a group of component carriers in accordance with aspects of the present disclosure.

FIG. 2 illustrates an example of a wireless communications system 200 that supports common beam training for a group of CCs in accordance with aspects of the present disclosure. In some examples, the wireless communications system 200 may implement aspects of wireless communications system 100. Wireless communications system 200 may include a UE 115-*a* and a base station 105-*a* within coverage area 110-*a*, which may be examples of the UE 115 and the base station 105 as described with reference to FIG. 1. In some examples, the UE 115-*a* may have fewer RF chains than the number of CCs to be received or transmitted. In some such examples, two or more CCs may be received or transmitted from the same shared beam (for example, beam 215) using the same spatial filter and analog beamformer. As described, some aspects relate to improving the shared beam 215 for the two or more CCs sharing the beam. As further described, different beam training techniques may be used for the UE 115-*a* to train a receive or a transmit beam 210 or 215.

A TCI state may be used in the wireless communications system 200 to refer to a downlink transmit beam 205. In some examples, the TCI state may be CC-specific. Each CC may correspond to a set of individual TCI state IDs. In some implementations, the base station 105-*a* may use a MAC-CE to activate a TCI state at a UE 115-*a* using an indication of a TCI ID. In some examples, a TCI state ID for a PDSCH may be activated by a MAC-CE for a group of CCs or BWPs within the same frequency band. For example, the MAC-CE may activate a TCI state ID for at least a subset of the set of CCs or BWPs of the PDSCH in the same frequency band (for example, the 28 GHz band), such that neighboring CCs of the PDSCH in the same frequency band may all use the same TCI state ID for all of the BWPs in the indicated neighboring CCs. The same TCI state ID may be applied to all of the BWPs in the indicated group of CCs. The set of CCs in the same frequency band may be indicated to the UE 115-*a* prior to receiving the MAC-CE. For example, the applicable set of CCs may be indicated to the UE 115-*a* via RRC signaling from the base station 105-*a*. In some examples, the UE 115-*a* may be configured by RRC signaling with up to two sets of CCs. In some such examples, the set of CCs applied by the UE 115-*a* may be determined by the indicated CC ID(s) in the MAC-CE. The UE 115-*a* may expect no overlapping CCs in multiple RRC configured sets of CCs.

Similar to a TCI state, a spatial relation may be used to refer to an uplink receive beam 205 and may also be CC-specific. Each CC may correspond to individual spatial relation information. The base station 105-*a* may use a MAC-CE to activate spatial relation information for a semi-persistent or aperiodic transmission of an SRS by the UE 115-*a*. The MAC-CE may include an indication of the spatial relation information to be used by the receiving base station. In some examples, spatial relation information may be activated for an SRS resource by a MAC-CE for a group of CCs or BWPs. For example, the MAC-CE may activate spatial relation information for at least a subset of the set of CCs or BWPs of the SRS transmission in the same frequency band, such that neighboring CCs of the SRS transmission in the same frequency band may all use the same spatial relation information for all of the BWPs in the indicated neighboring CCs. In some examples, the spatial relation information may be applied to the SRS resource(s) with the same SRS resource ID for all of the BWPs in the indicated group of CCs. The set of CCs in the same frequency band may be indicated to the UE 115-*a* prior to receiving the MAC-CE. For example, the applicable set of CCs may be indicated to the UE 115-*a* via RRC signaling. In some examples, the UE 115-*a* may be configured by RRC signaling with up to two sets of CCs. In some such examples, the set applied by the UE 115-*a* may be determined by the indicated CC ID(s) in the MAC-CE. The UE 115-*a* may expect no overlapped CCs in multiple RRC configured sets of CCs. These configured CC sets are independent from those sets for simultaneous TCI state activation.

As part of cell synchronization, the base station 105-*a* may transmit an SSB sweep on transmit beams 205-*a* and 205-*b* that allows for coarse training of the UE 115-*a* receive beam 210. The UE 115-*a* may use a receive beam 210, which may be a wide beam, to roughly capture the angle of the incoming signal power of the SSB from the base station 105-*a*. Additionally, the UE 115-*a* may further improve the receive beam 210 for data transmission using a reference signal 220, for example CSI-RS. For example, the UE 115-*a* may sweep a CSI-RS transmission on the transmit beam 205-*b* of the base station 105-*a* in which the base station 105-*a* may transmit the CSI-RS via the same transmit beam 205-*b* in consecutive durations (for example, slots or symbols).

In some implementations, the UE 115-*a* may receive, from the base station transmit beam 205-*b*, a reference signal 220 concurrently on a group of CCs 225 via a receive beam 215-*a* over a first duration. A second reference signal 220 may be concurrently transmitted on a group of CCs 225 from the transmit beam 205-*b* and concurrently received via a receive beam 215-*b* over a second duration. Also, a third reference signal 220 may be concurrently transmitted on a group of CCs 225 from the transmit beam 205-*b* and concurrently received via a receive beam 215-*c* over a third duration. Although two transmit beams 205 and three receive beams 215 are shown in FIG. 2, the reference signal 220 may be transmitted and received over more or fewer beams in various example beam sweep procedures. Additionally, although three durations are described, the reference signal 220 may be transmitted over more or fewer durations. The multiple durations may allow the UE 115-*a* to measure the reference signal 220 concurrently on the group of CCs 225 on a different receive beam 215 in each duration. The UE 115-*a* may then select a receive beam 215 (also referred to herein as a "refined beam") for joint reception of the group of CCs. The receive beam 215 may be selected from the receive beams 215-*a*, 215-*b*, and 215-*c* via which the reference signal 220 was received. The receive beam 215 may be selected based on a determined parameter value and may be more refined than the receive beam 210, which may enable better reception quality than the receive beam 210. The selected receive beam 215 for the group of CCs 225 may share an RF chain and an analog beamformer for receiving subsequent concurrent communications on the group of CCs 225.

In some implementations, the UE 115-*a* may train a transmit beam 215. For example, the base station 105-*a* may schedule the UE 115-*a* to concurrently transmit to the base station 105-*a* a reference signal 220 (for example, an SRS) on a group of CCs 225 via a first transmit beam 215-*a* over a first duration. A second reference signal 220 may be concurrently transmitted on a group of CCs 225 from the transmit beam 215-*b* and concurrently received via the receive beam 205-*b* over a second duration. Also, a third reference signal 220 may be concurrently transmitted on a group of CCs 225 from the transmit beam 205-*c* and concurrently received via the receive beam 205-*b* over a third duration. As similarly described, the reference signal 220 may be transmitted and received over more or fewer beams and over more or fewer durations. Each duration may allow the base station 105-*a* to measure the reference signal 220 concurrently on the group of CCs 225 via a different respective UE transmit beam 215. The base station 105-*a* may indicate to the UE 115-*a* which transmit beam 215 to use for subsequent communications using the group of CCs 225. For example, the base station 105-*a* may indicate an index of the reference signal 220 resource, for example, a symbol quantity, used in the reference signal sweep to indicate the determined refined transmit beam 215. For example, the indication may indicate that the second swept beam 215-*b* is suitable for all CCs in the group of CCs 225. The UE 115-*a* may use the indicated refined beam 215 for subsequent communications on the group of CCs 225.

In some examples, the UE 115-*a* may transmit a capability report to the base station 105-*a* that includes an indication of the number of beams 215 that the UE 115-*a* may simultaneously form to receive different data streams. The quantity of beams 215 may be based on how many RF chains the UE 115-*a* has available. In some examples, the capability report may indicate if the UE 115-*a* has a sufficient quantity of RF chains or an insufficient quantity of RF chains for a scheduled communication using multiple CCs. The training of beam 210 of the UE 115-*a* may be based on the capability report, and more specifically, based on the UE 115-*a* having insufficient RF chains as determined by the UE 115-*a* or the base station 105-*a*.

In some examples, the base station 105-*a* may inform the UE 115-*a* that the beam sweep procedure may be used to improve a receive beam 215 for two or more CCs (for example, the group of CCs 225). The UE 115-*a* may be configured to identify that the purpose of the beam sweep is for improvement for the group of CCs 225 by rules or signaling. An example rule may specify or implicitly indicate to the UE 115-*a* that, if it receives a CSI-RS scheduled on the same symbol for multiple CCs, the purpose of the CSI-RS is to determine a refined beam 215 for the group of CCs 225. In some examples, the signaling in the CSI-RS configuration may include multiple CC IDs or a group ID of the group of CCs 225, instead of a specific CC ID. In some such examples, the UE 115-*a* may determine the CSI-RS is for training a shared beam 215 if the CSI-RS is scheduled with multiple CC IDs or a group ID.

In some implementations, the criterion or criteria used for the beam 215 improvement may be based on the reference signal receive power (RSRP) of the group of CCs 225 or the sum throughput of the group of CCs 225. In some examples, the UE 115-*a* may determine the improvement criteria.

Figure 3:
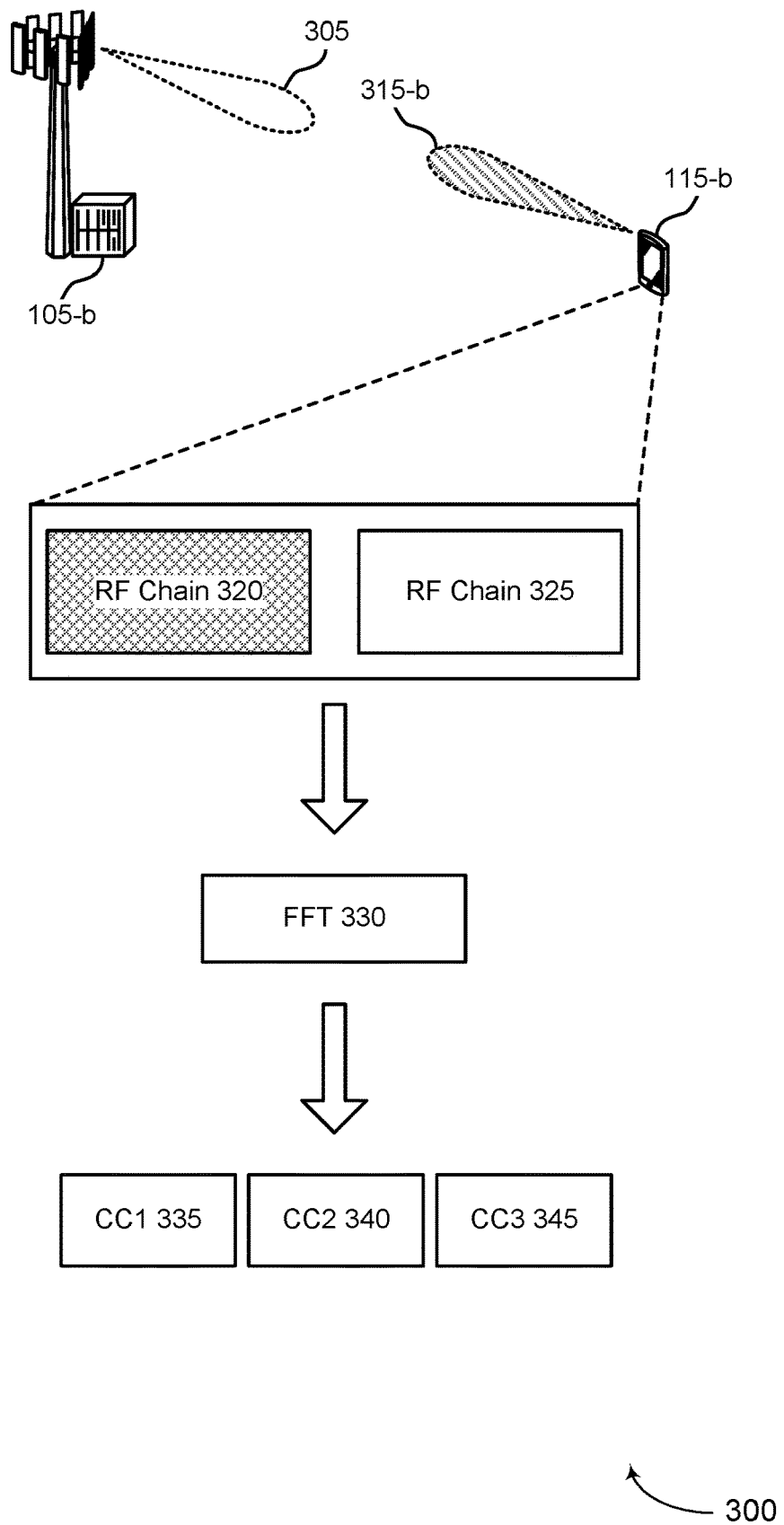
FIG. 3 shows an example of a UE processing configuration that supports common beam training for a group of component carriers in accordance with aspects of the present disclosure.

FIG. 3 illustrates an example of a UE processing configuration 300 that supports common beam training for a group of component carriers in accordance with aspects of the present disclosure. In some examples, the UE processing configuration 300 may implement aspects of wireless communications systems 100 and 200. The UE processing configuration 300 may include a UE 115-*b* and a base station 105-*b*, which may be examples of a UE 115 and a base station 105 as described with reference to FIGS. 1 and 2. In the illustrated example, the base station 105-*b* has selected the beam 305 and the UE 115-*b* is using the beam 315-*b* to communicate concurrently over the group of CCs.

As described, the UE 115-*a* may have an insufficient quantity of RF chains 320 and 325 available for concurrent communications over multiple CCs. For example, the RF chain 320 may be in use for a CC (not shown) at the same time as CC1 335, CC2 340, and CC3 345 are to be used. Accordingly, the UE 115-*b* may share RF chain 325 and an associated analog beamformer for communication on the group of component carriers including the CC1 335, CC2 340, and CC3 345. The beam 315-*b* may have been selected by the UE 115-*a* or the base station 105-*b* according to a beam sweep procedure, for example, as described with respect to FIG. 2.

The beam 315-*b* may be selected to improve the joint reception or transmission of the CC1 335, CC2 340, and CC3 345 as a group. For example, a different UE beam than the beam 315-*b* may be better configured for communicating on CC1 335 individually than the beam 315-*b*, but that different UE beam may be worse for communicating on the CC2 340 or CC3 345 individually than the beam 315-*b*. As such, the beam 315-*b* may be selected because it provides optimized signal quality for all of the CC1 335, CC2 340, and CC3 345 as a group. For example, a low RSRP may be achieved for all of the CC1 335, CC2 340, and CC3 345 as a group using the beam 315-*b*, or a high sum throughput may be achieved for all of the CC1 335, CC2 340, and CC3 345 as a group using the beam 315-*b*. In some implementations, the group of component carriers including CC1 335, CC2 340, and CC3 345 may be received or transmitted on a shared beam 315-*b* using a single RF chain 325 as well as the same spatial filter and the same analog beamformer. In some examples, the CC1 335, CC2 340, and CC3 345 transmitted or received on the shared beam 315-*b* may be processed as a group using a fast Fourier transform (FFT) 330 at the group level.

In some examples, the base station 105-*b* may inform the UE 115-*b* that the beam sweep procedure may be used to improve the receive beam 315-*b* for two or more CCs (for example, the group of the CC1 335, CC2 340, and CC3 345). The UE 115-*b* may be configured to identify that the purpose of the beam sweep is for improvement for the group of the CC1 335, CC2 340, and CC3 345 by rules or signaling. An example rule may specify or implicitly indicate to the UE 115-*b* that, if it receives a CSI-RS scheduled on the same symbol of the CC1 335, CC2 340, and CC3 345, that the purpose of determining a refined beam 315-*b* is for generating a shared beam for the CC1 335, CC2 340, and CC3 345. In some examples, example signaling may include the CC IDs of the CC1 335, CC2 340, and CC3 345 or a group ID of the group of the CC1 335, CC2 340, and CC3 345, in the CSI-RS or SRS configuration. In some such examples, the UE 115-*b* may determine the CSI-RS or SRS is for training a shared beam 315-*b* for the CC1 335, CC2 340, and CC3 345 if the CSI-RS or SRS is scheduled with one of these CC ID formats.

Figure 4:
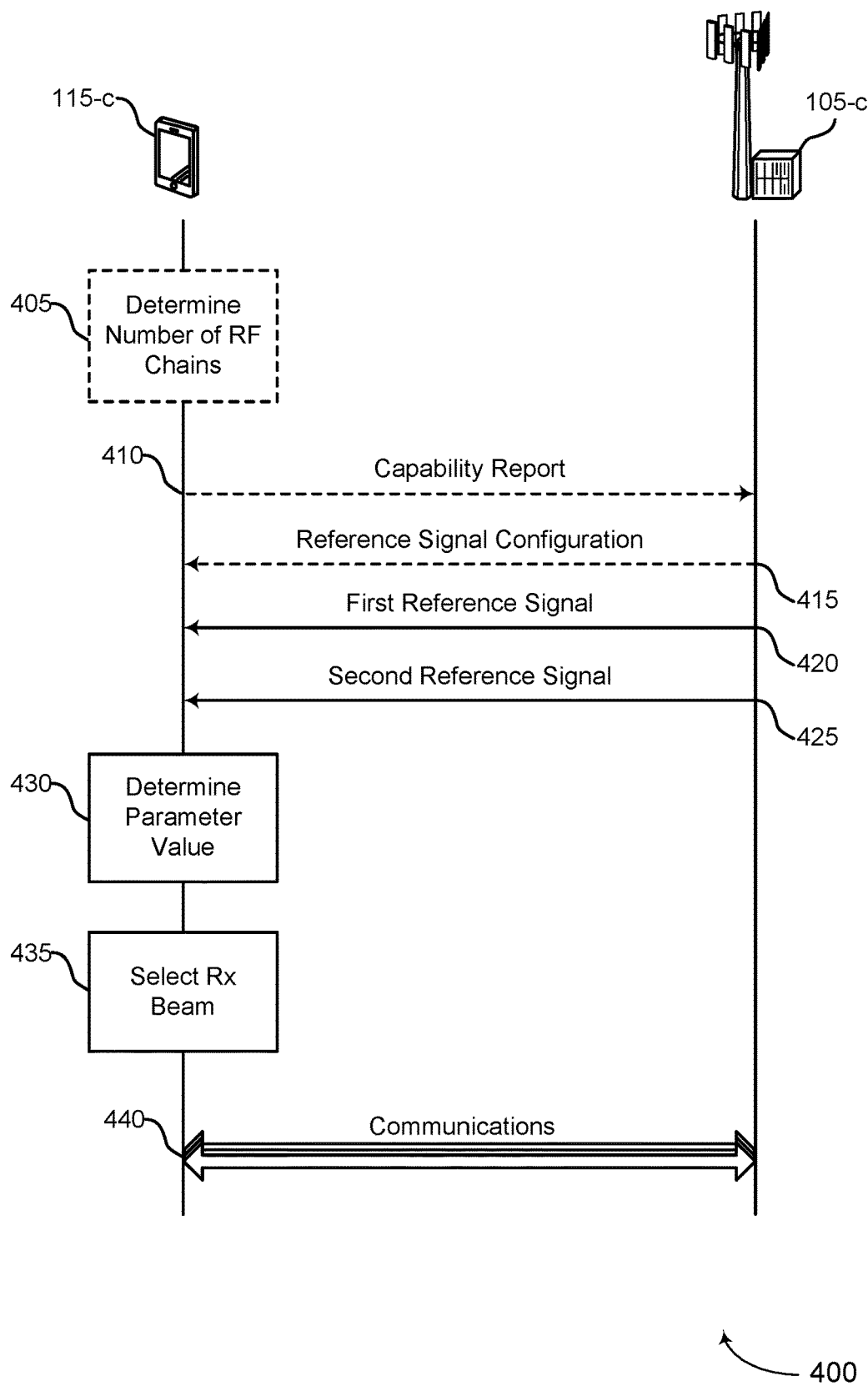
FIG. 4 shows an example of a process flow that supports common beam training for a group of component carriers in accordance with aspects of the present disclosure.

FIG. 4 illustrates an example of a process flow 400 that supports common beam training for a group of component carriers in accordance with aspects of the present disclosure. In some examples, the process flow 400 may be implemented by aspects of the wireless communications system 100 and 200. The process flow 400 may include a UE 115-*c* and a base station 105-*c*, which may be examples of a UE 115 and a base station 105 as described with reference to FIGS. 1-3. In some alternative examples of the process flow 400 as described, the information communicated between the UE 115-*c* and the base station 105-*c* may be communicated in a different order than the example order shown, or the operations performed by the UE 115-*c* and the base station 105-*c* may be performed in different orders or at different times. Some operations may also be omitted from the process flow 400, and other operations may be added to the process flow 400. In the example of FIG. 4, the UE 115-*c* and the base station 105-*c* may be in communication with each other via a mmW network.

At 405, the UE 115-*c* may determine that a scheduled group of component carriers is greater than a quantity of the UE 115-*c* radio frequency chains for receiving the group of component carriers.

At 410, the UE 115-*c* may transmit and the base station 105-*c* may receive a capability report. For example, the capability report may indicate a quantity of the UE 115-*c* radio frequency chains for concurrently receiving a set of data streams. In some examples, the capability report may indicate that the group of component carriers is greater than the quantity of the UE 115-*c* radio frequency chains for receiving the group of component carriers.

At 415, the base station 105-*c* may transmit and the UE 115-*c* may receive a reference signal configuration indicating the group of component carriers, for example the indication may include a set of component carrier identifiers or a group identifier of the group of component carriers. In some examples, the UE 115-*c* may determine (for example, implicitly or explicitly) a purpose of the first reference signal and the second reference signal based on receiving the reference signal configuration.

At 420, the base station 105-*c* may transmit, via a transmit beam, and the UE 115-*c* may receive, via a first receive beam, a first reference signal (for example, CSI-RS) on a group of component carriers over a first symbol. In some examples, the UE 115-*c* may receive the first reference signal on the group of component carriers concurrently over the first symbol.

At 425, the base station 105-*c* may transmit, via the transmit beam, and the UE 115-*c* may receive, via a second receive beam, a second reference signal (for example, CSI-RS) on the group of component carriers over a second symbol. In some examples, the UE 115-*c* may receive the second reference signal on the group of component carriers concurrently over the second symbol.

At 430, the UE 115-*c* may determine a value of a parameter for each of the first receive beam and the second receive beam based on receiving the first reference signal at 420 and the second reference signal at 425. In some examples, the UE 115-*c* may determine the value of the parameter for the group of component carriers of the first receive beam based on receiving the first reference signal on the group of component carriers concurrently over the first symbol at 420, and the UE 115-*c* may determine the value of the parameter for the group of component carriers of the second receive beam based on receiving the second reference signal on the group of component carriers concurrently over the second symbol at 425. The parameter may include one or more of reference signal received power, total throughput, or reference signal received quality.

At 435, the UE 115-*c* and the base station 105-*c* may communicate (for example, via uplink and downlink transmissions) over at least one of the group of component carriers using the selected receive beam.

Figure 5:
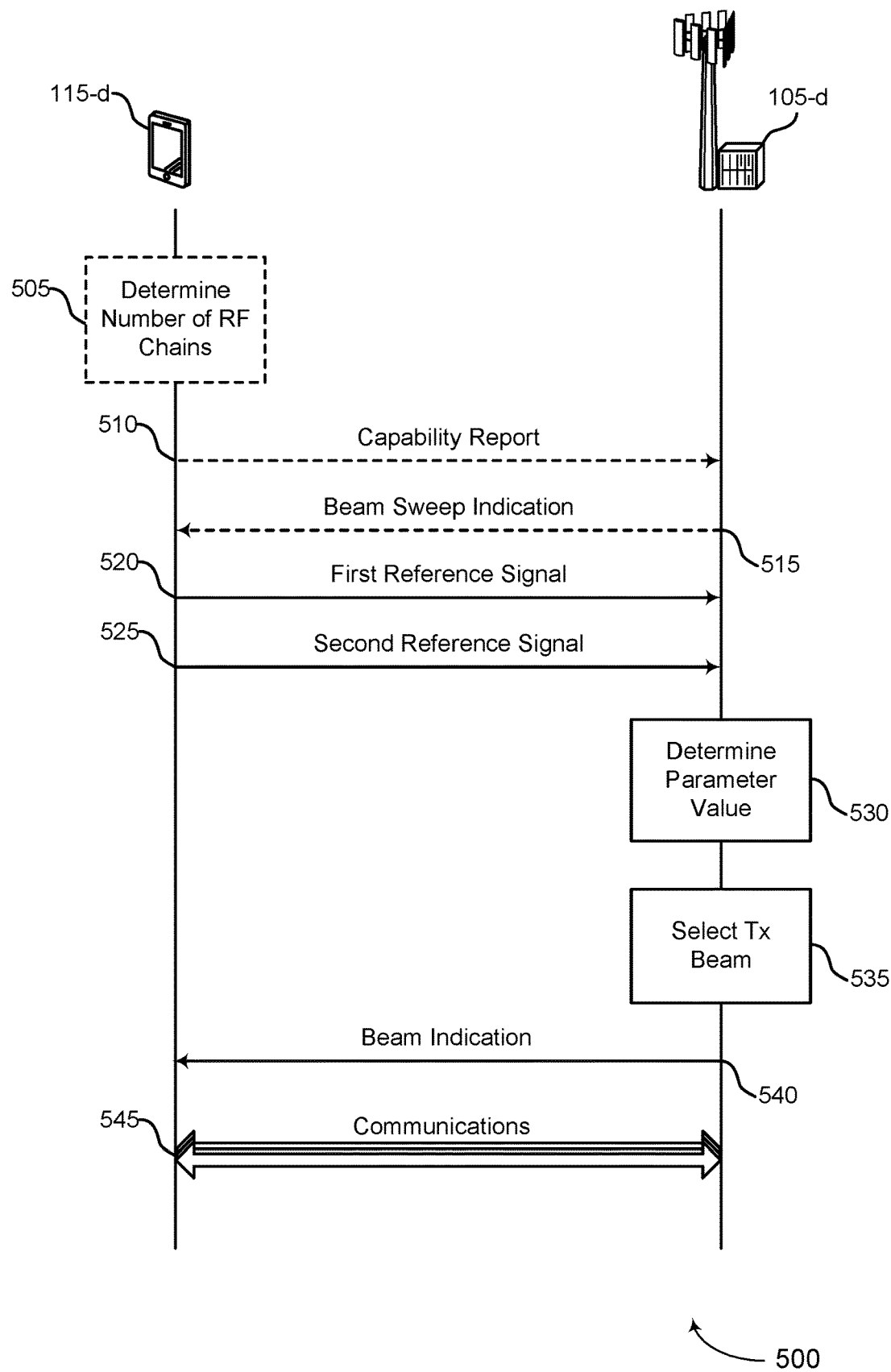
FIG. 5 shows an example of a process flow that supports common beam training for a group of component carriers in accordance with aspects of the present disclosure.

FIG. 5 illustrates an example of a process flow 500 that supports common beam training for a group of component carriers in accordance with aspects of the present disclosure. In some examples, the process flow 500 may be implemented by aspects of the wireless communications system 100 and 200. The process flow 500 may include a UE 115-*d* and a base station 105-*d*, which may be examples of a UE 115 and a base station 105 as described with reference to FIGS. 1-3. In the following description of the process flow 500, the information communicated between the UE 115-*d* and the base station 105-*d* may be communicated in a different order than the example order shown, or the operations performed by the UE 115-*d* and the base station 105-*d* may be performed in different orders or at different times. Some operations may also be omitted from the process flow 500, and other operations may be added to the process flow 500. In the example of FIG. 5, the UE 115-*d* and the base station 105-*d* may be in communication with each other via a mmW network.

At 505, the UE 115-*d* may determine that a scheduled group of component carriers is greater than a quantity of the UE 115-*d* radio frequency chains for transmitting the group of component carriers.

At 510, the UE 115-*d* may transmit and the base station 105-*d* may receive a capability report. For example, the capability report may indicate a quantity of the UE 115-*d* radio frequency chains for concurrently transmitting a set of data streams. In some examples, the capability report may indicate that the group of component carriers is greater than the quantity of the UE 115-*d* radio frequency chains for transmitting the group of component carriers.

At 515, the base station 105-*d* may transmit and the UE 115-*d* may receive a beam sweep indication indicating to the UE 115-*d* to transmit the first reference signal on the first transmit beam at 520 and the second reference signal on the second transmit beam at 525. In some examples, the beam sweep indication may include spatial relation information for one or more of the first transmit beam or the second transmit beam.

At 520, the base station 105-*d* may receive, via a receive beam, and the UE 115-*d* may transmit, via a first transmit beam, a first reference signal (for example, SRS) on a group of component carriers over a first symbol. In some examples, the UE 115-*d* may transmit the first reference signal on the group of component carriers concurrently over the first symbol.

At 525, the base station 105-*d* may receive, via the receive beam, and the UE 115-*d* may transmit, via a second transmit beam, a second reference signal (for example, SRS) on the group of component carriers over a second symbol. In some examples, the UE 115-*d* may transmit the second reference signal on the group of component carriers concurrently over the second symbol.

At 530, the base station 105-*d* may determine a value of a parameter for each of the first transmit beam and the second transmit beam based on receiving the first reference signal at 520 and the second reference signal at 525. In some examples, the base station 105-*d* may determine the value of the parameter for the group of component carriers of the first transmit beam based on receiving the first reference signal on the group of component carriers concurrently over the first symbol at 520, and the base station 105-*d* may determine the value of the parameter for the group of component carriers of the second transmit beam based on receiving the second reference signal on the group of component carriers concurrently over the second symbol at 525. The parameter may include one or more of reference signal received power, total throughput, or reference signal received quality.

At 535, the base station 105-*d* may select a transmit beam from the first transmit beam or the second transmit beam for subsequent communication on at least one of the group of component carriers based on the determined values of the parameter at 530.

At 540, the base station 105-*d* may transmit and the UE 115-*d* may receive an indication of the transmit beam based on selecting the transmit beam at 535. In some examples, the indication of the transmit beam may include an index of a reference signal resource for one or more of the first reference signal or the second reference signal. For example, the reference signal resource may include the first symbol or the second symbol.

At 545, the UE 115-*d* and the base station 105-*d* may communicate (for example, uplink and downlink transmissions) over at least one of the group of component carriers using the selected transmit beam.

Figure 6:
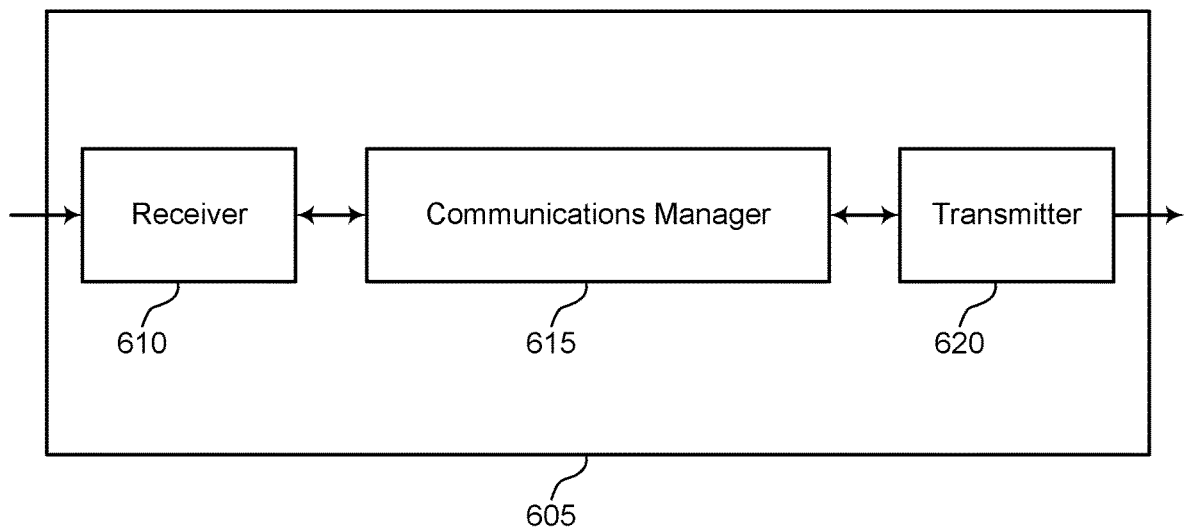
FIGS. 6 and 7 show block diagrams of devices that support common beam training for a group of component carriers in accordance with aspects of the present disclosure.

FIG. 6 shows a block diagram of a device 605 that supports common beam training for a group of component carriers in accordance with aspects of the present disclosure. The device 605 may be an example of aspects of a UE 115 as described herein. The device 605 may include a receiver 610, a communications manager 615, and a transmitter 620. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to common beam training for a group of component carriers). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, via a first receive beam, a first reference signal on a set of component carriers over a first symbol, receive, via a second receive beam, a second reference signal on the set of component carriers over a second symbol, determine a value of a parameter for each of the first receive beam and the second receive beam based on receiving the first reference signal and the second reference signal, select a receive beam from the first receive beam or the second receive beam for subsequent communication on at least one of the set of component carriers based on the determined values of the parameter, and communicate on the at least one of the set of component carriers using the selected receive beam. The communications manager 615 may also transmit, via a first transmit beam, a first reference signal on a set of component carriers over a first symbol, transmit, via a second transmit beam, a second reference signal on the set of component carriers over a second symbol, receive an indication of a transmit beam for subsequent communication on at least one of the set of component carriers based on transmitting the first reference signal via the first transmit beam and the second reference signal via the second transmit beam, and communicate on the at least one of the set of component carriers using the indicated transmit beam.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
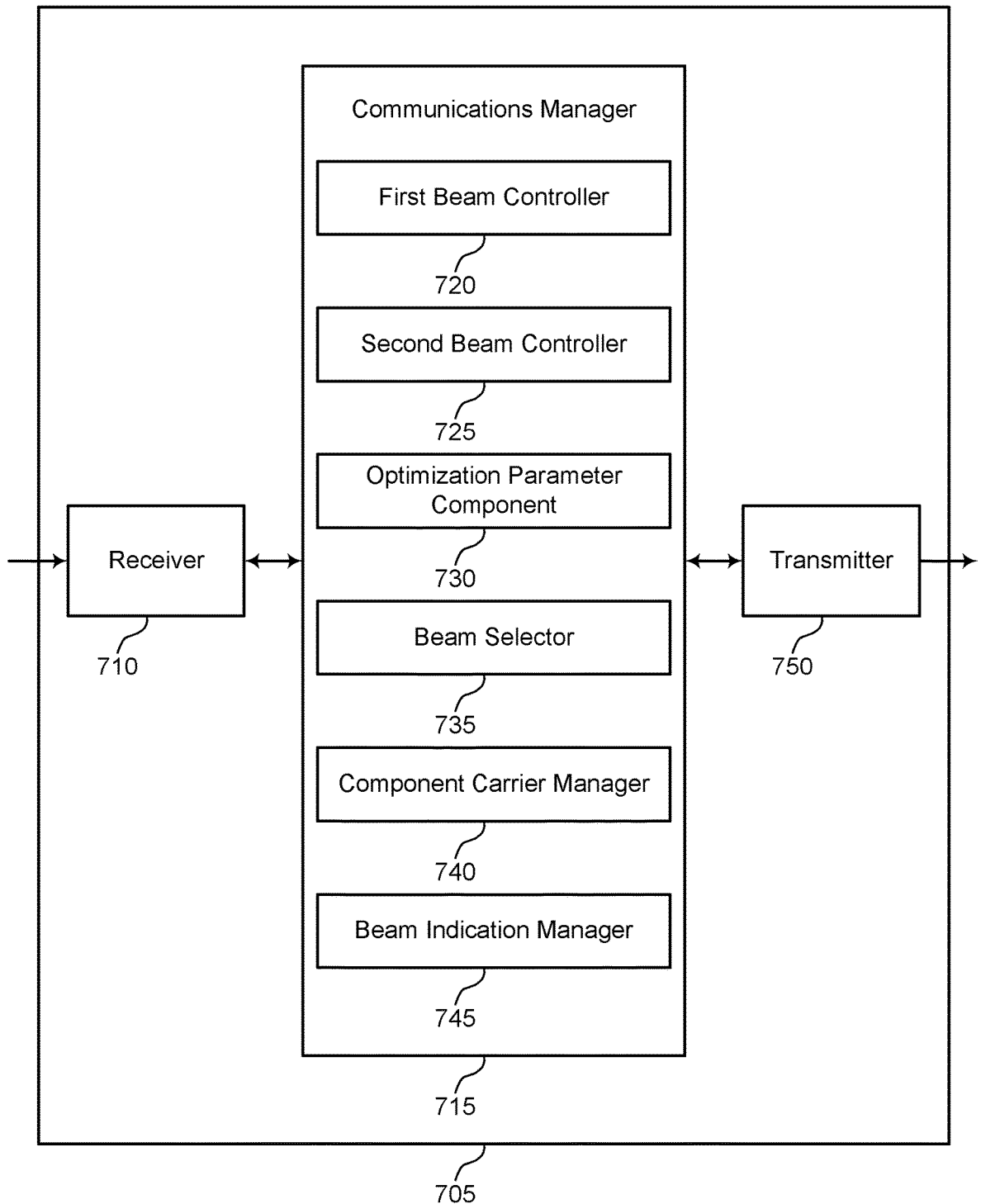

FIG. 7 shows a block diagram of a device 705 that supports common beam training for a group of component carriers in accordance with aspects of the present disclosure. The device 705 may be an example of aspects of a device 605, or a UE 115 as described herein. The device 705 may include a receiver 710, a communications manager 715, and a transmitter 750. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to common beam training for a group of component carriers). Information may be passed on to other components of the device 705. The receiver 710 may be an example of aspects of the transceiver 920 described with reference to FIG. 9. The receiver 710 may utilize a single antenna or a set of antennas.

The communications manager 715 may include a first beam controller 720, a second beam controller 725, an improvement parameter component 730, a beam selector 735, a component carrier manager 740, and a beam indication manager 745. The first beam controller 720 may receive, via a first receive beam, a first reference signal on a set of component carriers over a first symbol. The first beam controller 720 may transmit, via a first transmit beam, a first reference signal on a set of component carriers over a first symbol.

The second beam controller 725 may receive, via a second receive beam, a second reference signal on the set of component carriers over a second symbol. The second beam controller 725 may transmit, via a second transmit beam, a second reference signal on the set of component carriers over a second symbol.

The improvement parameter component 730 may determine a value of a parameter for each of the first receive beam and the second receive beam based on receiving the first reference signal and the second reference signal.

The beam selector 735 may select a receive beam from the first receive beam or the second receive beam for subsequent communication on at least one of the set of component carriers based on the determined values of the parameter.

The component carrier manager 740 may communicate on the at least one of the set of component carriers using the selected receive beam. The component carrier manager 740 may communicate on the at least one of the set of component carriers using the indicated transmit beam.

The beam indication manager 745 may receive an indication of a transmit beam of a plurality of transmit beams for subsequent communication on at least one of the set of component carriers based on transmitting the first reference signal via the first transmit beam and the second reference signal via the second transmit beam.

The transmitter 750 may transmit signals generated by other components of the device 705. In some examples, the transmitter 750 may be collocated with a receiver 710 in a transceiver component. For example, the transmitter 750 may be an example of aspects of the transceiver 920 described with reference to FIG. 9. The transmitter 750 may utilize a single antenna or a set of antennas.

Figure 8:
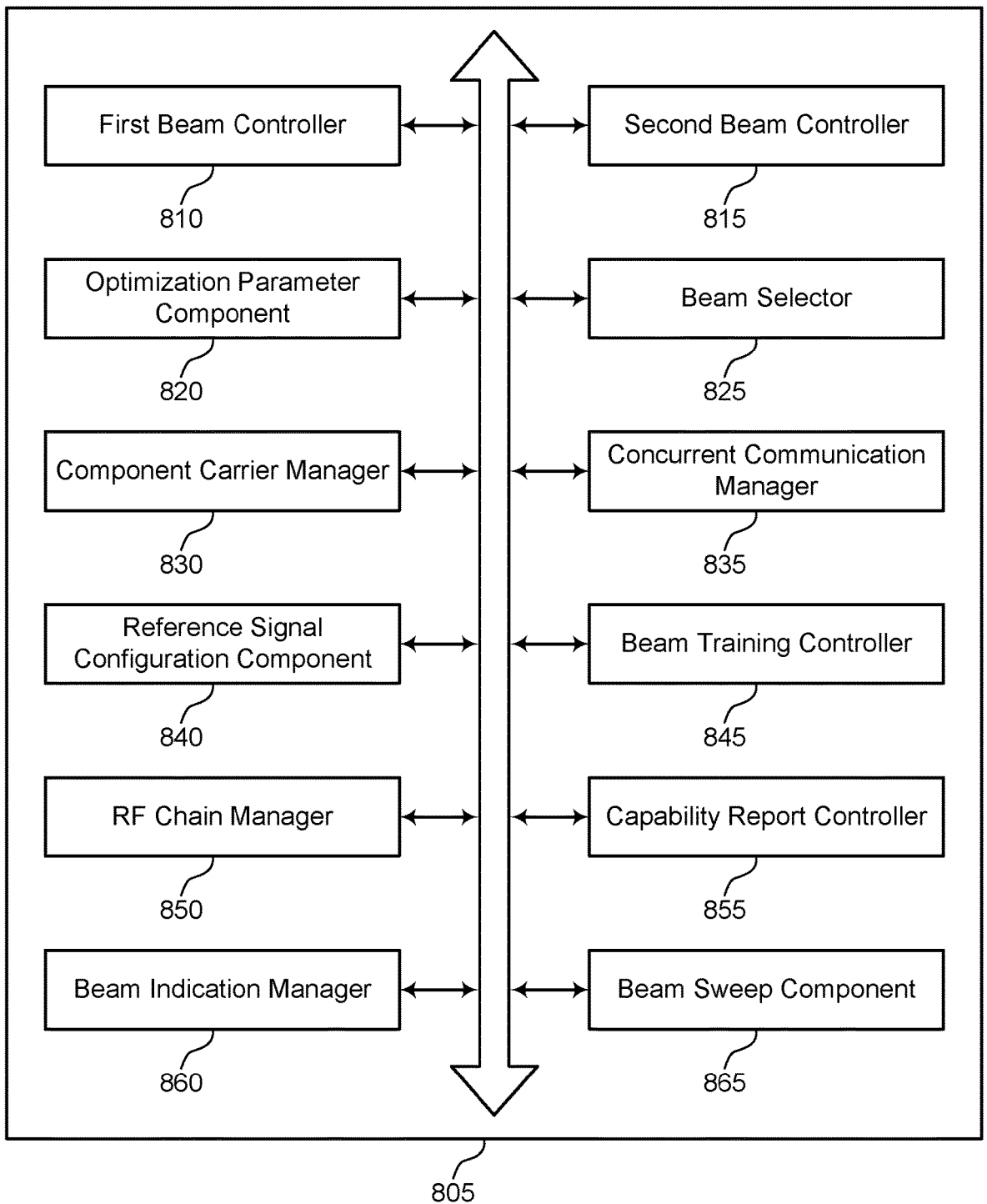
FIG. 8 shows a block diagram of a communications manager that supports common beam training for a group of component carriers in accordance with aspects of the present disclosure.

FIG. 8 shows a block diagram of a communications manager 805 that supports common beam training for a group of component carriers in accordance with aspects of the present disclosure. The communications manager 805 may be an example of aspects of a communications manager 615, a communications manager 715, or a communications manager 910 described herein. The communications manager 805 may include a first beam controller 810, a second beam controller 815, an improvement parameter component 820, a beam selector 825, a component carrier manager 830, a concurrent communication manager 835, a reference signal configuration component 840, a beam training controller 845, an RF chain manager 850, a capability report controller 855, a beam indication manager 860, and a beam sweep component 865. Each of these components may communicate, directly or indirectly, with one another (for example, via one or more buses).

The first beam controller 810 may receive, via a first receive beam, a first reference signal on a set of component carriers over a first symbol. In some examples, the first beam controller 810 may transmit, via a first transmit beam, a first reference signal on a set of component carriers over a first symbol.

The second beam controller 815 may receive, via a second receive beam, a second reference signal on the set of component carriers over a second symbol. In some examples, the second beam controller 815 may transmit, via a second transmit beam, a second reference signal on the set of component carriers over a second symbol.

The improvement parameter component 820 may determine a value of a parameter for each of the first receive beam and the second receive beam based on receiving the first reference signal and the second reference signal. In some examples, the improvement parameter component 820 may determine the value of the parameter for the set of component carriers of the first receive beam based on receiving the first reference signal on the set of component carriers concurrently over the first symbol. In some examples, the improvement parameter component 820 may determine the value of the parameter for the set of component carriers of the second receive beam based on receiving the second reference signal on the set of component carriers concurrently over the second symbol. In some examples, the parameter includes one or more of reference signal received power, total throughput, or reference signal received quality.

The beam selector 825 may select a receive beam from the first receive beam or the second receive beam for subsequent communication on at least one of the set of component carriers based on the determined values of the parameter.

The component carrier manager 830 may communicate on the at least one of the set of component carriers using the selected receive beam. In some examples, the component carrier manager 830 may communicate on the at least one of the set of component carriers using the indicated transmit beam.

The concurrent communication manager 835 may receive the first reference signal on the set of component carriers concurrently over the first symbol or receiving the second reference signal on the set of component carriers concurrently over the second symbol, in which determining the value of the parameter for each of the first receive beam and the second receive beam is based on receiving the first reference signal on the set of component carriers concurrently over the first symbol or receiving the second reference signal on the set of component carriers concurrently over the second symbol.

In some examples, the concurrent communication manager 835 may communicate on two or more of the set of component carriers concurrently.

The reference signal configuration component 840 may receive a reference signal configuration indicating the set of component carriers. In some examples, receiving the first reference signal includes receiving a reference signal configuration implicitly indicating a purpose of the set of component carriers, in which determining the value of the parameter for each of the first receive beam and the second receive beam is based on receiving the reference signal configuration implicitly indicating the purpose of the set of component carriers in the reference signal configuration.

In some examples, the reference signal configuration component 840 may receive a reference signal configuration indicating the set of component carriers for transmission, in which transmitting the first reference signal and the second reference signal is based on the reference signal configuration. In some examples, the reference signal configuration includes a set of component carrier identifiers or a group identifier of the set of component carriers. In some examples, the first reference signal and the second reference signal include channel state information reference signals. In some examples, the first reference signal and the second reference signal include sounding reference signals.

The beam training controller 845 may determine a purpose of the first reference signal and the second reference signal based on receiving the reference signal configuration, in which determining the value of the parameter for each of the first receive beam and the second receive beam is based on the determined purpose of the first reference signal and the second reference signal.

The RF chain manager 850 may determine that the set of component carriers is greater than a quantity of UE radio frequency chains for receiving the set of component carriers, in which determining the value of the parameter for each of the first receive beam and the second receive beam is based on the set of component carriers being greater than the quantity of UE radio frequency chains. In some examples, the RF chain manager 850 may determine that the set of component carriers is greater than a quantity of UE radio frequency chains for transmitting the set of component carriers, in which receiving the indication of the transmit beam is based on determining that the set of component carriers is greater than the quantity of UE radio frequency chains for transmitting the set of component carriers.

The capability report controller 855 may transmit a capability report indicating that the set of component carriers is greater than the quantity of UE radio frequency chains for receiving the set of component carriers. In some examples, the capability report controller 855 may transmit a capability report indicating a quantity of UE radio frequency chains for concurrently receiving a set of data streams. In some examples, the capability report controller 855 may transmit a capability report indicating that the set of component carriers is greater than a quantity of UE radio frequency chains for transmitting the set of component carriers. In some examples, the capability report controller 855 may transmit a capability report indicating a quantity of UE radio frequency chains for concurrently transmitting a set of data streams.

The beam indication manager 860 may receive an indication of a transmit beam for subsequent communication on at least one of the set of component carriers based on transmitting the first reference signal via the first transmit beam and the second reference signal via the second transmit beam. In some examples, the indication of the transmit beam includes an index of a reference signal resource for one or more of the first reference signal or the second reference signal. In some examples, the reference signal resource includes the first symbol or the second symbol.

The beam sweep component 865 may receive a beam sweep indication indicating to the UE to transmit the first reference signal on the first transmit beam and the second reference signal on the second transmit beam. In some examples, the beam sweep indication includes spatial relation information for one or more of the first transmit beam or the second transmit beam.

Figure 9:
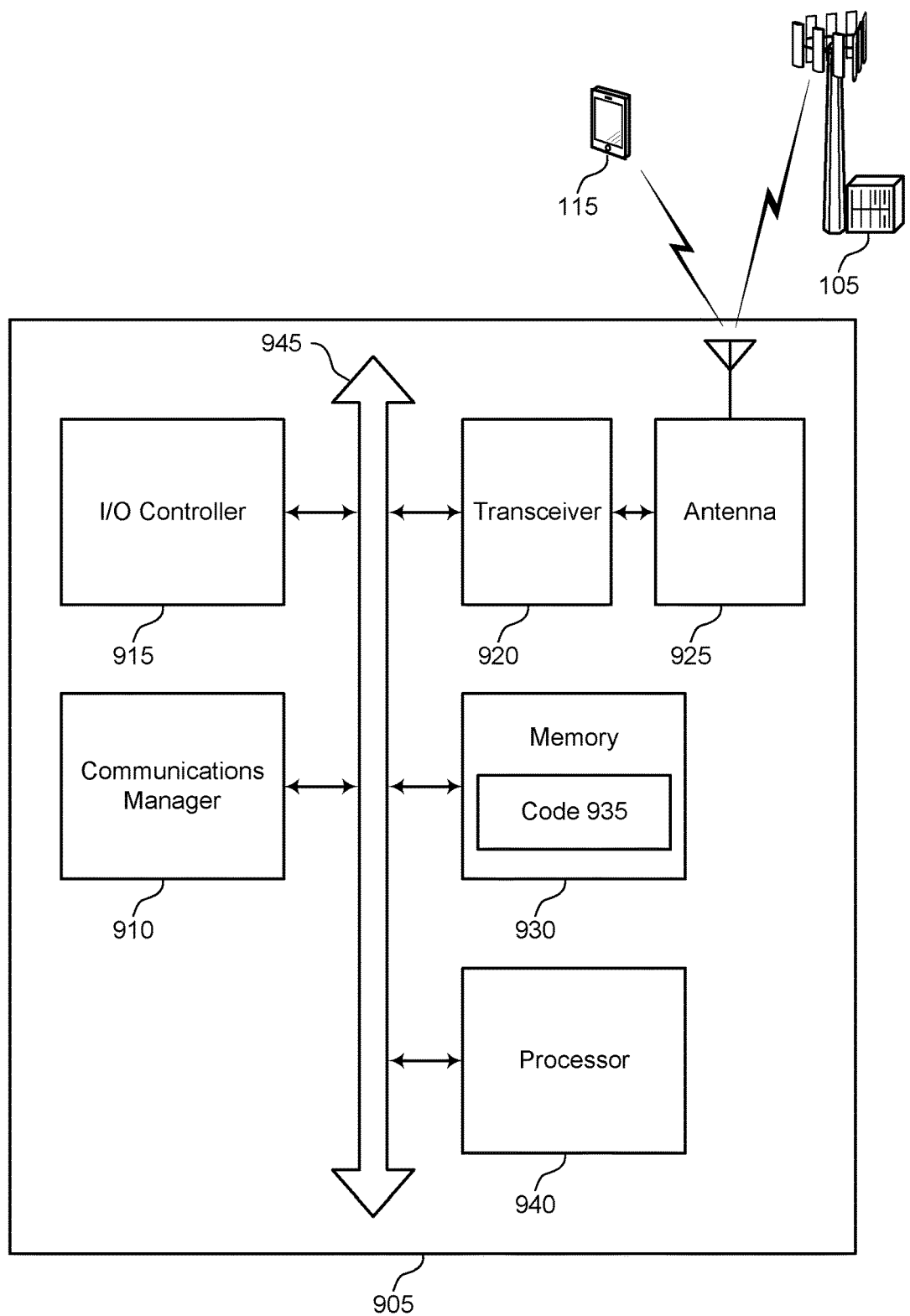
FIG. 9 shows a diagram of a system including a device that supports common beam training for a group of component carriers in accordance with aspects of the present disclosure.

FIG. 9 shows a diagram of a system including a device 905 that supports common beam training for a group of component carriers in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945).

The communications manager 910 may receive, via a first receive beam, a first reference signal on a set of component carriers over a first symbol, receive, via a second receive beam, a second reference signal on the set of component carriers over a second symbol, determine a value of a parameter for each of the first receive beam and the second receive beam based on receiving the first reference signal and the second reference signal, select a receive beam from the first receive beam or the second receive beam for subsequent communication on at least one of the set of component carriers based on the determined values of the parameter, and communicate on the at least one of the set of component carriers using the selected receive beam. The communications manager 910 may also transmit, via a first transmit beam, a first reference signal on a set of component carriers over a first symbol, transmit, via a second transmit beam, a second reference signal on the set of component carriers over a second symbol, receive an indication of a transmit beam for subsequent communication on at least one of the set of component carriers based on transmitting the first reference signal via the first transmit beam and the second reference signal via the second transmit beam, and communicate on the at least one of the set of component carriers using the indicated transmit beam.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, if executed, cause the processor to perform various functions described herein. In some examples, the memory 930 may contain, among other things, a basic I/O system (BIOS) which may control basic hardware or software operation such as the interaction with peripheral components or devices.

The processor 940 may include an intelligent hardware device, (for example, a general-purpose processor, a DSP, a CPU, a microcontroller, an ASIC, a field-programmable gate array (FPGA), a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (for example, the memory 930) to cause the device 905 to perform various functions (for example, functions or tasks supporting common beam training for a group of component carriers).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, if compiled and executed) to perform functions described herein.

Figure 10:
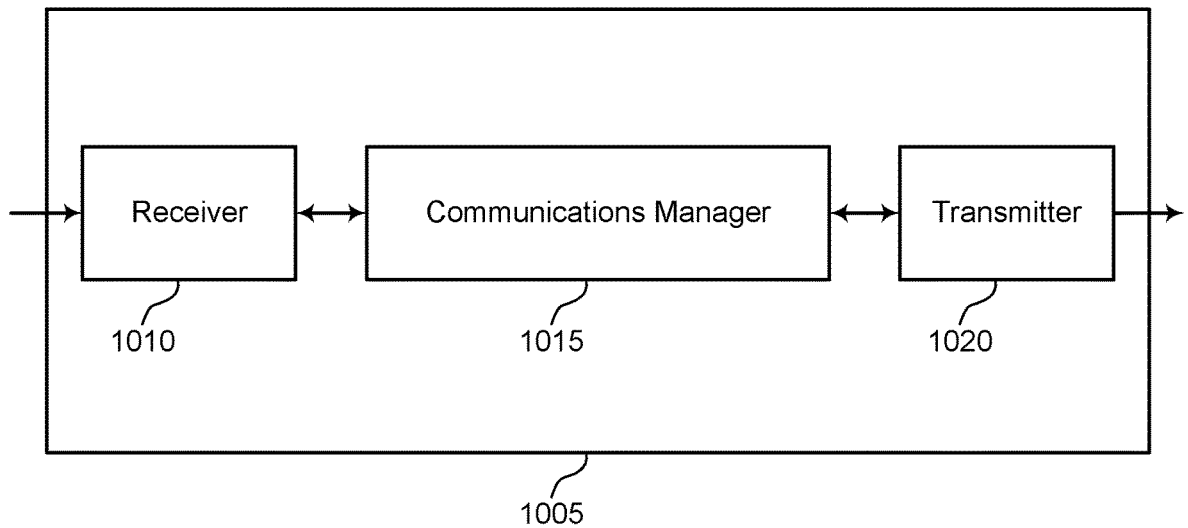
FIGS. 10 and 11 show block diagrams of devices that support common beam training for a group of component carriers in accordance with aspects of the present disclosure.

FIG. 10 shows a block diagram of a device 1005 that supports common beam training for a group of component carriers in accordance with aspects of the present disclosure. The device 1005 may be an example of aspects of a base station 105 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to common beam training for a group of component carriers). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, via a transmit beam, a first reference signal on a set of component carriers over a first symbol, transmit, via the transmit beam, a second reference signal on the set of component carriers over a second symbol, the first reference signal and the second reference signal for training a receive beam of a set of receive beams at a UE for subsequent communication on at least one of the set of component carriers, and communicate on the at least one of the set of component carriers with the UE. The communications manager 1015 may also receive, via a receive beam, a first reference signal on a set of component carriers over a first symbol from a first transmit beam of a UE, receive, via the receive beam, a second reference signal on the set of component carriers over a second symbol from a second transmit beam of the UE, determine a value of a parameter for each of the first transmit beam and the second transmit beam based on receiving the first reference signal and the second reference signal, select a transmit beam from the first transmit beam or the second transmit beam for subsequent communication on at least one of the set of component carriers based at least in part on the determined values of the parameter, transmit an indication of the transmit beam based on selecting the transmit beam, and communicate on the at least one of the set of component carriers with the UE.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
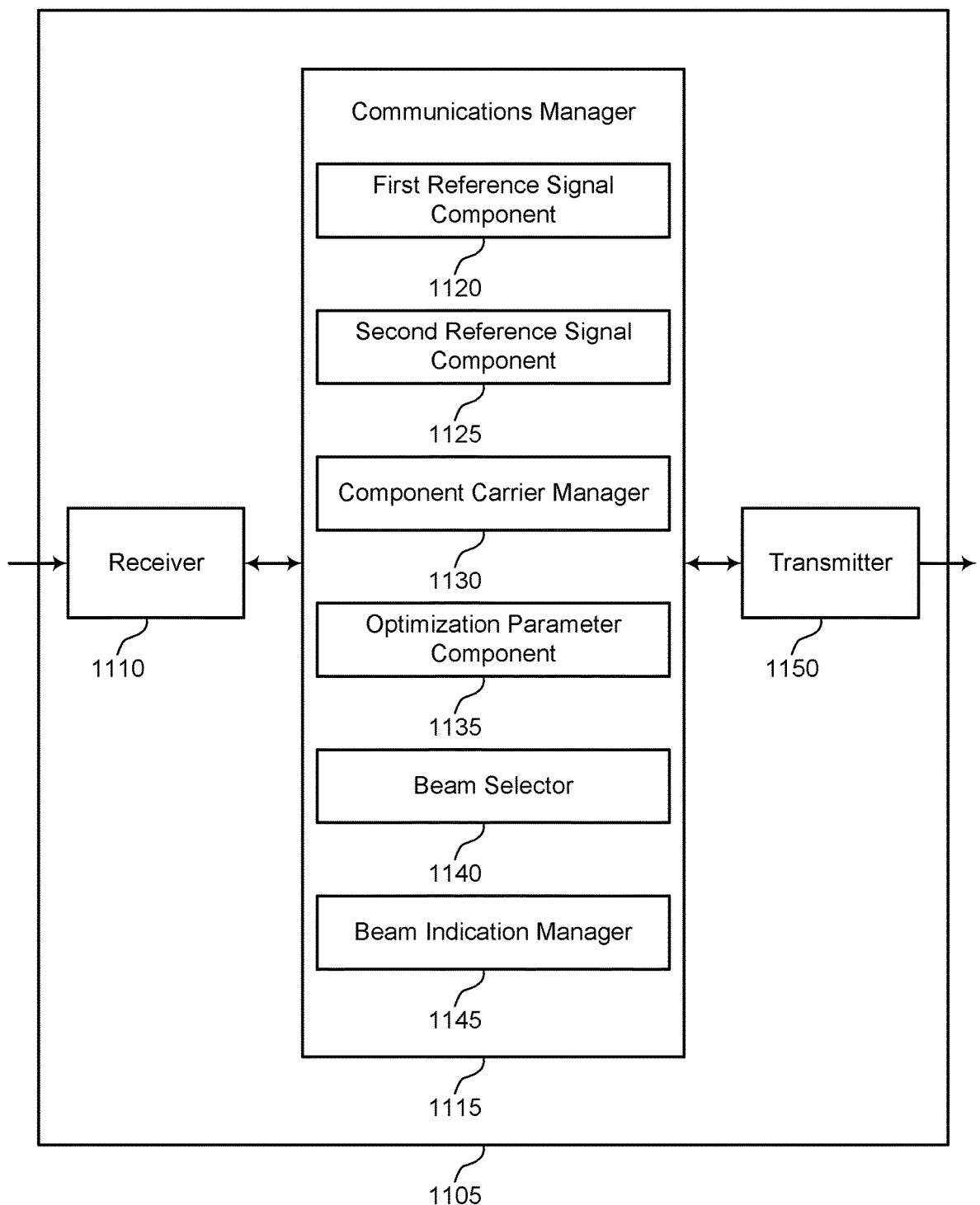

FIG. 11 shows a block diagram of a device 1105 that supports common beam training for a group of component carriers in accordance with aspects of the present disclosure. The device 1105 may be an example of aspects of a device 1005, or a base station 105 as described herein. The device 1105 may include a receiver 1110, a communications manager 1115, and a transmitter 1150. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to common beam training for a group of component carriers). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may include a first reference signal component 1120, a second reference signal component 1125, a component carrier manager 1130, an improvement parameter component 1135, a beam selector 1140, and a beam indication manager 1145.

The first reference signal component 1120 may transmit, via a transmit beam, a first reference signal on a set of component carriers over a first symbol. The first reference signal component 1120 may receive, via a receive beam, a first reference signal on a set of component carriers over a first symbol from a first transmit beam of a UE.

The second reference signal component 1125 may transmit, via the transmit beam, a second reference signal on the set of component carriers over a second symbol, the first reference signal and the second reference signal for training a receive beam of a set of receive beams at a UE for subsequent communication on at least one of the set of component carriers. The second reference signal component 1125 may receive, via the receive beam, a second reference signal on the set of component carriers over a second symbol from a second transmit beam of the UE.

The component carrier manager 1130 may communicate on the at least one of the set of component carriers with the UE.

The improvement parameter component 1135 may determine a value of a parameter for each of the first transmit beam and the second transmit beam based on receiving the first reference signal and the second reference signal.

The beam selector 1140 may select a transmit beam from the first transmit beam or the second transmit beam for subsequent communication on at least one of the set of component carriers based at least in part on the determined values of the parameter.

The beam indication manager 1145 may transmit an indication of the transmit beam based on selecting the transmit beam.

The transmitter 1150 may transmit signals generated by other components of the device 1105. In some examples, the transmitter 1150 may be collocated with a receiver 1110 in a transceiver component. For example, the transmitter 1150 may be an example of aspects of the transceiver 1320 described with reference to FIG. 13. The transmitter 1150 may utilize a single antenna or a set of antennas.

Figure 12:
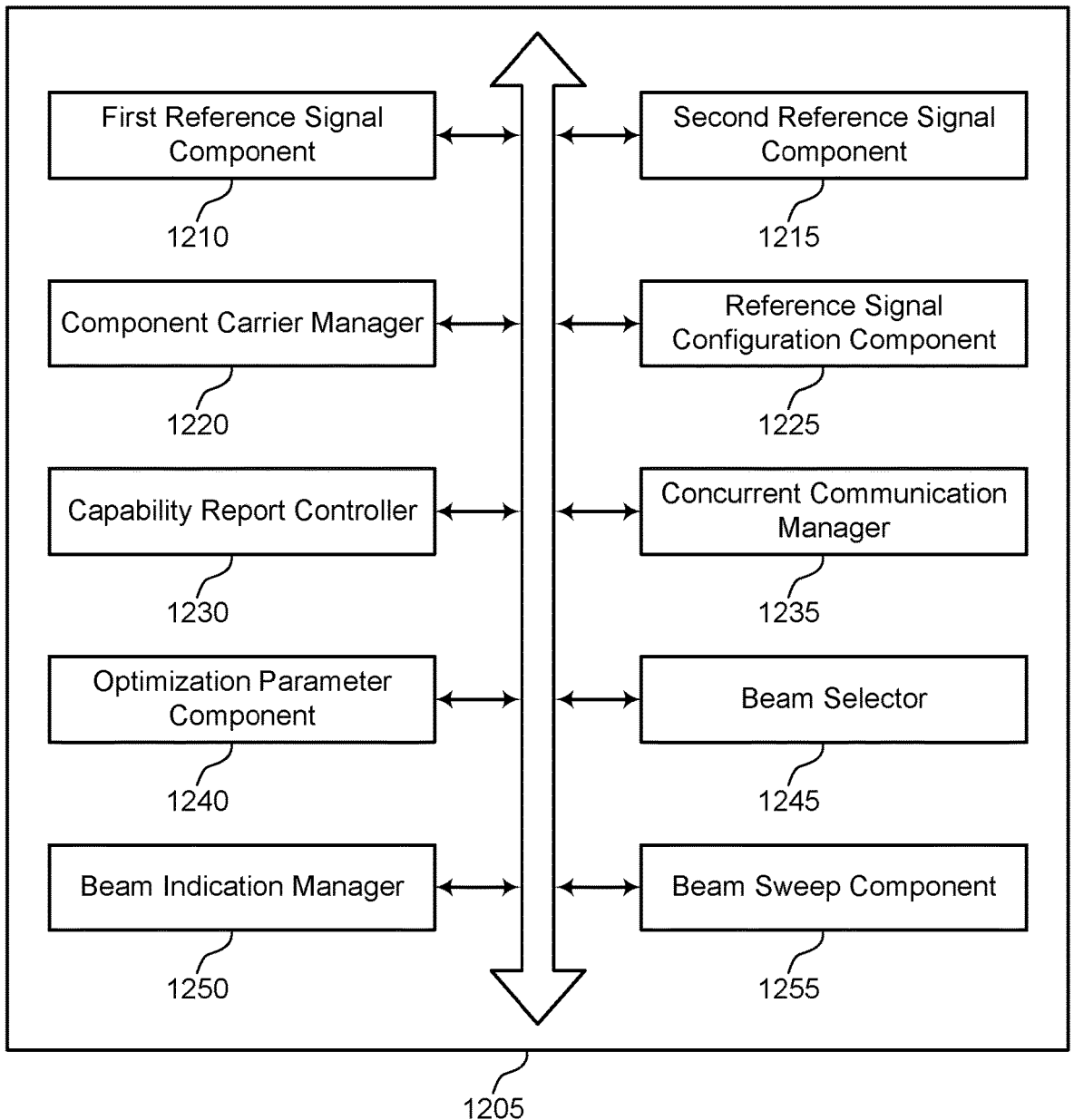
FIG. 12 shows a block diagram of a communications manager that supports common beam training for a group of component carriers in accordance with aspects of the present disclosure.

FIG. 12 shows a block diagram of a communications manager 1205 that supports common beam training for a group of component carriers in accordance with aspects of the present disclosure. The communications manager 1205 may be an example of aspects of a communications manager 1015, a communications manager 1115, or a communications manager 1310 described herein. The communications manager 1205 may include a first reference signal component 1210, a second reference signal component 1215, a component carrier manager 1220, a reference signal configuration component 1225, a capability report controller 1230, a concurrent communication manager 1235, an improvement parameter component 1240, a beam selector 1245, a beam indication manager 1250, and a beam sweep component 1255. Each of these components may communicate, directly or indirectly, with one another (for example, via one or more buses).

The first reference signal component 1210 may transmit, via a transmit beam, a first reference signal on a set of component carriers over a first symbol. In some examples, the first reference signal component 1210 may receive, via a receive beam, a first reference signal on a set of component carriers over a first symbol from a first transmit beam of a UE.

The second reference signal component 1215 may transmit, via the transmit beam, a second reference signal on the set of component carriers over a second symbol, the first reference signal and the second reference signal for training a receive beam of a set of receive beams at a UE for subsequent communication on at least one of the set of component carriers. In some examples, the second reference signal component 1215 may receive, via the receive beam, a second reference signal on the set of component carriers over a second symbol from a second transmit beam of the UE.

The component carrier manager 1220 may communicate on the at least one of the set of component carriers with the UE.

The reference signal configuration component 1225 may transmit a reference signal configuration indicating the set of component carriers, in which transmitting the reference signal configuration indicates a purpose of the first reference signal and the second reference signal. In some examples, the reference signal configuration component 1225 may transmit a reference signal configuration indicating the set of component carriers for the UE for transmission, in which receiving the first reference signal and the second reference signal is based on transmitting the reference signal configuration.

In some examples, the reference signal configuration includes a set of component carrier identifiers or a group identifier of the set of component carriers. In some examples, the first reference signal includes a reference signal configuration implicitly indicating a purpose of the set of component carriers. In some examples, the first reference signal and the second reference signal include channel state information reference signals. In some examples, the first reference signal and the second reference signal include sounding reference signals.

The capability report controller 1230 may receive a capability report indicating that the set of component carriers is greater than a quantity of UE radio frequency chains for receiving the set of component carriers, in which transmitting the first reference signal on the set of component carriers over the first symbol is based on receiving the capability report. In some examples, the capability report controller 1230 may receive a capability report indicating a quantity of UE radio frequency chains for concurrently receiving a set of data streams, in which transmitting the first reference signal on the set of component carriers over the first symbol is based on receiving the capability report.

In some examples, the capability report controller 1230 may receive a capability report indicating that the set of component carriers is greater than a quantity of UE radio frequency chains used to transmit the set of component carriers, in which transmitting the indication of the transmit beam is based on receiving the reference signal configuration. In some examples, the capability report controller 1230 may receive a capability report indicating a quantity of UE radio frequency chains for concurrently transmitting a set of data streams, in which transmitting the indication of the transmit beam is based on receiving the reference signal configuration.

The concurrent communication manager 1235 may communicate on two or more of the set of component carriers concurrently.

The improvement parameter component 1240 may determine a value of a parameter for each of the first transmit beam and the second transmit beam based on receiving the first reference signal and the second reference signal. In some examples, the improvement parameter component 1240 may determine the value of the parameter for the set of component carriers of the first transmit beam based on receiving the first reference signal on the set of component carriers concurrently over the first symbol.

In some examples, the improvement parameter component 1240 may determine the value of the parameter for the set of component carriers of the second transmit beam based on receiving the second reference signal on the set of component carriers concurrently over the second symbol. In some examples, the parameter includes one or more of reference signal received power, total throughput, or reference signal received quality.

The beam selector 1245 may select a transmit beam from the first transmit beam or the second transmit beam for subsequent communication on at least one of the set of component carriers based at least in part on the determined values of the parameter.

The beam indication manager 1250 may transmit an indication of the transmit beam based on selecting the transmit beam. In some examples, the indication of the transmit beam includes an index of a reference signal resource for one or more of the first reference signal or the second reference signal. In some examples, the reference signal resource includes the first symbol or the second symbol.

The beam sweep component 1255 may transmit a beam sweep indication indicating for the UE to transmit the first reference signal on the first transmit beam and the second reference signal on the second transmit beam. In some examples, the beam sweep indication includes spatial relation information for one or more of the first transmit beam or the second transmit beam.

Figure 13:
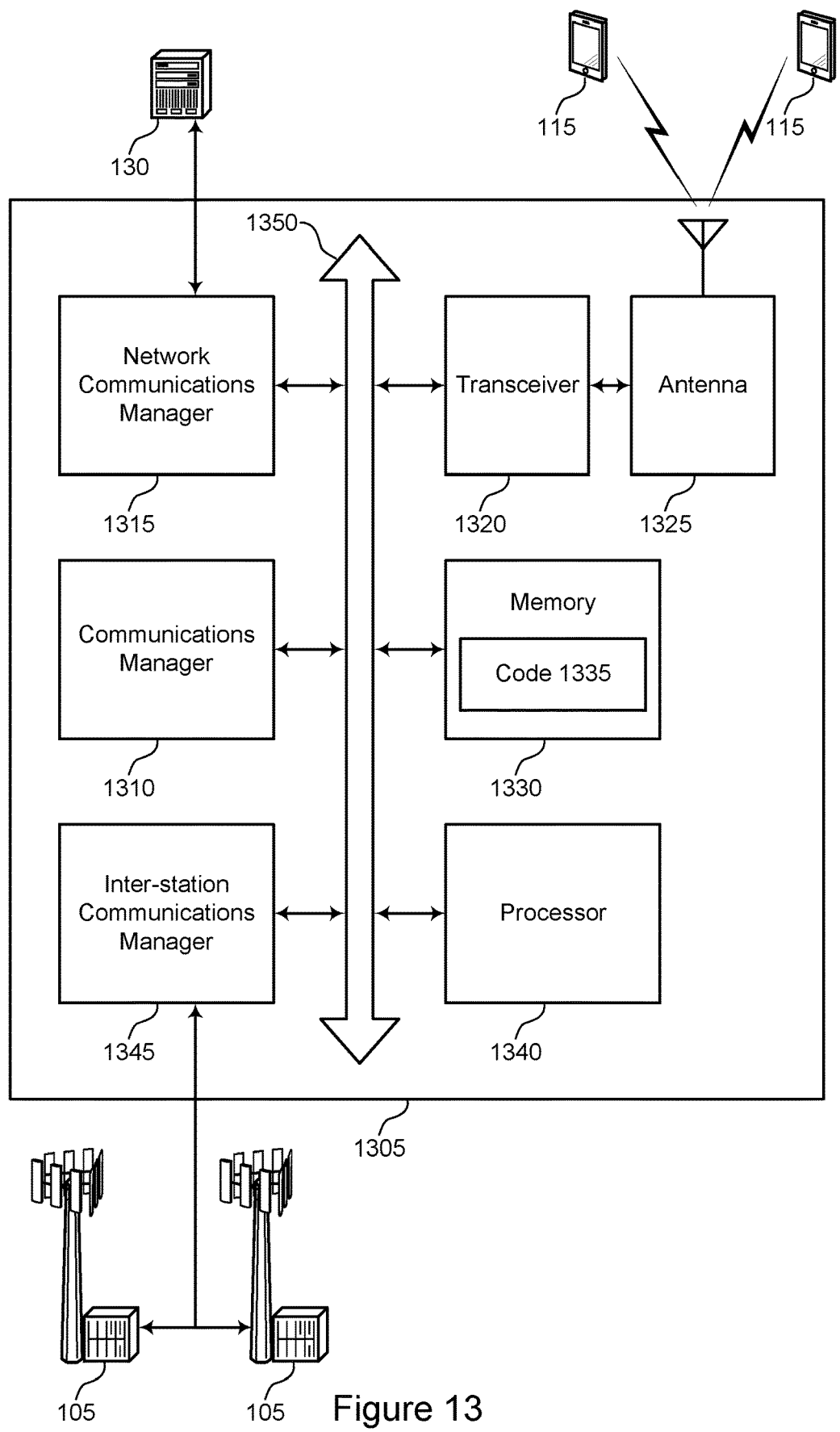
FIG. 13 shows a diagram of a system including a device that supports common beam training for a group of component carriers in accordance with aspects of the present disclosure.

FIG. 13 shows a diagram of a system including a device 1305 that supports common beam training for a group of component carriers in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (for example, bus 1350).

The communications manager 1310 may transmit, via a transmit beam, a first reference signal on a set of component carriers over a first symbol, transmit, via the transmit beam, a second reference signal on the set of component carriers over a second symbol, the first reference signal and the second reference signal for training a receive beam of a set of receive beams at a UE for subsequent communication on at least one of the set of component carriers, and communicate on the at least one of the set of component carriers with the UE. The communications manager 1310 may also receive, via a receive beam, a first reference signal on a set of component carriers over a first symbol from a first transmit beam of a UE, receive, via the receive beam, a second reference signal on the set of component carriers over a second symbol from a second transmit beam of the UE, determine a value of a parameter for each of the first transmit beam and the second transmit beam based on receiving the first reference signal and the second reference signal, select a transmit beam from the first transmit beam or the second transmit beam for subsequent communication on at least one of the set of component carriers based at least in part on the determined values of the parameter, transmit an indication of the transmit beam based on selecting the transmit beam, and communicate on the at least one of the set of component carriers with the UE.

The network communications manager 1315 may manage communications with the core network (for example, via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, if executed by a processor (for example, the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (for example, the memory 1330) to cause the device 1305 to perform various functions (for example, functions or tasks supporting common beam training for a group of component carriers).

The inter-station communications manager 1345 may manage communications with the other base station 105 and may include a controller or scheduler for controlling communications with UEs 115 in cooperation with the other base stations 105. For example, the inter-station communications manager 1345 may coordinate scheduling for transmissions to the UEs 115 for various interference mitigation techniques such as beamforming or joint transmission. In some examples, the inter-station communications manager 1345 may provide an X2 interface within an LTE/LTE-A wireless communication network technology to provide communication between the base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, if compiled and executed) to perform functions described herein.

Figure 14:
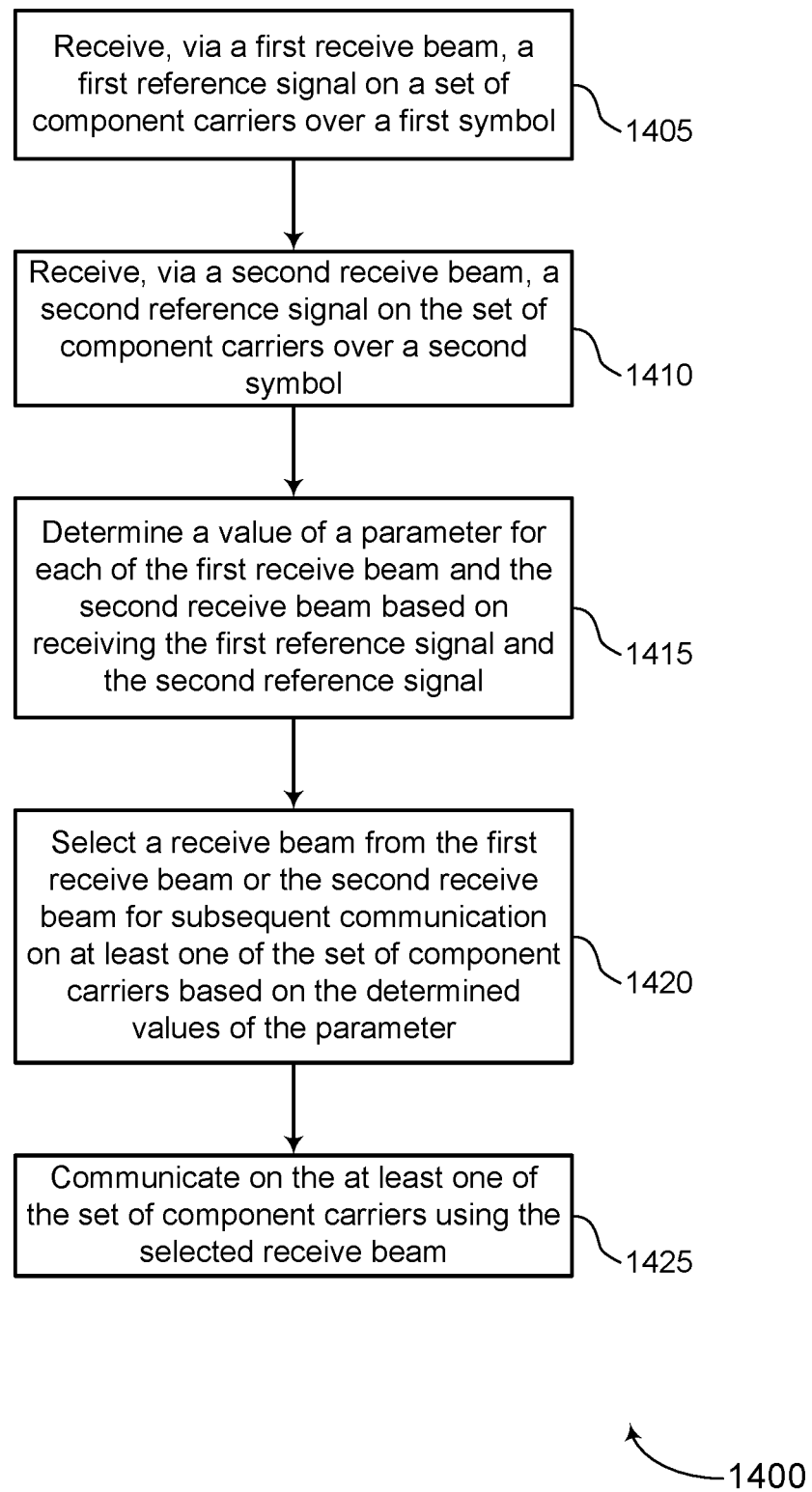
FIGS. 14-30 show flowcharts illustrating methods that support common beam training for a group of component carriers in accordance with aspects of the present disclosure.

FIG. 14 shows a flowchart illustrating a method 1400 that supports common beam training for a group of component carriers in accordance with aspects of the present disclosure. The operations of method 1400 may be implemented by a UE 115 or its components as described herein. For example, the operations of method 1400 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 1405, the UE may receive, via a first receive beam, a first reference signal on a set of component carriers over a first symbol. The operations of 1405 may be performed according to the methods described herein. In some examples, aspects of the operations of 1405 may be performed by a first beam controller as described with reference to FIGS. 6-9.

At 1410, the UE may receive, via a second receive beam, a second reference signal on the set of component carriers over a second symbol. The operations of 1410 may be performed according to the methods described herein. In some examples, aspects of the operations of 1410 may be performed by a second beam controller as described with reference to FIGS. 6-9.

At 1415, the UE may determine a value of a parameter for each of the first receive beam and the second receive beam based on receiving the first reference signal and the second reference signal. The operations of 1415 may be performed according to the methods described herein. In some examples, aspects of the operations of 1415 may be performed by an improvement parameter component as described with reference to FIGS. 6-9.

At 1420, the UE may select a receive beam from the first receive beam or the second receive beam for subsequent communication on at least one of the set of component carriers based on the determined values of the parameter. The operations of 1420 may be performed according to the methods described herein. In some examples, aspects of the operations of 1420 may be performed by a beam selector as described with reference to FIGS. 6-9.

At 1425, the UE may communicate on the at least one of the set of component carriers using the selected receive beam. The operations of 1425 may be performed according to the methods described herein. In some examples, aspects of the operations of 1425 may be performed by a component carrier manager as described with reference to FIGS. 6-9.

Figure 15:
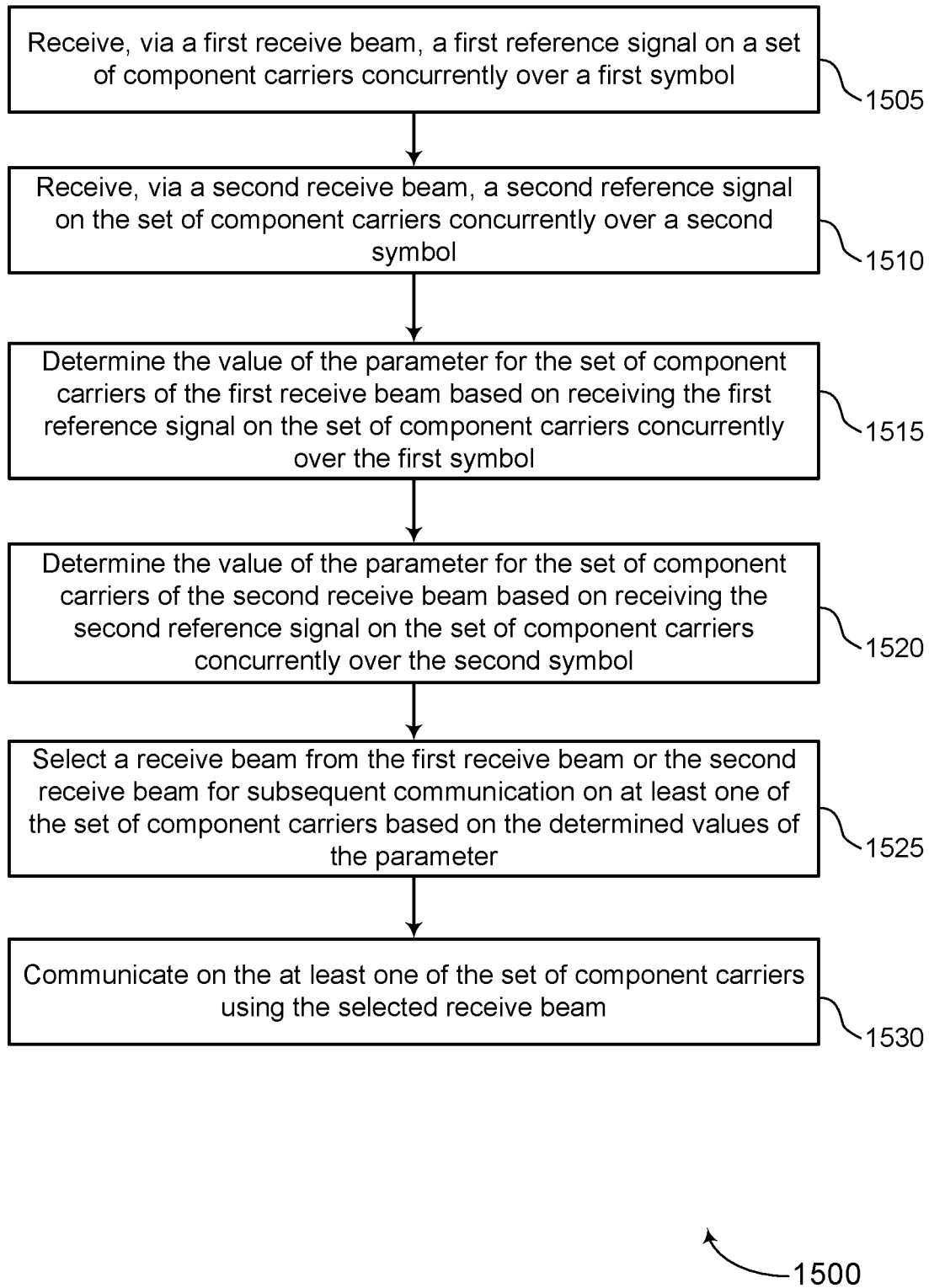

FIG. 15 shows a flowchart illustrating a method 1500 that supports common beam training for a group of component carriers in accordance with aspects of the present disclosure. The operations of method 1500 may be implemented by a UE 115 or its components as described herein. For example, the operations of method 1500 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 1505, the UE may receive, via a first receive beam, a first reference signal on a set of component carriers concurrently over a first symbol. The operations of 1505 may be performed according to the methods described herein. In some examples, aspects of the operations of 1505 may be performed by a first beam controller as described with reference to FIGS. 6-9.

At 1510, the UE may receive, via a second receive beam, a second reference signal on the set of component carriers concurrently over a second symbol. The operations of 1510 may be performed according to the methods described herein. In some examples, aspects of the operations of 1510 may be performed by a second beam controller as described with reference to FIGS. 6-9.

At 1515, the UE may determine the value of the parameter for the set of component carriers of the first receive beam based on receiving the first reference signal on the set of component carriers concurrently over the first symbol. The operations of 1515 may be performed according to the methods described herein. In some examples, aspects of the operations of 1515 may be performed by an improvement parameter component as described with reference to FIGS. 6-9.

At 1520, the UE may determine the value of the parameter for the set of component carriers of the second receive beam based on receiving the second reference signal on the set of component carriers concurrently over the second symbol. The operations of 1520 may be performed according to the methods described herein. In some examples, aspects of the operations of 1520 may be performed by an improvement parameter component as described with reference to FIGS. 6-9.

At 1525, the UE may select a receive beam from the first receive beam or the second receive beam for subsequent communication on at least one of the set of component carriers based on the determined values of the parameter. The operations of 1525 may be performed according to the methods described herein. In some examples, aspects of the operations of 1525 may be performed by a beam selector as described with reference to FIGS. 6-9.

At 1530, the UE may communicate on the at least one of the set of component carriers using the selected receive beam. The operations of 1530 may be performed according to the methods described herein. In some examples, aspects of the operations of 1540 may be performed by a component carrier manager as described with reference to FIGS. 6-9.

Figure 16:
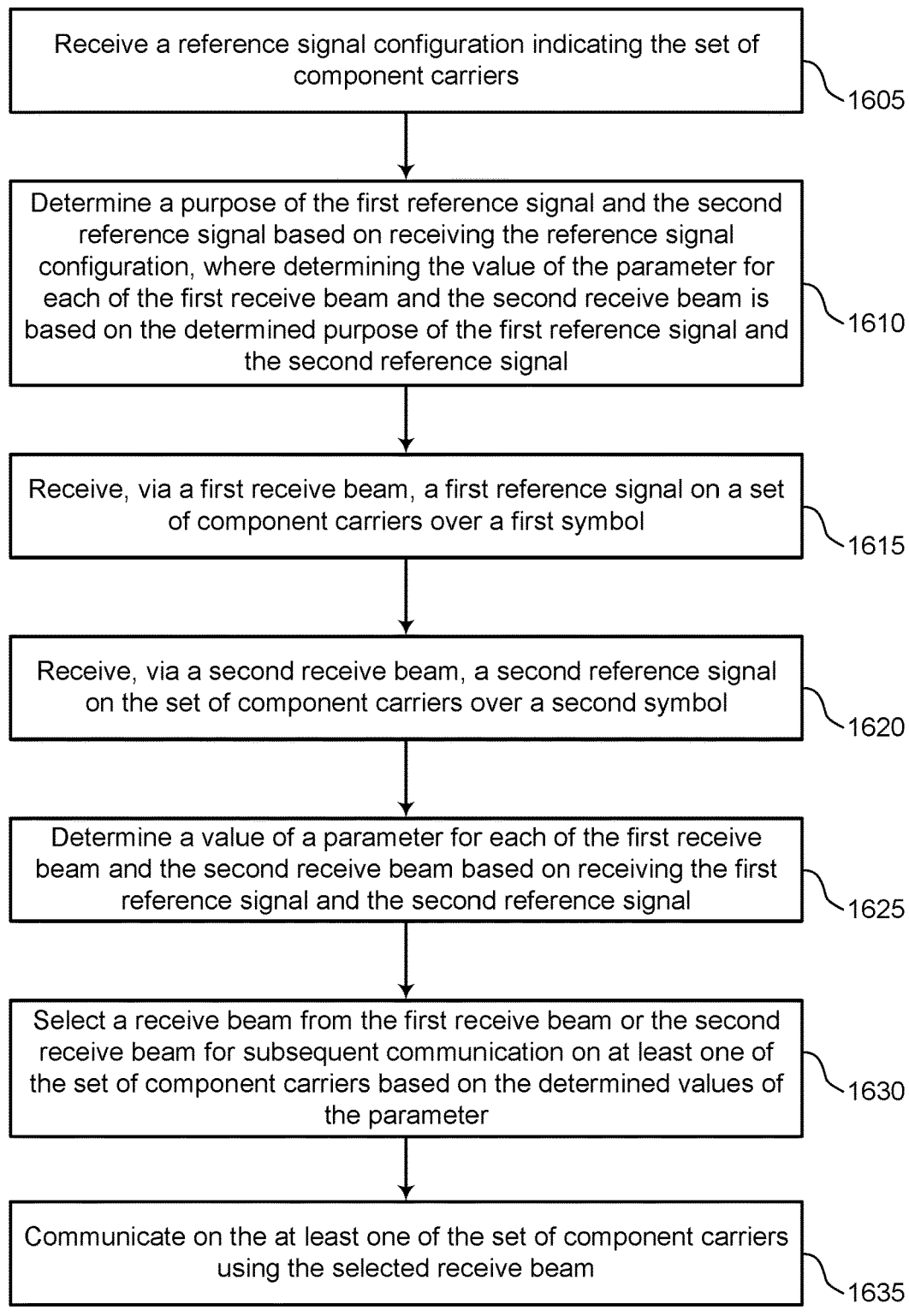

FIG. 16 shows a flowchart illustrating a method 1600 that supports common beam training for a group of component carriers in accordance with aspects of the present disclosure. The operations of method 1600 may be implemented by a UE 115 or its components as described herein. For example, the operations of method 1600 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 1605, the UE may receive a reference signal configuration indicating the set of component carriers. The operations of 1605 may be performed according to the methods described herein. In some examples, aspects of the operations of 1605 may be performed by a reference signal configuration component as described with reference to FIGS. 6-9.

At 1610, the UE may determine a purpose of the first reference signal and the second reference signal based on receiving the reference signal configuration, in which determining the value of the parameter for each of the first receive beam and the second receive beam is based on the determined purpose of the first reference signal and the second reference signal. The operations of 1610 may be performed according to the methods described herein. In some examples, aspects of the operations of 1610 may be performed by a beam training controller as described with reference to FIGS. 6-9.

At 1615, the UE may receive, via a first receive beam, a first reference signal on a set of component carriers over a first symbol. The operations of 1615 may be performed according to the methods described herein. In some examples, aspects of the operations of 1615 may be performed by a first beam controller as described with reference to FIGS. 6-9.

At 1620, the UE may receive, via a second receive beam, a second reference signal on the set of component carriers over a second symbol. The operations of 1620 may be performed according to the methods described herein. In some examples, aspects of the operations of 1620 may be performed by a second beam controller as described with reference to FIGS. 6-9.

At 1625, the UE may determine a value of a parameter for each of the first receive beam and the second receive beam based on receiving the first reference signal and the second reference signal. The operations of 1625 may be performed according to the methods described herein. In some examples, aspects of the operations of 1625 may be performed by an improvement parameter component as described with reference to FIGS. 6-9.

At 1630, the UE may select a receive beam from the first receive beam or the second receive beam for subsequent communication on at least one of the set of component carriers based on the determined values of the parameter. The operations of 1630 may be performed according to the methods described herein. In some examples, aspects of the operations of 1630 may be performed by a beam selector as described with reference to FIGS. 6-9.

At 1635, the UE may communicate on the at least one of the set of component carriers using the selected receive beam. The operations of 1635 may be performed according to the methods described herein. In some examples, aspects of the operations of 1635 may be performed by a component carrier manager as described with reference to FIGS. 6-9.

Figure 17:
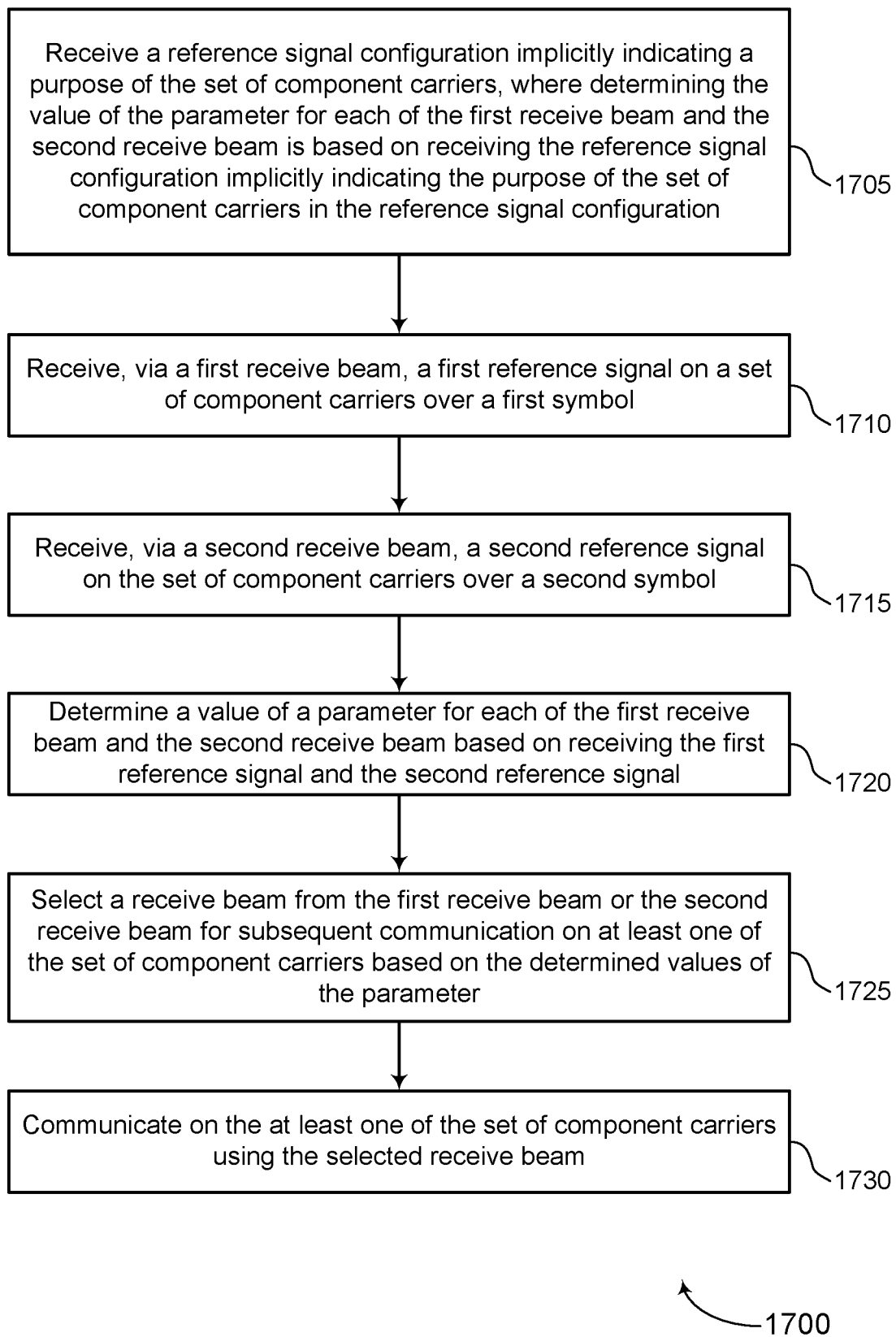

FIG. 17 shows a flowchart illustrating a method 1700 that supports common beam training for a group of component carriers in accordance with aspects of the present disclosure. The operations of method 1700 may be implemented by a UE 115 or its components as described herein. For example, the operations of method 1700 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 1705, the UE may receive the first reference signal includes receiving a reference signal configuration implicitly indicating a purpose of the set of component carriers, in which determining the value of the parameter for each of the first receive beam and the second receive beam is based on receiving the reference signal configuration implicitly indicating the purpose of the set of component carriers in the reference signal configuration. The operations of 1705 may be performed according to the methods described herein. In some examples, aspects of the operations of 1705 may be performed by a reference signal configuration component as described with reference to FIGS. 6-9.

At 1710, the UE may receive, via a first receive beam, a first reference signal on a set of component carriers over a first symbol. The operations of 1710 may be performed according to the methods described herein. In some examples, aspects of the operations of 1710 may be performed by a first beam controller as described with reference to FIGS. 6-9.

At 1715, the UE may receive, via a second receive beam, a second reference signal on the set of component carriers over a second symbol. The operations of 1715 may be performed according to the methods described herein. In some examples, aspects of the operations of 1715 may be performed by a second beam controller as described with reference to FIGS. 6-9.

At 1720, the UE may determine a value of a parameter for each of the first receive beam and the second receive beam based on receiving the first reference signal and the second reference signal. The operations of 1720 may be performed according to the methods described herein. In some examples, aspects of the operations of 1720 may be performed by an improvement parameter component as described with reference to FIGS. 6-9.

At 1725, the UE may select a receive beam from the first receive beam or the second receive beam for subsequent communication on at least one of the set of component carriers based on the determined values of the parameter. The operations of 1725 may be performed according to the methods described herein. In some examples, aspects of the operations of 1725 may be performed by a beam selector as described with reference to FIGS. 6-9.

At 1730, the UE may communicate on the at least one of the set of component carriers using the selected receive beam. The operations of 1730 may be performed according to the methods described herein. In some examples, aspects of the operations of 1730 may be performed by a component carrier manager as described with reference to FIGS. 6-9.

Figure 18:
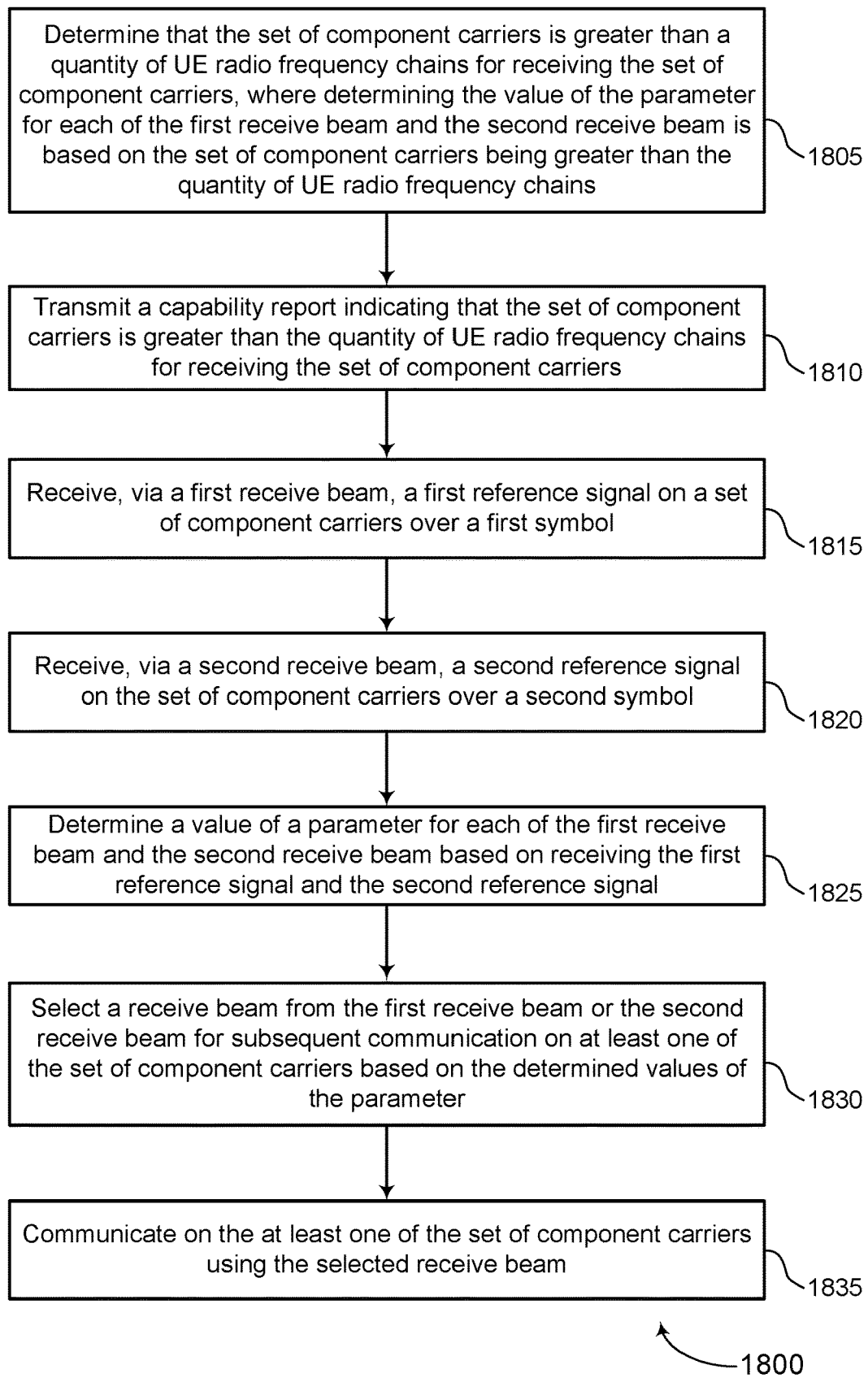

FIG. 18 shows a flowchart illustrating a method 1800 that supports common beam training for a group of component carriers in accordance with aspects of the present disclosure. The operations of method 1800 may be implemented by a UE 115 or its components as described herein. For example, the operations of method 1800 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 1805, the UE may determine that the set of component carriers is greater than a quantity of UE radio frequency chains for receiving the set of component carriers, in which determining the value of the parameter for each of the first receive beam and the second receive beam is based on the set of component carriers being greater than the quantity of UE radio frequency chains. The operations of 1805 may be performed according to the methods described herein. In some examples, aspects of the operations of 1805 may be performed by an RF chain manager as described with reference to FIGS. 6-9.

At 1810, the UE may transmit a capability report indicating that the set of component carriers is greater than the quantity of UE radio frequency chains for receiving the set of component carriers. The operations of 1810 may be performed according to the methods described herein. In some examples, aspects of the operations of 1810 may be performed by a capability report controller as described with reference to FIGS. 6-9.

At 1815, the UE may receive, via a first receive beam, a first reference signal on a set of component carriers over a first symbol. The operations of 1815 may be performed according to the methods described herein. In some examples, aspects of the operations of 1815 may be performed by a first beam controller as described with reference to FIGS. 6-9.

At 1820, the UE may receive, via a second receive beam, a second reference signal on the set of component carriers over a second symbol. The operations of 1820 may be performed according to the methods described herein. In some examples, aspects of the operations of 1820 may be performed by a second beam controller as described with reference to FIGS. 6-9.

At 1825, the UE may determine a value of a parameter for each of the first receive beam and the second receive beam based on receiving the first reference signal and the second reference signal. The operations of 1825 may be performed according to the methods described herein. In some examples, aspects of the operations of 1825 may be performed by an improvement parameter component as described with reference to FIGS. 6-9.

At 1830, the UE may select a receive beam from the first receive beam or the second receive beam for subsequent communication on at least one of the set of component carriers based on the determined values of the parameter. The operations of 1830 may be performed according to the methods described herein. In some examples, aspects of the operations of 1830 may be performed by a beam selector as described with reference to FIGS. 6-9.

At 1835, the UE may communicate on the at least one of the set of component carriers using the selected receive beam. The operations of 1835 may be performed according to the methods described herein. In some examples, aspects of the operations of 1835 may be performed by a component carrier manager as described with reference to FIGS. 6-9.

Figure 19:
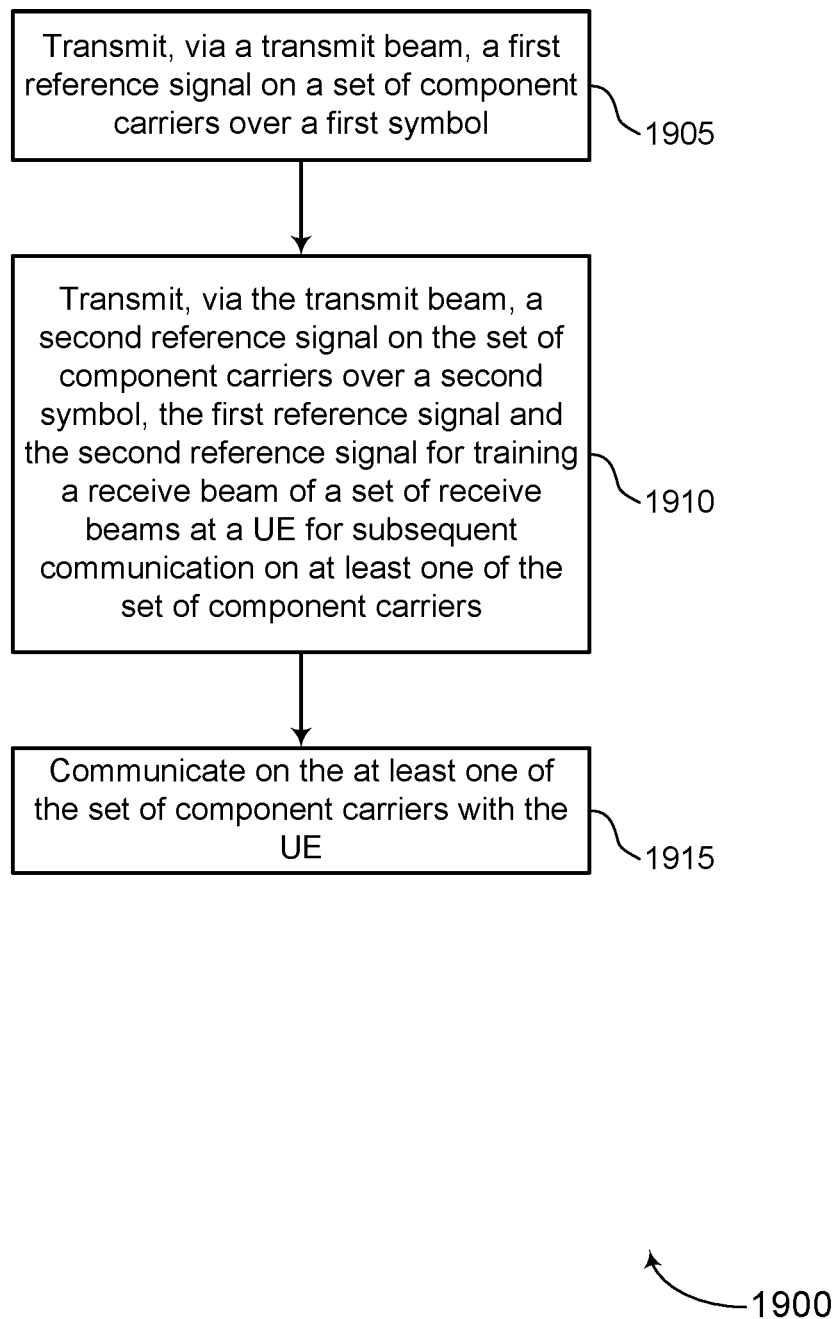

FIG. 19 shows a flowchart illustrating a method 1900 that supports common beam training for a group of component carriers in accordance with aspects of the present disclosure. The operations of method 1900 may be implemented by a base station 105 or its components as described herein. For example, the operations of method 1900 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 1905, the base station may transmit, via a transmit beam, a first reference signal on a set of component carriers over a first symbol. The operations of 1905 may be performed according to the methods described herein. In some examples, aspects of the operations of 1905 may be performed by a first reference signal component as described with reference to FIGS. 10-13.

At 1910, the base station may transmit, via the transmit beam, a second reference signal on the set of component carriers over a second symbol, the first reference signal and the second reference signal for training a receive beam of a set of receive beams at a UE for subsequent communication on at least one of the set of component carriers. The operations of 1910 may be performed according to the methods described herein. In some examples, aspects of the operations of 1910 may be performed by a second reference signal component as described with reference to FIGS. 10-13.

At 1915, the base station may communicate on the at least one of the set of component carriers with the UE. The operations of 1915 may be performed according to the methods described herein. In some examples, aspects of the operations of 1915 may be performed by a component carrier manager as described with reference to FIGS. 10-13.

Figure 20:
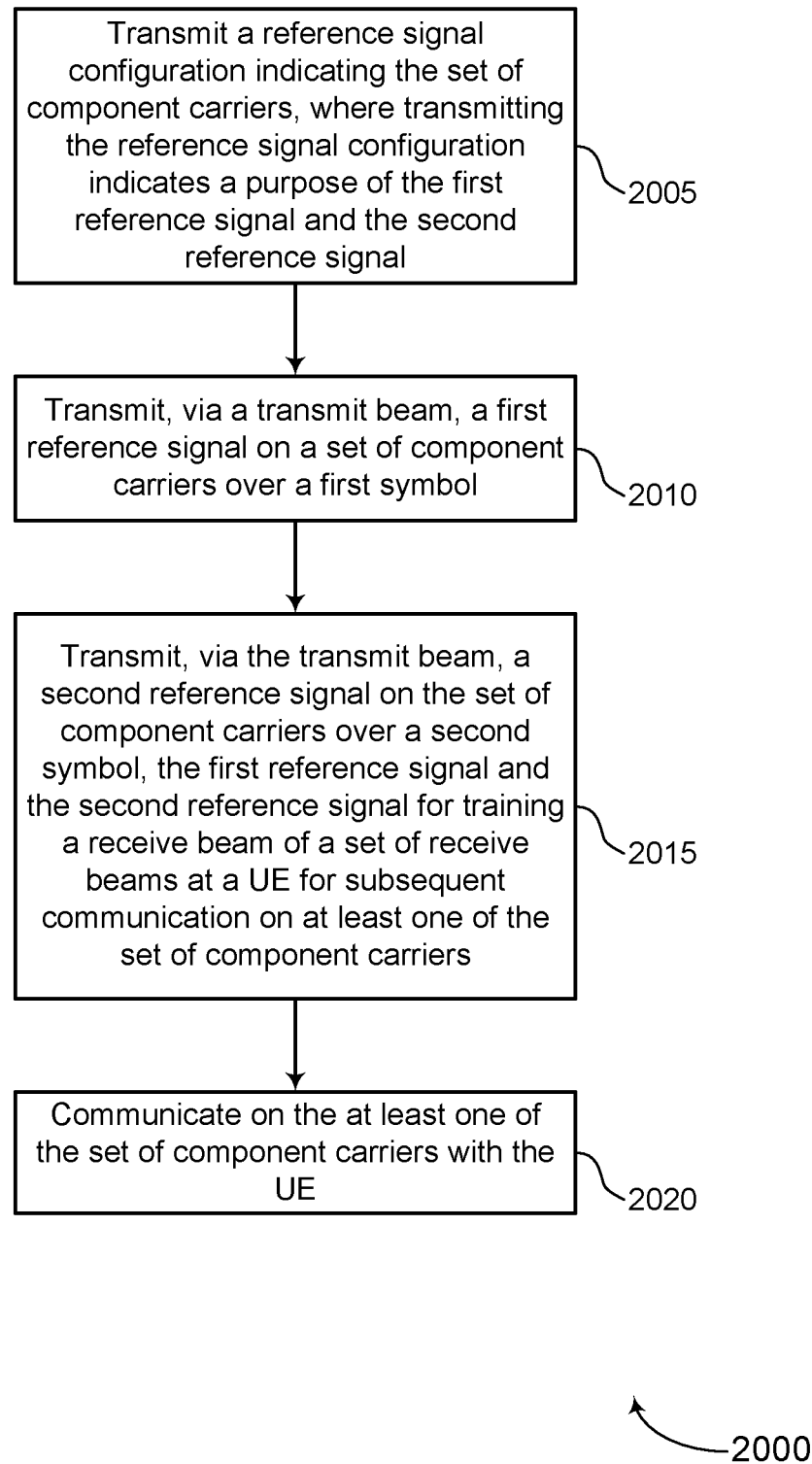

FIG. 20 shows a flowchart illustrating a method 2000 that supports common beam training for a group of component carriers in accordance with aspects of the present disclosure. The operations of method 2000 may be implemented by a base station 105 or its components as described herein. For example, the operations of method 2000 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2005, the base station may transmit a reference signal configuration indicating the set of component carriers, in which transmitting the reference signal configuration indicates a purpose of the first reference signal and the second reference signal. The operations of 2005 may be performed according to the methods described herein. In some examples, aspects of the operations of 2005 may be performed by a reference signal configuration component as described with reference to FIGS. 10-13.

At 2010, the base station may transmit, via a transmit beam, a first reference signal on a set of component carriers over a first symbol. The operations of 2010 may be performed according to the methods described herein. In some examples, aspects of the operations of 2010 may be per-formed by a first reference signal component as described with reference to FIGS. 10-13.

At 2015, the base station may transmit, via the transmit beam, a second reference signal on the set of component carriers over a second symbol, the first reference signal and the second reference signal for training a receive beam of a set of receive beams at a UE for subsequent communication on at least one of the set of component carriers. The operations of 2015 may be performed according to the methods described herein. In some examples, aspects of the operations of 2015 may be performed by a second reference signal component as described with reference to FIGS. 10-13.

At 2020, the base station may communicate on the at least one of the set of component carriers with the UE. The operations of 2020 may be performed according to the methods described herein. In some examples, aspects of the operations of 2020 may be performed by a component carrier manager as described with reference to FIGS. 10-13.

Figure 21:
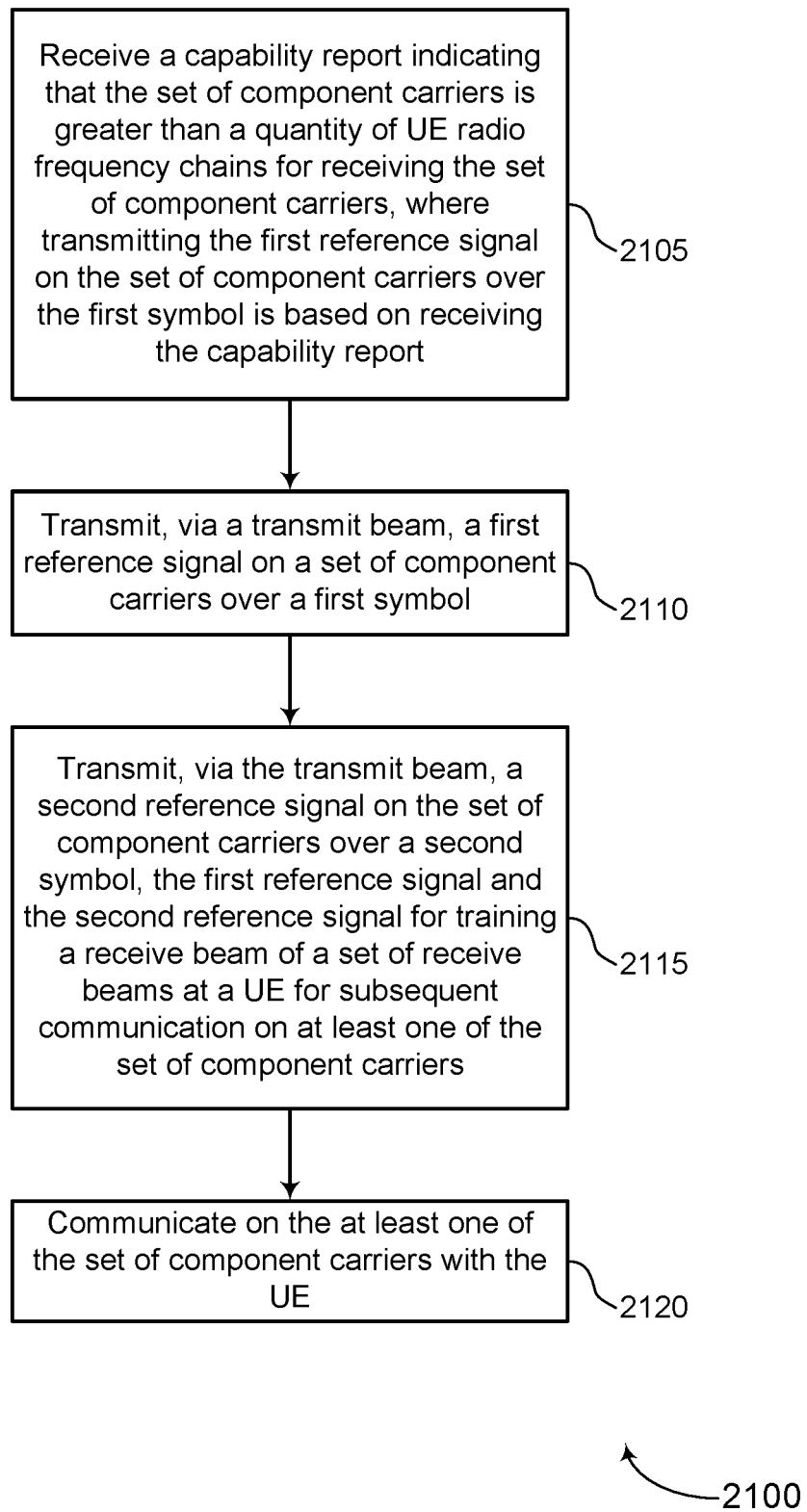

FIG. 21 shows a flowchart illustrating a method 2100 that supports common beam training for a group of component carriers in accordance with aspects of the present disclosure. The operations of method 2100 may be implemented by a base station 105 or its components as described herein. For example, the operations of method 2100 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2105, the base station may receive a capability report indicating that the set of component carriers is greater than a quantity of UE radio frequency chains for receiving the set of component carriers, in which transmitting the first reference signal on the set of component carriers over the first symbol is based on receiving the capability report. The operations of 2105 may be performed according to the methods described herein. In some examples, aspects of the operations of 2105 may be performed by a capability report controller as described with reference to FIGS. 10-13.

At 2110, the base station may transmit, via a transmit beam, a first reference signal on a set of component carriers over a first symbol. The operations of 2110 may be performed according to the methods described herein. In some examples, aspects of the operations of 2110 may be performed by a first reference signal component as described with reference to FIGS. 10-13.

At 2115, the base station may transmit, via the transmit beam, a second reference signal on the set of component carriers over a second symbol, the first reference signal and the second reference signal for training a receive beam of a set of receive beams at a UE for subsequent communication on at least one of the set of component carriers. The operations of 2115 may be performed according to the methods described herein. In some examples, aspects of the operations of 2115 may be performed by a second reference signal component as described with reference to FIGS. 10-13.

At 2120, the base station may communicate on the at least one of the set of component carriers with the UE. The operations of 2120 may be performed according to the methods described herein. In some examples, aspects of the operations of 2120 may be performed by a component carrier manager as described with reference to FIGS. 10-13.

Figure 22:
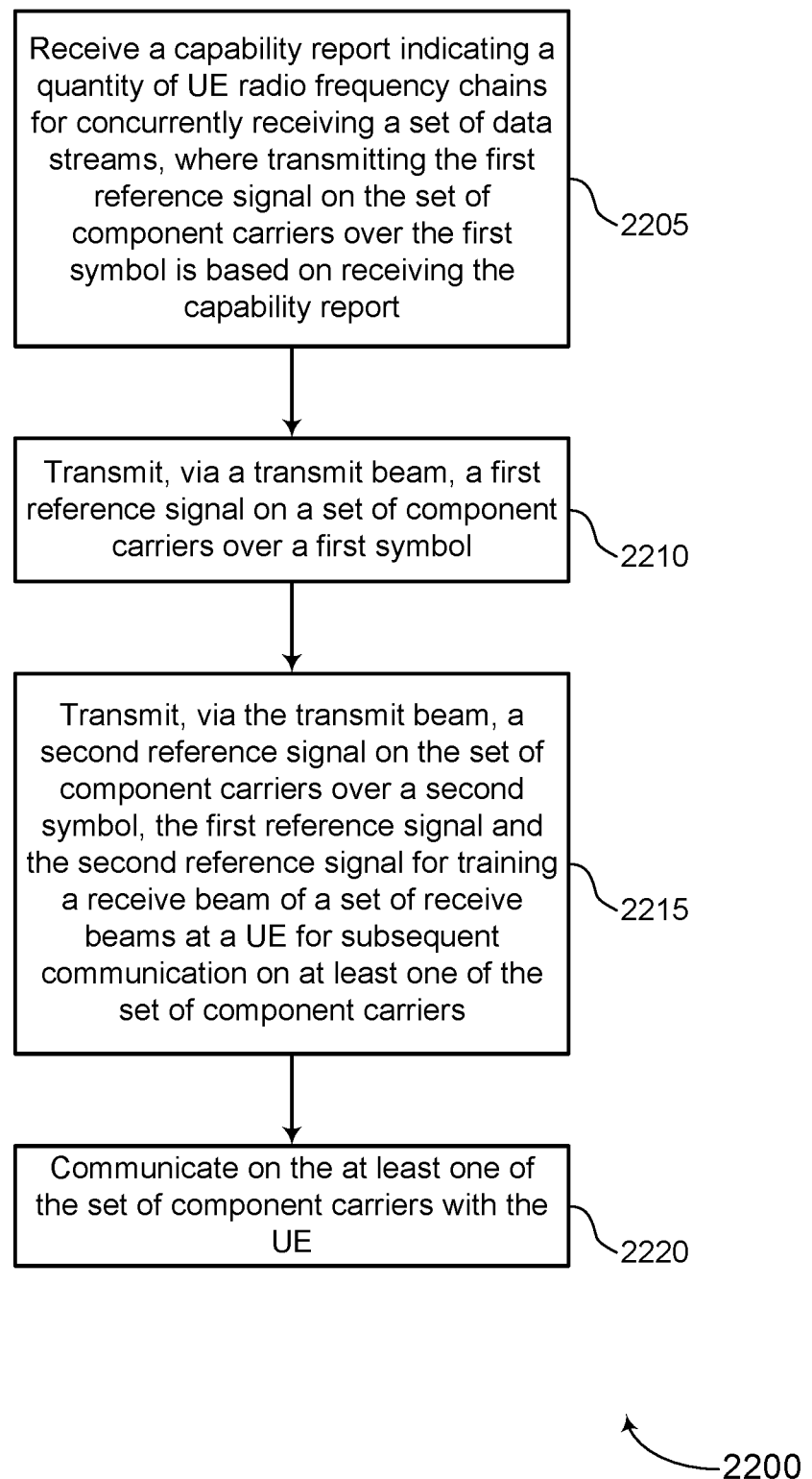

FIG. 22 shows a flowchart illustrating a method 2200 that supports common beam training for a group of component carriers in accordance with aspects of the present disclosure. The operations of method 2200 may be implemented by a base station 105 or its components as described herein. For example, the operations of method 2200 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2205, the base station may receive a capability report indicating a quantity of UE radio frequency chains for concurrently receiving a set of data streams, in which transmitting the first reference signal on the set of component carriers over the first symbol is based on receiving the capability report. The operations of 2205 may be performed according to the methods described herein. In some examples, aspects of the operations of 2205 may be performed by a capability report controller as described with reference to FIGS. 10-13.

At 2210, the base station may transmit, via a transmit beam, a first reference signal on a set of component carriers over a first symbol. The operations of 2210 may be performed according to the methods described herein. In some examples, aspects of the operations of 2210 may be performed by a first reference signal component as described with reference to FIGS. 10-13.

At 2215, the base station may transmit, via the transmit beam, a second reference signal on the set of component carriers over a second symbol, the first reference signal and the second reference signal for training a receive beam of a set of receive beams at a UE for subsequent communication on at least one of the set of component carriers. The operations of 2215 may be performed according to the methods described herein. In some examples, aspects of the operations of 2215 may be performed by a second reference signal component as described with reference to FIGS. 10-13.

At 2220, the base station may communicate on the at least one of the set of component carriers with the UE. The operations of 2220 may be performed according to the methods described herein. In some examples, aspects of the operations of 2220 may be performed by a component carrier manager as described with reference to FIGS. 10-13.

Figure 23:
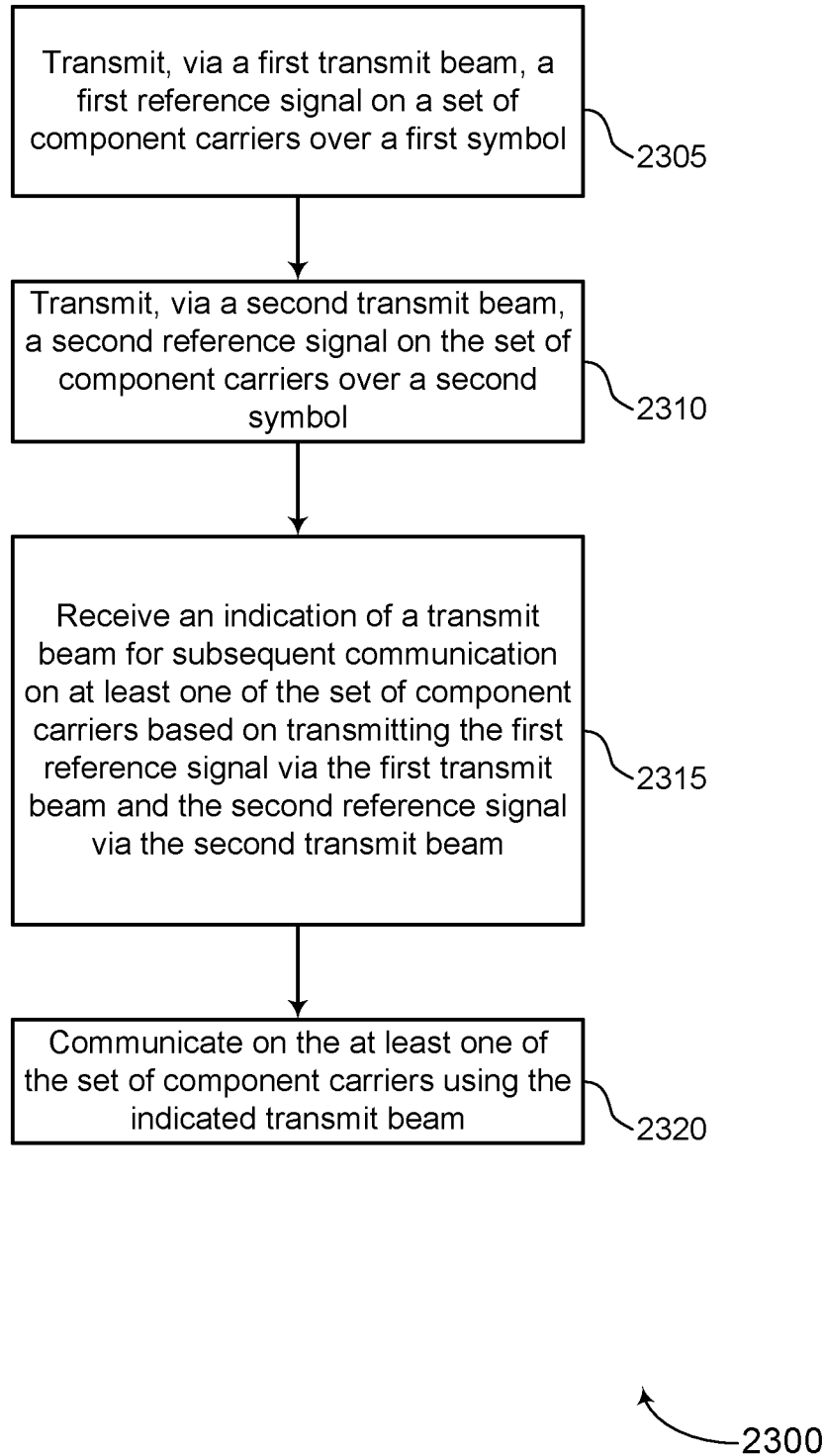

FIG. 23 shows a flowchart illustrating a method 2300 that supports common beam training for a group of component carriers in accordance with aspects of the present disclosure. The operations of method 2300 may be implemented by a UE 115 or its components as described herein. For example, the operations of method 2300 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 2305, the UE may transmit, via a first transmit beam, a first reference signal on a set of component carriers over a first symbol. The operations of 2305 may be performed according to the methods described herein. In some examples, aspects of the operations of 2305 may be performed by a first beam controller as described with reference to FIGS. 6-9.

At 2310, the UE may transmit, via a second transmit beam, a second reference signal on the set of component carriers over a second symbol. The operations of 2310 may be performed according to the methods described herein. In some examples, aspects of the operations of 2310 may be performed by a second beam controller as described with reference to FIGS. 6-9.

At 2315, the UE may receive an indication of a transmit beam of a plurality of transmit beams, the first transmit beam, or the second transmit beam for subsequent communication on at least one of the set of component carriers based on transmitting the first reference signal via the first transmit beam and the second reference signal via the second transmit beam. The operations of 2315 may be performed according to the methods described herein. In some examples, aspects of the operations of 2315 may be performed by a beam indication manager as described with reference to FIGS. 6-9.

At 2320, the UE may communicate on the at least one of the set of component carriers using the indicated transmit beam. The operations of 2320 may be performed according to the methods described herein. In some examples, aspects of the operations of 2320 may be performed by a component carrier manager as described with reference to FIGS. 6-9.

Figure 24:
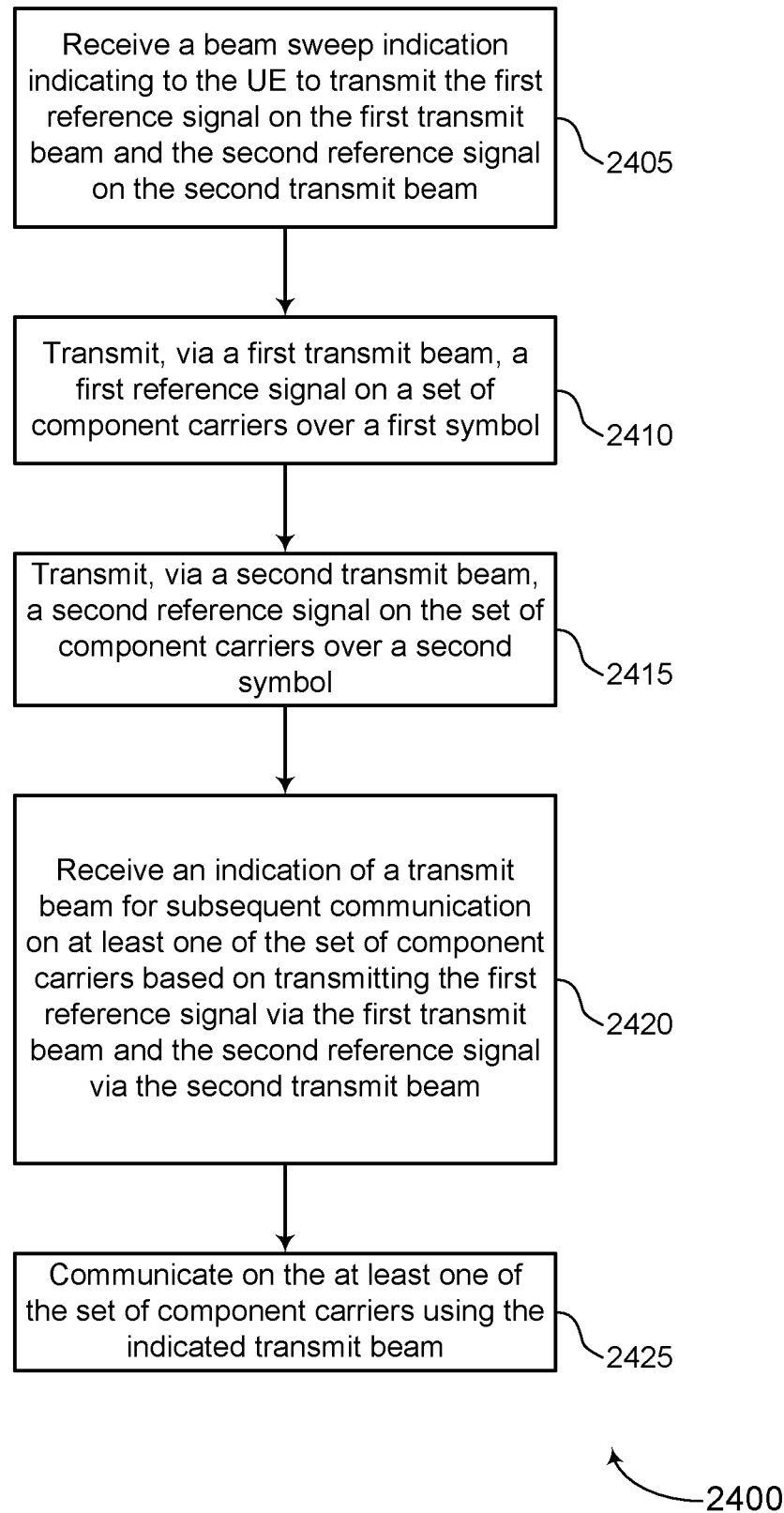

FIG. 24 shows a flowchart illustrating a method 2400 that supports common beam training for a group of component carriers in accordance with aspects of the present disclosure. The operations of method 2400 may be implemented by a UE 115 or its components as described herein. For example, the operations of method 2400 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 2405, the UE may receive a beam sweep indication indicating to the UE to transmit the first reference signal on the first transmit beam and the second reference signal on the second transmit beam. The operations of 2405 may be performed according to the methods described herein. In some examples, aspects of the operations of 2405 may be performed by a beam sweep component as described with reference to FIGS. 6-9.

At 2410, the UE may transmit, via a first transmit beam, a first reference signal on a set of component carriers over a first symbol. The operations of 2410 may be performed according to the methods described herein. In some examples, aspects of the operations of 2410 may be performed by a first beam controller as described with reference to FIGS. 6-9.

At 2415, the UE may transmit, via a second transmit beam, a second reference signal on the set of component carriers over a second symbol. The operations of 2415 may be performed according to the methods described herein. In some examples, aspects of the operations of 2415 may be performed by a second beam controller as described with reference to FIGS. 6-9.

At 2420, the UE may receive an indication of a transmit beam of a plurality of transmit beams, the first transmit beam, or the second transmit beam for subsequent communication on at least one of the set of component carriers based on transmitting the first reference signal via the first transmit beam and the second reference signal via the second transmit beam. The operations of 2420 may be performed according to the methods described herein. In some examples, aspects of the operations of 2420 may be performed by a beam indication manager as described with reference to FIGS. 6-9.

At 2425, the UE may communicate on the at least one of the set of component carriers using the indicated transmit beam. The operations of 2425 may be performed according to the methods described herein. In some examples, aspects of the operations of 2425 may be performed by a component carrier manager as described with reference to FIGS. 6-9.

Figure 25:
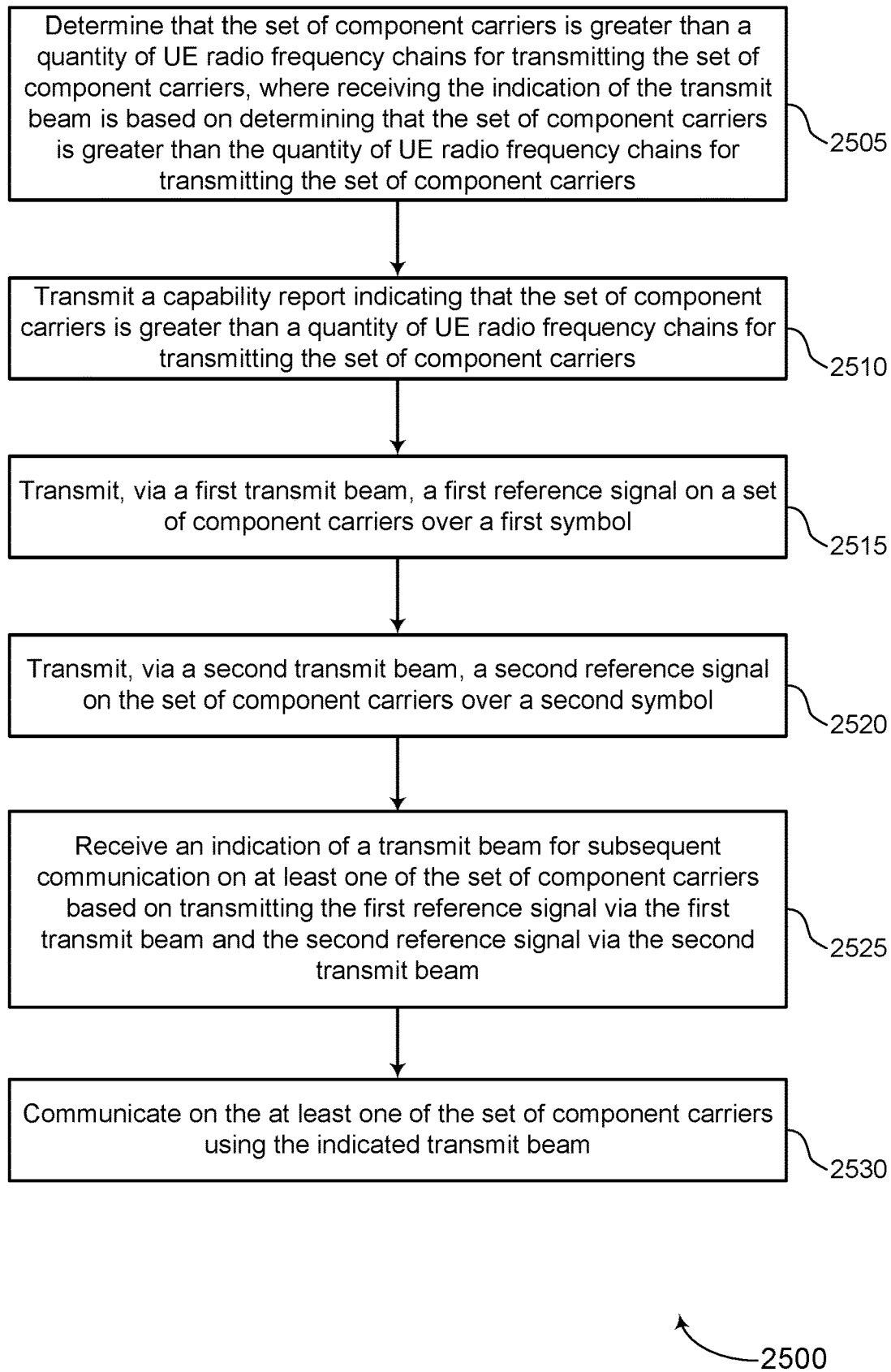

FIG. 25 shows a flowchart illustrating a method 2500 that supports common beam training for a group of component carriers in accordance with aspects of the present disclosure. The operations of method 2500 may be implemented by a UE 115 or its components as described herein. For example, the operations of method 2500 may be performed by a communications manager as described with reference to FIGS. 6-9. In some examples, a UE may execute a set of instructions to control the functional elements of the UE to perform the functions described. Additionally or alternatively, a UE may perform aspects of the functions described using special-purpose hardware.

At 2505, the UE may determine that the set of component carriers is greater than a quantity of UE radio frequency chains for transmitting the set of component carriers, in which receiving the indication of the transmit beam is based on determining that the set of component carriers is greater than the quantity of UE radio frequency chains for transmitting the set of component carriers. The operations of 2505 may be performed according to the methods described herein. In some examples, aspects of the operations of 2505 may be performed by an RF chain manager as described with reference to FIGS. 6-9.

At 2510, the UE may transmit a capability report indicating that the set of component carriers is greater than a quantity of UE radio frequency chains for transmitting the set of component carriers. The operations of 2510 may be performed according to the methods described herein. In some examples, aspects of the operations of 2510 may be performed by a capability report controller as described with reference to FIGS. 6-9.

At 2515, the UE may transmit, via a first transmit beam, a first reference signal on a set of component carriers over a first symbol. The operations of 2515 may be performed according to the methods described herein. In some examples, aspects of the operations of 2515 may be performed by a first beam controller as described with reference to FIGS. 6-9.

At 2520, the UE may transmit, via a second transmit beam, a second reference signal on the set of component carriers over a second symbol. The operations of 2520 may be performed according to the methods described herein. In some examples, aspects of the operations of 2520 may be performed by a second beam controller as described with reference to FIGS. 6-9.

At 2525, the UE may receive an indication of a transmit beam of a plurality of transmit beams for subsequent communication on at least one of the set of component carriers based on transmitting the first reference signal via the first transmit beam and the second reference signal via the second transmit beam. The operations of 2525 may be performed according to the methods described herein. In some examples, aspects of the operations of 2525 may be performed by a beam indication manager as described with reference to FIGS. 6-9.

At 2530, the UE may communicate on the at least one of the set of component carriers using the indicated transmit beam. The operations of 2530 may be performed according to the methods described herein. In some examples, aspects of the operations of 2530 may be performed by a component carrier manager as described with reference to FIGS. 6-9.

Figure 26:
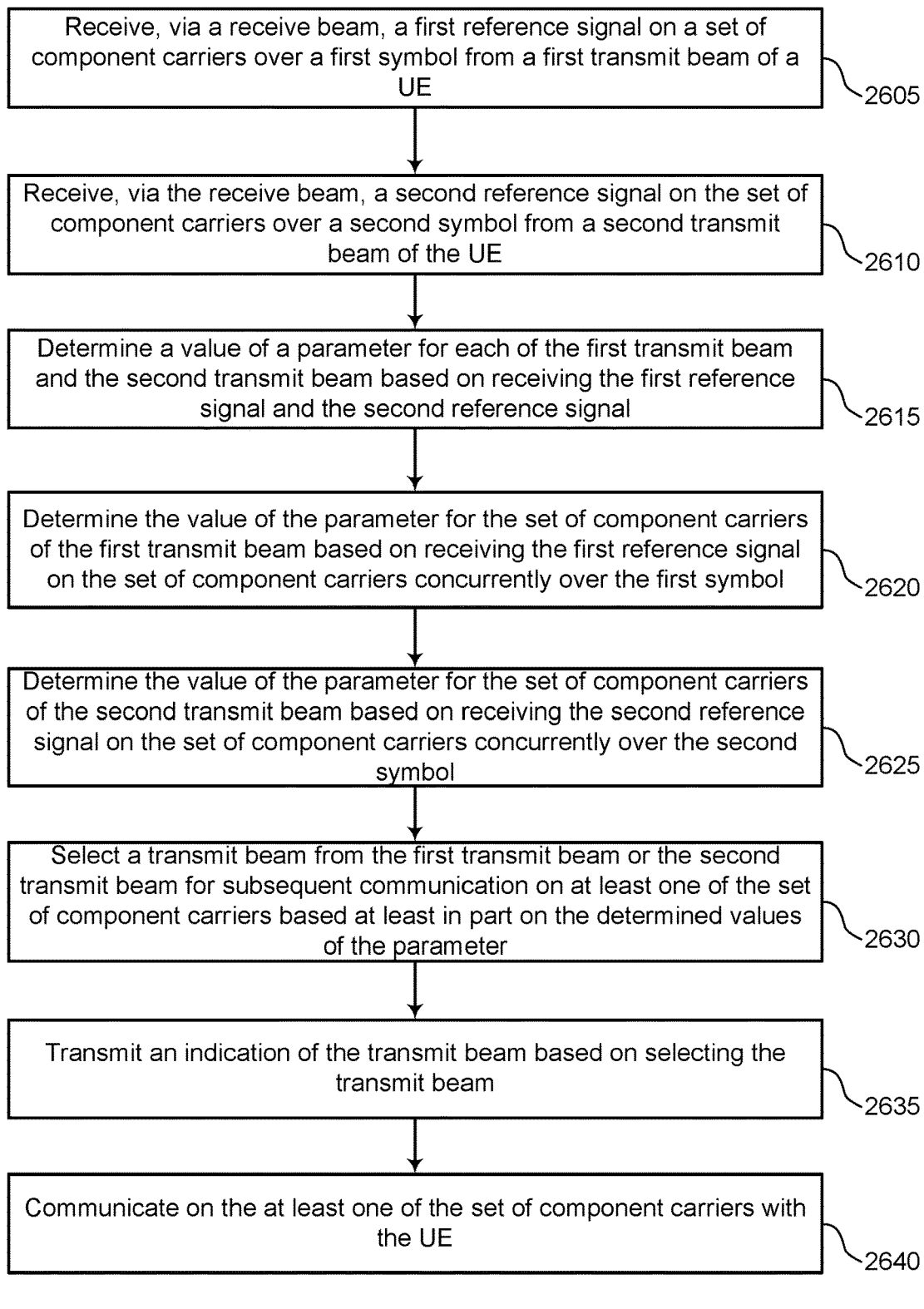

FIG. 26 shows a flowchart illustrating a method 2600 that supports common beam training for a group of component carriers in accordance with aspects of the present disclosure. The operations of method 2600 may be implemented by a base station 105 or its components as described herein. For example, the operations of method 2600 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2605, the base station may receive, via a receive beam, a first reference signal on a set of component carriers over a first symbol from a first transmit beam of a UE. The operations of 2605 may be performed according to the methods described herein. In some examples, aspects of the operations of 2605 may be performed by a first reference signal component as described with reference to FIGS. 10-13.

At 2610, the base station may receive, via the receive beam, a second reference signal on the set of component carriers over a second symbol from a second transmit beam of the UE. The operations of 2610 may be performed according to the methods described herein. In some examples, aspects of the operations of 2610 may be performed by a second reference signal component as described with reference to FIGS. 10-13.

At 2615, the base station may determine a value of a parameter for each of the first transmit beam and the second transmit beam based on receiving the first reference signal and the second reference signal. The operations of 2615 may be performed according to the methods described herein. In some examples, aspects of the operations of 2615 may be performed by an improvement parameter component as described with reference to FIGS. 10-13.

At 2620, the base station may determine the value of the parameter for the set of component carriers of the first transmit beam based on receiving the first reference signal on the set of component carriers concurrently over the first symbol. The operations of 2620 may be performed according to the methods described herein. In some examples, aspects of the operations of 2620 may be performed by an improvement parameter component as described with reference to FIGS. 10-13.

At 2625, the base station may determine the value of the parameter for the set of component carriers of the second transmit beam based on receiving the second reference signal on the set of component carriers concurrently over the second symbol. The operations of 2625 may be performed according to the methods described herein. In some examples, aspects of the operations of 2625 may be performed by an improvement parameter component as described with reference to FIGS. 10-13.

At 2630, the base station may select a transmit beam from the first transmit beam or the second transmit beam for subsequent communication on at least one of the set of component carriers based at least in part on the determined values of the parameter. The operations of 2630 may be performed according to the methods described herein. In some examples, aspects of the operations of 2630 may be performed by a beam selector as described with reference to FIGS. 10-13.

At 2635, the base station may transmit an indication of the transmit beam based on selecting the transmit beam. The operations of 2635 may be performed according to the methods described herein. In some examples, aspects of the operations of 2635 may be performed by a beam indication manager as described with reference to FIGS. 10-13.

At 2640, the base station may communicate on the at least one of the set of component carriers with the UE. The operations of 2640 may be performed according to the methods described herein. In some examples, aspects of the operations of 2640 may be performed by a component carrier manager as described with reference to FIGS. 10-13.

Figure 27:
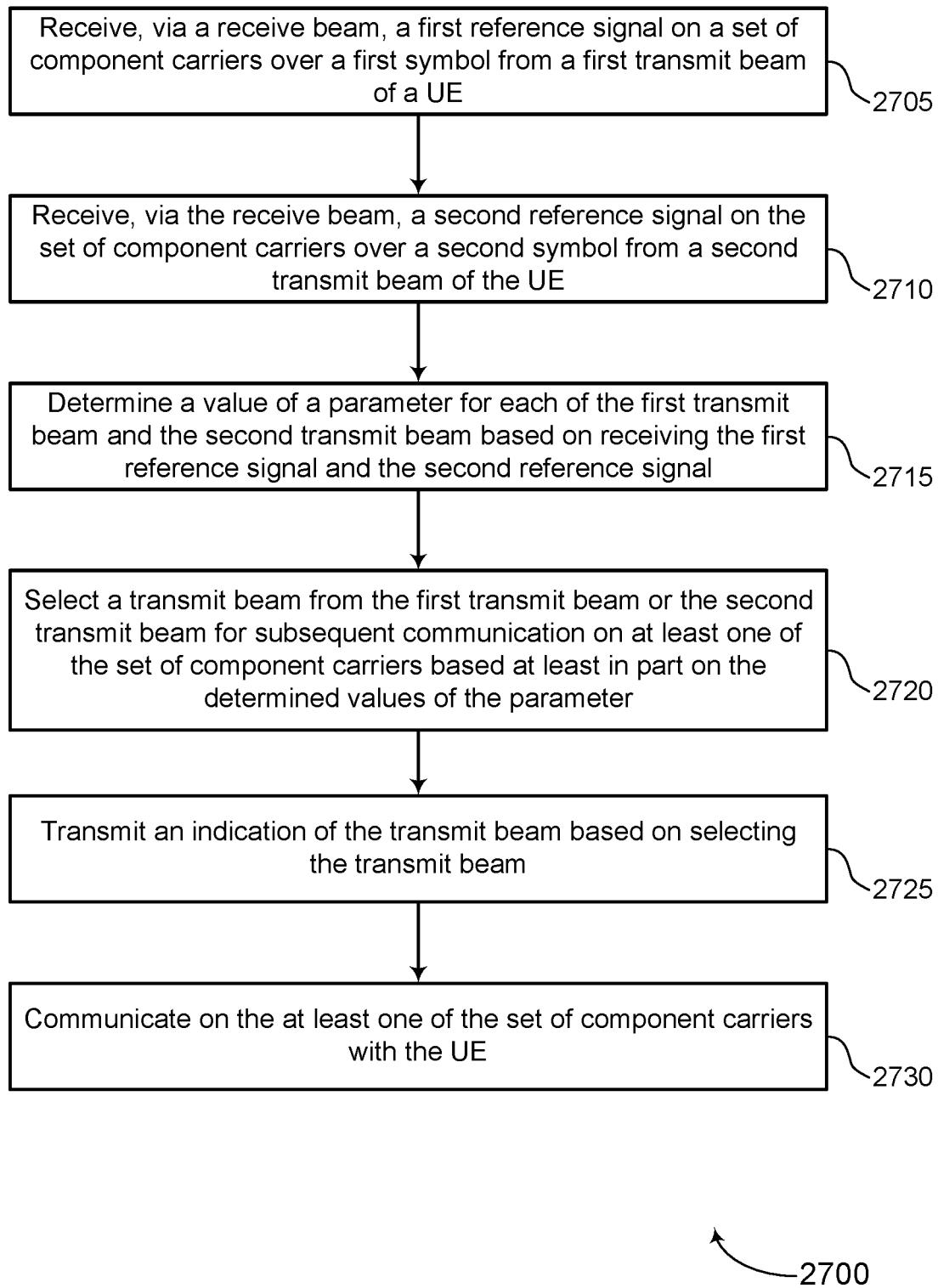

FIG. 27 shows a flowchart illustrating a method 2700 that supports common beam training for a group of component carriers in accordance with aspects of the present disclosure. The operations of method 2700 may be implemented by a base station 105 or its components as described herein. For example, the operations of method 2700 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2705, the base station may receive, via a receive beam, a first reference signal on a set of component carriers over a first symbol from a first transmit beam of a UE. The operations of 2705 may be performed according to the methods described herein. In some examples, aspects of the operations of 2705 may be performed by a first reference signal component as described with reference to FIGS. 10-13.

At 2710, the base station may receive, via the receive beam, a second reference signal on the set of component carriers over a second symbol from a second transmit beam of the UE. The operations of 2710 may be performed according to the methods described herein. In some examples, aspects of the operations of 2710 may be performed by a second reference signal component as described with reference to FIGS. 10-13.

At 2715, the base station may determine a value of a parameter for each of the first transmit beam and the second transmit beam based on receiving the first reference signal and the second reference signal. The operations of 2715 may be performed according to the methods described herein. In some examples, aspects of the operations of 2715 may be performed by an improvement parameter component as described with reference to FIGS. 10-13.

At 2720, the base station may select a transmit beam from the first transmit beam or the second transmit beam for subsequent communication on at least one of the set of component carriers based at least in part on the determined values of the parameter. The operations of 2720 may be performed according to the methods described herein. In some examples, aspects of the operations of 2720 may be performed by a beam selector as described with reference to FIGS. 10-13.

At 2725, the base station may transmit an indication of the transmit beam based on selecting the transmit beam. The operations of 2725 may be performed according to the methods described herein. In some examples, aspects of the operations of 2725 may be performed by a beam indication manager as described with reference to FIGS. 10-13.

At 2730, the base station may communicate on the at least one of the set of component carriers with the UE. The operations of 2730 may be performed according to the methods described herein. In some examples, aspects of the operations of 2730 may be performed by a component carrier manager as described with reference to FIGS. 10-13.

Figure 28:
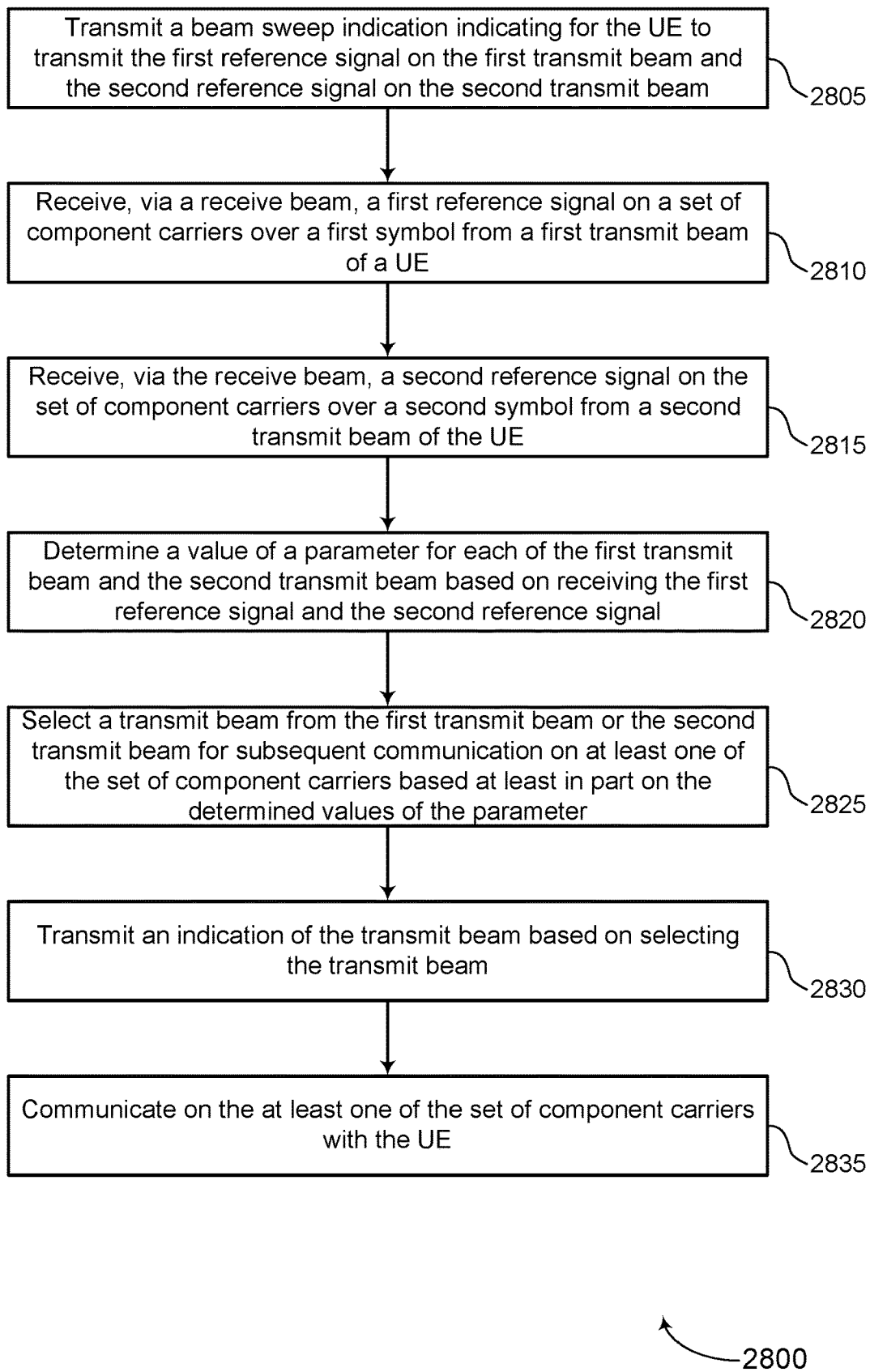

FIG. 28 shows a flowchart illustrating a method 2800 that supports common beam training for a group of component carriers in accordance with aspects of the present disclosure. The operations of method 2800 may be implemented by a base station 105 or its components as described herein. For example, the operations of method 2800 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2805, the base station may transmit a beam sweep indication indicating for the UE to transmit the first reference signal on the first transmit beam and the second reference signal on the second transmit beam. The operations of 2805 may be performed according to the methods described herein. In some examples, aspects of the operations of 2805 may be performed by a beam sweep component as described with reference to FIGS. 10-13.

At 2810, the base station may receive, via a receive beam, a first reference signal on a set of component carriers over a first symbol from a first transmit beam of a UE. The operations of 2810 may be performed according to the methods described herein. In some examples, aspects of the operations of 2810 may be performed by a first reference signal component as described with reference to FIGS. 10-13.

At 2815, the base station may receive, via the receive beam, a second reference signal on the set of component carriers over a second symbol from a second transmit beam of the UE. The operations of 2815 may be performed according to the methods described herein. In some examples, aspects of the operations of 2815 may be performed by a second reference signal component as described with reference to FIGS. 10-13.

At 2820, the base station may determine a value of a parameter for each of the first transmit beam and the second transmit beam based on receiving the first reference signal and the second reference signal. The operations of 2820 may be performed according to the methods described herein. In some examples, aspects of the operations of 2820 may be performed by an improvement parameter component as described with reference to FIGS. 10-13.

At 2825, the base station may select a transmit beam from the first transmit beam or the second transmit beam for subsequent communication on at least one of the set of component carriers based at least in part on the determined values of the parameter. The operations of 2825 may be performed according to the methods described herein. In some examples, aspects of the operations of 2825 may be performed by a beam selector as described with reference to FIGS. 10-13.

At 2830, the base station may transmit an indication of the transmit beam based on selecting the transmit beam. The operations of 2830 may be performed according to the methods described herein. In some examples, aspects of the operations of 2830 may be performed by a beam indication manager as described with reference to FIGS. 10-13.

At 2835, the base station may communicate on the at least one of the set of component carriers with the UE. The operations of 2835 may be performed according to the methods described herein. In some examples, aspects of the operations of 2835 may be performed by a component carrier manager as described with reference to FIGS. 10-13.

Figure 29:
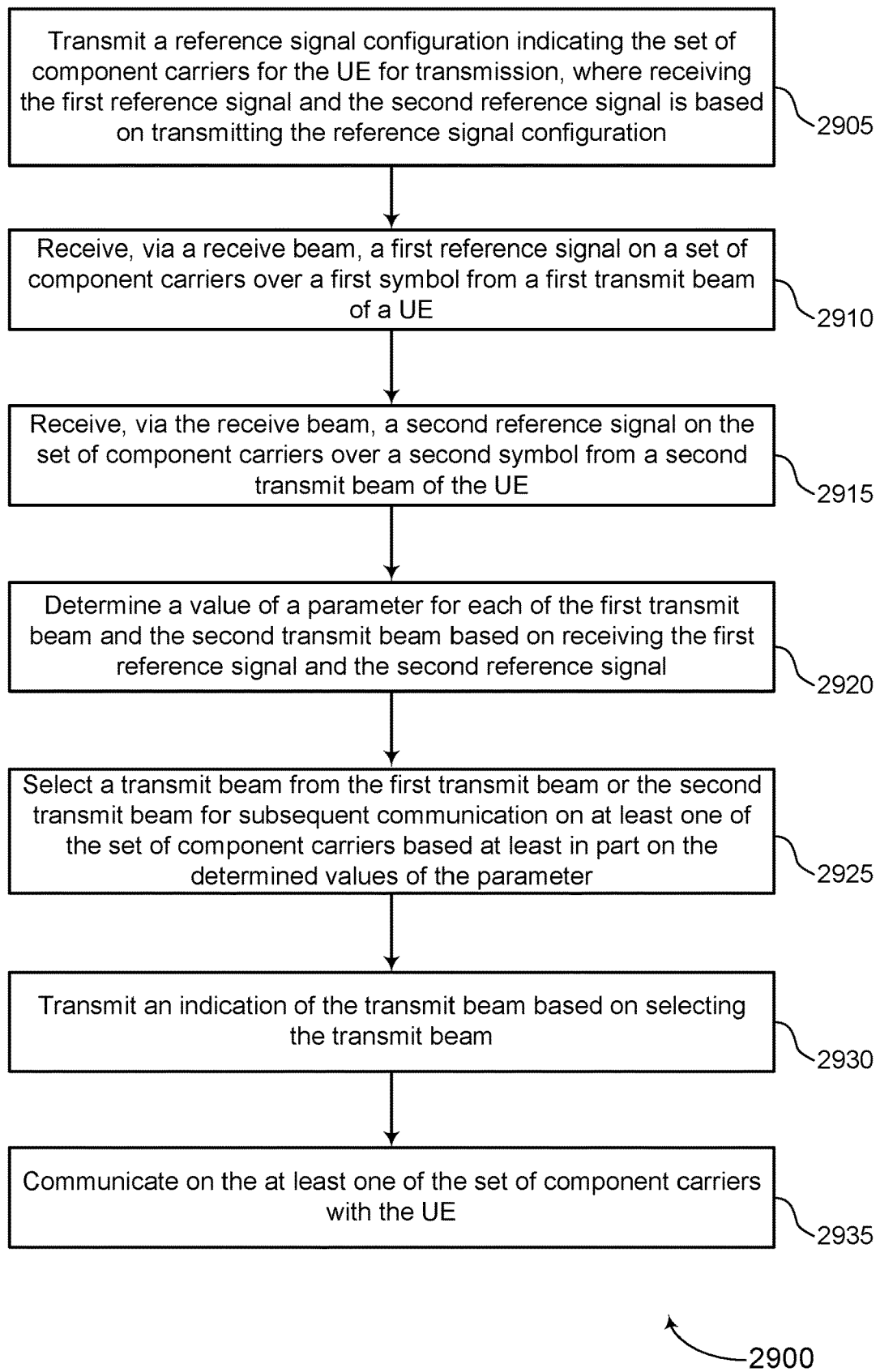

FIG. 29 shows a flowchart illustrating a method 2900 that supports common beam training for a group of component carriers in accordance with aspects of the present disclosure. The operations of method 2900 may be implemented by a base station 105 or its components as described herein. For example, the operations of method 2900 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 2905, the base station may transmit a reference signal configuration indicating the set of component carriers for the UE for transmission, in which receiving the first reference signal and the second reference signal is based on transmitting the reference signal configuration. The operations of 2905 may be performed according to the methods described herein. In some examples, aspects of the operations of 2905 may be performed by a reference signal configuration component as described with reference to FIGS. 10-13.

At 2910, the base station may receive, via a receive beam, a first reference signal on a set of component carriers over a first symbol from a first transmit beam of a UE. The operations of 2910 may be performed according to the methods described herein. In some examples, aspects of the operations of 2910 may be performed by a first reference signal component as described with reference to FIGS. 10-13.

At 2915, the base station may receive, via the receive beam, a second reference signal on the set of component carriers over a second symbol from a second transmit beam of the UE. The operations of 2915 may be performed according to the methods described herein. In some examples, aspects of the operations of 2915 may be performed by a second reference signal component as described with reference to FIGS. 10-13.

At 2920, the base station may determine a value of a parameter for each of the first transmit beam and the second transmit beam based on receiving the first reference signal and the second reference signal. The operations of 2920 may be performed according to the methods described herein. In some examples, aspects of the operations of 2920 may be performed by an improvement parameter component as described with reference to FIGS. 10-13.

At 2925, the base station may select a transmit beam from the first transmit beam or the second transmit beam for subsequent communication on at least one of the set of component carriers based at least in part on the determined values of the parameter. The operations of 2925 may be performed according to the methods described herein. In some examples, aspects of the operations of 2925 may be performed by a beam selector as described with reference to FIGS. 10-13.

At 2930, the base station may transmit an indication of the transmit beam based on selecting the transmit beam. The operations of 2930 may be performed according to the methods described herein. In some examples, aspects of the operations of 2930 may be performed by a beam indication manager as described with reference to FIGS. 10-13.

At 2935, the base station may communicate on the at least one of the set of component carriers with the UE. The operations of 2935 may be performed according to the methods described herein. In some examples, aspects of the operations of 2935 may be performed by a component carrier manager as described with reference to FIGS. 10-13.

Figure 30:
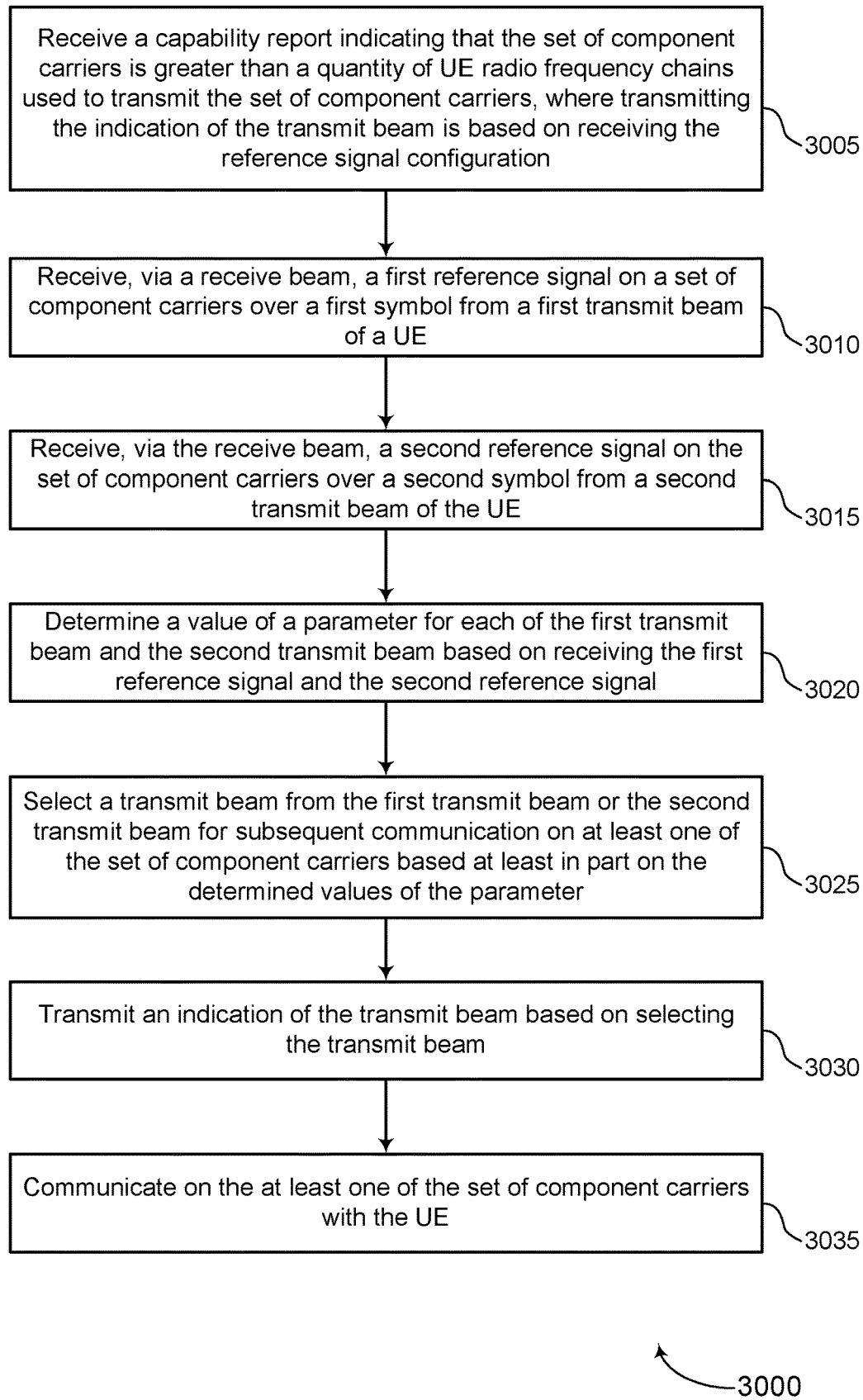

FIG. 30 shows a flowchart illustrating a method 3000 that supports common beam training for a group of component carriers in accordance with aspects of the present disclosure. The operations of method 3000 may be implemented by a base station 105 or its components as described herein. For example, the operations of method 3000 may be performed by a communications manager as described with reference to FIGS. 10-13. In some examples, a base station may execute a set of instructions to control the functional elements of the base station to perform the functions described. Additionally or alternatively, a base station may perform aspects of the functions described using special-purpose hardware.

At 3005, the base station may receive a capability report indicating that the set of component carriers is greater than a quantity of UE radio frequency chains used to transmit the set of component carriers, in which transmitting the indication of the transmit beam is based on receiving the reference signal configuration. The operations of 3005 may be performed according to the methods described herein. In some examples, aspects of the operations of 3005 may be performed by a capability report controller as described with reference to FIGS. 10-13.

At 3010, the base station may receive, via a receive beam, a first reference signal on a set of component carriers over a first symbol from a first transmit beam of a UE. The operations of 3010 may be performed according to the methods described herein. In some examples, aspects of the operations of 3010 may be performed by a first reference signal component as described with reference to FIGS. 10-13.

At 3015, the base station may receive, via the receive beam, a second reference signal on the set of component carriers over a second symbol from a second transmit beam of the UE. The operations of 3015 may be performed according to the methods described herein. In some examples, aspects of the operations of 3015 may be performed by a second reference signal component as described with reference to FIGS. 10-13.

At 3020, the base station may determine a value of a parameter for each of the first transmit beam and the second transmit beam based on receiving the first reference signal and the second reference signal. The operations of 3020 may be performed according to the methods described herein. In some examples, aspects of the operations of 3020 may be performed by an improvement parameter component as described with reference to FIGS. 10-13.

At 3025, the base station may select a transmit beam from the first transmit beam or the second transmit beam for subsequent communication on at least one of the set of component carriers based at least in part on the determined values of the parameter. The operations of 3025 may be performed according to the methods described herein. In some examples, aspects of the operations of 3025 may be performed by a beam selector as described with reference to FIGS. 10-13.

At 3030, the base station may transmit an indication of the transmit beam based on selecting the transmit beam. The operations of 3030 may be performed according to the methods described herein. In some examples, aspects of the operations of 3030 may be performed by a beam indication manager as described with reference to FIGS. 10-13.

At 3035, the base station may communicate on the at least one of the set of component carriers with the UE. The operations of 3035 may be performed according to the methods described herein. In some examples, aspects of the operations of 3035 may be performed by a component carrier manager as described with reference to FIGS. 10-13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, via a first receive beam, a first reference signal on a plurality of component carriers over a first symbol; receiving, via a second receive beam, a second reference signal on the plurality of component carriers over a second symbol; determining a value of a parameter for each of the first receive beam and the second receive beam based at least in part on receiving the first reference signal and the second reference signal; selecting a receive beam from the first receive beam or the second receive beam for subsequent communication on at least one of the plurality of component carriers based at least in part on the determined values of the parameter; and communicating on the at least one of the plurality of component carriers using the selected receive beam.

Aspect 2: The method of aspect 1, wherein receiving the first reference signal or the second reference signal comprises receiving the first reference signal on the plurality of component carriers concurrently over the first symbol or receiving the second reference signal on the plurality of component carriers concurrently over the second symbol, determining the value of the parameter for each of the first receive beam and the second receive beam is based at least in part on receiving the first reference signal on the plurality of component carriers concurrently over the first symbol or receiving the second reference signal on the plurality of component carriers concurrently over the second symbol.

Aspect 3: The method of aspect 2, wherein determining the value of the parameter for each of the first receive beam and the second receive beam comprises: determining the value of the parameter for the plurality of component carriers of the first receive beam based at least in part on receiving the first reference signal on the plurality of component carriers concurrently over the first symbol; and determining the value of the parameter for the plurality of component carriers of the second receive beam based at least in part on receiving the second reference signal on the plurality of component carriers concurrently over the second symbol.

Aspect 4: The method of any one of claims 1-3, further comprising: receiving a reference signal configuration indicating the plurality of component carriers; and determining a purpose of the first reference signal and the second reference signal based at least in part on receiving the reference signal configuration, wherein determining the value of the parameter for each of the first receive beam and the second receive beam is based at least in part on the determined purpose of the first reference signal and the second reference signal.

Aspect 5: The method of aspect 4, wherein the reference signal configuration comprises a plurality of component carrier identifiers or a group identifier of the plurality of component carriers.

Aspect 6: The method of any one of claims 1-5, wherein receiving the first reference signal comprises receiving a reference signal configuration implicitly indicating a purpose of the plurality of component carriers, determining the value of the parameter for each of the first receive beam and the second receive beam is based at least in part on receiving the reference signal configuration implicitly indicating the purpose of the plurality of component carriers in the reference signal configuration.

Aspect 7: The method of aspect 6, wherein the reference signal configuration comprises a plurality of component carrier identifiers or a group identifier of the plurality of component carriers.

Aspect 8: The method of any one of claims 1-7, further comprising determining that the plurality of component carriers is greater than a quantity of UE radio frequency chains for receiving the plurality of component carriers, wherein determining the value of the parameter for each of the first receive beam and the second receive beam is based at least in part on the plurality of component carriers being greater than the quantity of UE radio frequency chains.

Aspect 9: The method of aspect 8, further comprising transmitting a capability report indicating that the plurality of component carriers is greater than the quantity of UE radio frequency chains for receiving the plurality of component carriers.

Aspect 10: The method of any one of claims 1-9, further comprising transmitting a capability report indicating a quantity of UE radio frequency chains for concurrently receiving a plurality of data streams.

Aspect 11: The method of any one of claims 1-10, wherein communicating on the at least one of the plurality of component carriers using the selected receive beam comprises communicating on two or more of the plurality of component carriers concurrently.

Aspect 12: The method of any one of claims 1-11, wherein the parameter comprises one or more of reference signal received power, total throughput, or reference signal received quality.

Aspect 13: The method of any one of claims 1-12, wherein the first reference signal and the second reference signal comprise channel state information reference signals.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

Aspect 17: A method for wireless communications at a base station, comprising: transmitting, via a transmit beam, a first reference signal on a plurality of component carriers over a first symbol; transmitting, via the transmit beam, a second reference signal on the plurality of component carriers over a second symbol, the first reference signal and the second reference signal for training a receive beam of a plurality of receive beams at a UE for subsequent communication on at least one of the plurality of component carriers; and communicating on the at least one of the plurality of component carriers with the UE.

Aspect 18: The method of aspect 17, further comprising transmitting a reference signal configuration indicating the plurality of component carriers, wherein transmitting the reference signal configuration indicates a purpose of the first reference signal and the second reference signal.

Aspect 19: The method of aspect 18, wherein the reference signal configuration comprises a plurality of component carrier identifiers or a group identifier of the plurality of component carriers.

Aspect 20: The method of any one of claims 14-16, wherein the first reference signal comprises a reference signal configuration implicitly indicating a purpose of the plurality of component carriers.

Aspect 21: The method of aspect 20, wherein the reference signal configuration comprises a plurality of component carrier identifiers or a group identifier of the plurality of component carriers.

Aspect 22: The method of any one of claims 14-18, further comprising receiving a capability report indicating that the plurality of component carriers is greater than a quantity of UE radio frequency chains for receiving the plurality of component carriers, wherein transmitting the first reference signal on the plurality of component carriers over the first symbol is based at least in part on receiving the capability report.

Aspect 23: The method of any one of claims 14-19, further comprising receiving a capability report indicating a quantity of UE radio frequency chains for concurrently receiving a plurality of data streams, wherein transmitting the first reference signal on the plurality of component carriers over the first symbol is based at least in part on receiving the capability report.

Aspect 24: The method of any one of claims 14-20, wherein communicating on the at least one of the plurality of component carriers with the UE comprises communicating on two or more of the plurality of component carriers concurrently.

Aspect 25: The method of any one of claims 14-21, wherein the first reference signal and the second reference signal comprise channel state information reference signals.

Aspect 26: An apparatus for wireless communications at a UE, comprising a processor; memory coupled with the processor; and instructions stored in the memory and executable by the processor to cause the apparatus to perform a method of any of aspects 17 through 25.

Aspect 27: An apparatus for wireless communications at a UE, comprising at least one means for performing a method of any of aspects 17 through 25.

Aspect 28: A non-transitory computer-readable medium storing code for wireless communications at a UE, the code comprising instructions executable by a processor to perform a method of any of aspects 17 through 25.

Aspect 29: A method for wireless communications at a UE, comprising: transmitting, via a first transmit beam, a first reference signal on a plurality of component carriers over a first symbol; transmitting, via a second transmit beam, a second reference signal on the plurality of component carriers over a second symbol; receiving an indication of a transmit beam for subsequent communication on at least one of the plurality of component carriers based at least in part on transmitting the first reference signal via the first transmit beam and the second reference signal via the second transmit beam; and communicating on the at least one of the plurality of component carriers using the indicated transmit beam.

Aspect 30: The method of aspect 29, further comprising receiving a beam sweep indication indicating to the UE to transmit the first reference signal on the first transmit beam and the second reference signal on the second transmit beam.

Aspect 31: The method of aspect 30, wherein the beam sweep indication comprises spatial relation information for one or more of the first transmit beam or the second transmit beam.

Aspect 32: The method of any one of claims 23-25, further comprising receiving a reference signal configuration indicating the plurality of component carriers for transmission, wherein transmitting the first reference signal and the second reference signal is based at least in part on the reference signal configuration.

Aspect 33: The method of aspect 32, wherein the reference signal configuration comprises a plurality of component carrier identifiers or a group identifier of the plurality of component carriers.

Aspect 34: The method of any one of claims 23-27, wherein the indication of the transmit beam comprises an index of a reference signal resource for one or more of the first reference signal or the second reference signal.

Aspect 35: The method of aspect 34, wherein the reference signal resource comprises the first symbol or the second symbol.

Aspect 36: The method of any one of claims 23-29, further comprising determining that the plurality of component carriers is greater than a quantity of UE radio frequency chains for transmitting the plurality of component carriers, wherein receiving the indication of the transmit beam is based at least in part on determining that the plurality of component carriers is greater than the quantity of UE radio frequency chains for transmitting the plurality of component carriers, and wherein the transmit beam is shared the plurality of component carriers based at least in part on the plurality of component carriers being greater than the quantity of UE radio frequency chains.

Aspect 37: The method of any one of claims 23-30, further comprising transmitting a capability report indicating that the plurality of component carriers is greater than a quantity of UE radio frequency chains for transmitting the plurality of component carriers.

Aspect 38: The method of any one of claims 23-31, further comprising transmitting a capability report indicating a quantity of UE radio frequency chains for concurrently transmitting a plurality of data streams.

Aspect 39: The method of any one of claims 23-32, wherein communicating on the at least one of the plurality of component carriers using the transmit beam comprises communicating on two or more of the plurality of component carriers concurrently.

Aspect 40: The method of any one of claims 23-33, wherein the first reference signal and the second reference signal comprise sounding reference signals.

Aspect 41: An apparatus for wireless communications at a UE, comprising a processor; memory coupled with the processor; and instructions stored in the memory and executable by the processor to cause the apparatus to perform a method of any of aspects 29 through 31.

Aspect 42: An apparatus for wireless communications at a UE, comprising at least one means for performing a method of any of aspects 29 through 31.

Aspect 43: A non-transitory computer-readable medium storing code for wireless communications at a UE, the code comprising instructions executable by a processor to perform a method of any of aspects 29 through 31.

Aspect 44: A method for wireless communications at a base station, comprising: receiving, via a receive beam, a first reference signal on a plurality of component carriers over a first symbol from a first transmit beam of a UE; receiving, via the receive beam, a second reference signal on the plurality of component carriers over a second symbol from a second transmit beam of the UE; determining a value of a parameter for each of the first transmit beam and the second transmit beam based at least in part on receiving the first reference signal and the second reference signal; selecting a transmit beam from the first transmit beam or the second transmit beam for subsequent communication on at least one of the plurality of component carriers based at least in part on the determined values of the parameter; transmitting an indication of the transmit beam based at least in part on selecting the transmit beam; and communicating on the at least one of the plurality of component carriers with the UE.

Aspect 45: The method of aspect 44, further comprising transmitting a beam sweep indication indicating for the UE to transmit the first reference signal on the first transmit beam and the second reference signal on the second transmit beam.

Aspect 46: The method of aspect 45, wherein the beam sweep indication comprises spatial relation information for one or more of the first transmit beam or the second transmit beam.

Aspect 47: The method of any one of claims 35-37, wherein determining the value of the parameter for each of the first transmit beam and the transmit receive beam comprises: determining the value of the parameter for the plurality of component carriers of the first transmit beam based at least in part on receiving the first reference signal on the plurality of component carriers concurrently over the first symbol; and determining the value of the parameter for the plurality of component carriers of the second transmit beam based at least in part on receiving the second reference signal on the plurality of component carriers concurrently over the second symbol.

Aspect 48: The method of any one of claims 35-38, further comprising transmitting a reference signal configuration indicating the plurality of component carriers for the UE for transmission, wherein receiving the first reference signal and the second reference signal is based at least in part on transmitting the reference signal configuration.

Aspect 49: The method of aspect 48, wherein the reference signal configuration comprises a plurality of component carrier identifiers or a group identifier of the plurality of component carriers.

Aspect 50: The method of any one of claims 35-40, wherein the indication of the transmit beam comprises an index of a reference signal resource for one or more of the first reference signal or the second reference signal.

Aspect 51: The method of aspect 50, wherein the reference signal resource comprises the first symbol or the second symbol.

Aspect 52: The method of any one of claims 35-42, further comprising receiving a capability report indicating that the plurality of component carriers is greater than a quantity of UE radio frequency chains used to transmit the plurality of component carriers, wherein transmitting the indication of the transmit beam is based at least in part on receiving the reference signal configuration.

Aspect 53: The method of any one of claims 35-43, further comprising receiving a capability report indicating a quantity of UE radio frequency chains for concurrently transmitting a plurality of data streams, wherein transmitting the indication of the transmit beam is based at least in part on receiving the reference signal configuration.

Aspect 54: The method of any one of claims 35-44, wherein communicating on the at least one of the plurality of component carriers comprises communicating on two or more of the plurality of component carriers concurrently.

Aspect 55: The method of any one of claims 35-45, wherein the parameter comprises one or more of reference signal received power, total throughput, or reference signal received quality.

Aspect 56: The method of any one of claims 35-46, wherein the first reference signal and the second reference signal comprise sounding reference signals.

Aspect 26: An apparatus for wireless communications at a UE, comprising a processor; memory coupled with the processor; and instructions stored in the memory and executable by the processor to cause the apparatus to perform a method of any of aspects 44 through 56.

Aspect 27: An apparatus for wireless communications at a UE, comprising at least one means for performing a method of any of aspects 44 through 56.

Aspect 28: A non-transitory computer-readable medium storing code for wireless communications at a UE, the code comprising instructions executable by a processor to perform a method of any of aspects 44 through 56.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative components, logic, logical blocks, components, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, components, circuits and processes described. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described as acting in particular combinations, and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described should not be understood as requiring such separation in all implementations, and it should be noted that the described program components and systems can generally be integrated together in a single software product or packaged into multiple software products.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor,
   memory coupled with the processor; and
   instructions stored in the memory and executable by the processor to cause the apparatus to:
   determine that a plurality of component carriers is greater than a quantity of UE radio frequency chains for transmitting the plurality of component carriers;
   transmit, via a first transmit beam, a first reference signal on the plurality of component carriers over a first symbol;
   transmit, via a second transmit beam, a second reference signal on the plurality of component carriers over a second symbol;
   receive an indication of a transmit beam for subsequent communication on at least one of the plurality of component carriers based at least in part on transmitting the first reference signal via the first transmit beam and the second reference signal via the second transmit beam and based at least in part on determining that the plurality of component carriers is greater than the quantity of UE radio frequency chains for transmitting the plurality of component carriers, wherein the transmit beam is shared among the plurality of component carriers based at least in part on the plurality of component carriers being greater than the quantity of UE radio frequency chains; and
communicate on the at least one of the plurality of component carriers using the indicated transmit beam.

2. The apparatus of claim 1, wherein the instructions are further executable by the processor to cause the apparatus to receive a beam sweep indication indicating to the UE to transmit the first reference signal on the first transmit beam and the second reference signal on the second transmit beam.

3. The apparatus of claim 2, wherein the beam sweep indication comprises spatial relation information for one or more of the first transmit beam or the second transmit beam.

4. The apparatus of claim 1, wherein the instructions are further executable by the processor to cause the apparatus to receive a reference signal configuration indicating the plurality of component carriers for transmission, wherein transmitting the first reference signal and the second reference signal is based at least in part on the reference signal configuration.

5. The apparatus of claim 4, wherein the reference signal configuration comprises respective identifiers of the plurality of component carriers or a group identifier of the plurality of component carriers.

6. The apparatus of claim 1, wherein the indication of the transmit beam comprises an index of a reference signal resource for one or more of the first reference signal or the second reference signal.

7. The apparatus of claim 6, wherein the reference signal resource comprises the first symbol or the second symbol.

8. The apparatus of claim 1, wherein the instructions are further executable by the processor to cause the apparatus to transmit a capability report indicating that the plurality of component carriers is greater than the quantity of UE radio frequency chains for transmitting the plurality of component carriers.

9. The apparatus of claim 1, wherein the instructions are further executable by the processor to cause the apparatus to transmit a capability report indicating the quantity of UE radio frequency chains for concurrently transmitting a plurality of data streams.

10. The apparatus of claim 1, wherein the instructions to communicate on the at least one of the plurality of component carriers using the transmit beam are executable by the processor to cause the apparatus to communicate on two or more of the plurality of component carriers concurrently.

11. The apparatus of claim 1, wherein the first reference signal and the second reference signal comprise sounding reference signals.

12. An apparatus for wireless communications at a network device, comprising:
a processor,
memory coupled with the processor; and
instructions stored in the memory and executable by the processor to cause the apparatus to:
receive, via a receive beam, a first reference signal on a plurality of component carriers over a first symbol from a first transmit beam of a user equipment (UE), wherein the plurality of component carriers is greater than a quantity of UE radio frequency chains used to transmit the plurality of component carriers;
receive, via the receive beam, a second reference signal on the plurality of component carriers over a second symbol from a second transmit beam of the UE;
determine a value of a parameter for each of the first transmit beam and the second transmit beam based at least in part on receiving the first reference signal and the second reference signal;
select a transmit beam from the first transmit beam or the second transmit beam for subsequent communication on at least one of the plurality of component carriers based at least in part on the determined values of the parameter;
transmit an indication of the transmit beam based at least in part on selecting the transmit beam, wherein the transmit beam is shared among the plurality of component carriers based at least in part on the plurality of component carriers being greater than the quantity of UE radio frequency chains; and
communicate on the at least one of the plurality of component carriers with the UE.

13. The apparatus of claim 12, wherein the instructions are further executable by the processor to cause the apparatus to transmit a beam sweep indication indicating for the UE to transmit the first reference signal on the first transmit beam and the second reference signal on the second transmit beam.

14. The apparatus of claim 13, wherein the beam sweep indication comprises spatial relation information for one or more of the first transmit beam or the second transmit beam.

15. The apparatus of claim 12, wherein the instructions to determine the value of the parameter for each of the first transmit beam and the second transmit beam are executable by the processor to cause the apparatus to:
determine the value of the parameter for the plurality of component carriers of the first transmit beam based at least in part on receiving the first reference signal on the plurality of component carriers concurrently over the first symbol; and
determine the value of the parameter for the plurality of component carriers of the second transmit beam based at least in part on receiving the second reference signal on the plurality of component carriers concurrently over the second symbol.

16. The apparatus of claim 12, wherein the instructions are further executable by the processor to cause the apparatus to transmit a reference signal configuration indicating the plurality of component carriers for the UE for transmission, wherein receiving the first reference signal and the second reference signal is based at least in part on transmitting the reference signal configuration.

17. The apparatus of claim 16, wherein the reference signal configuration comprises respective identifiers of the plurality of component carriers or a group identifier of the plurality of component carriers.

18. The apparatus of claim 16, wherein the instructions are further executable by the processor to cause the apparatus to receive a capability report indicating that the plurality of component carriers is greater than the quantity of UE radio frequency chains used to transmit the plurality of component carriers, wherein transmitting the indication of the transmit beam is based at least in part on transmitting the reference signal configuration.

19. The apparatus of claim 12, wherein the indication of the transmit beam comprises an index of a reference signal resource for one or more of the first reference signal or the second reference signal.

20. A method for wireless communication at a user equipment (UE), comprising:
determining that a plurality of component carriers is greater than a quantity of UE radio frequency chains for transmitting the plurality of component carriers;
transmitting, via a first transmit beam, a first reference signal on the plurality of component carriers over a first symbol;
transmitting, via a second transmit beam, a second reference signal on the plurality of component carriers over a second symbol;
receiving an indication of a transmit beam for subsequent communication on at least one of the plurality of component carriers based at least in part on transmitting the first reference signal via the first transmit beam and the second reference signal via the second transmit beam and based at least in part on determining that the plurality of component carriers is greater than the quantity of UE radio frequency chains for transmitting the plurality of component carriers, wherein the transmit beam is shared among the plurality of component carriers based at least in part on the plurality of component carriers being greater than the quantity of UE radio frequency chains; and
communicating on the at least one of the plurality of component carriers using the indicated transmit beam.

21. The method of claim 20, further comprising:
receiving a beam sweep indication indicating to the UE to transmit the first reference signal on the first transmit beam and the second reference signal on the second transmit beam.

22. The method of claim 21, wherein the beam sweep indication comprises spatial relation information for one or more of the first transmit beam or the second transmit beam.

23. The method of claim 20, further comprising:
receiving a reference signal configuration indicating the plurality of component carriers for transmission, wherein transmitting the first reference signal and the second reference signal is based at least in part on the reference signal configuration.

24. The method of claim 23, wherein the reference signal configuration comprises respective identifiers of the plurality of component carriers or a group identifier of the plurality of component carriers.

25. The method of claim 20, wherein the indication of the transmit beam comprises an index of a reference signal resource for one or more of the first reference signal or the second reference signal.

26. A method for wireless communication at a network device, comprising:
receiving, via a receive beam, a first reference signal on a plurality of component carriers over a first symbol from a first transmit beam of a user equipment (UE), wherein the plurality of component carriers is greater than a quantity of UE radio frequency chains used to transmit the plurality of component carriers;
receiving, via the receive beam, a second reference signal on the plurality of component carriers over a second symbol from a second transmit beam of the UE;
determining a value of a parameter for each of the first transmit beam and the second transmit beam based at least in part on receiving the first reference signal and the second reference signal;
selecting a transmit beam from the first transmit beam or the second transmit beam for subsequent communication on at least one of the plurality of component carriers based at least in part on the determined values of the parameter;
transmitting an indication of the transmit beam based at least in part on selecting the transmit beam, wherein the transmit beam is shared among the plurality of component carriers based at least in part on the plurality of component carriers being greater than the quantity of UE radio frequency chains; and
communicating on the at least one of the plurality of component carriers with the UE.

27. The method of claim 26, further comprising:
transmitting a beam sweep indication indicating for the UE to transmit the first reference signal on the first transmit beam and the second reference signal on the second transmit beam.

28. The method of claim 27, wherein the beam sweep indication comprises spatial relation information for one or more of the first transmit beam or the second transmit beam.

29. The method of claim 26, wherein determining the value of the parameter for each of the first transmit beam and the second transmit beam comprises:
determining the value of the parameter for the plurality of component carriers of the first transmit beam based at least in part on receiving the first reference signal on the plurality of component carriers concurrently over the first symbol; and
determining the value of the parameter for the plurality of component carriers of the second transmit beam based at least in part on receiving the second reference signal on the plurality of component carriers concurrently over the second symbol.

* * * * *